(12) United States Patent
Mermel et al.

(10) Patent No.: US 11,103,749 B2
(45) Date of Patent: Aug. 31, 2021

(54) SYSTEMS AND METHODS OF SWIMMING ANALYSIS

(71) Applicant: Apple Inc., Cupertino, CA (US)

(72) Inventors: Craig H. Mermel, San Jose, CA (US); Karthik Jayaraman Raghuram, Mountain View, CA (US); Hung A. Pham, Oakland, CA (US); Adam S. Howell, Oakland, CA (US); James P. Ochs, San Francisco, CA (US); Alexander Singh Alvarado, Sunnyvale, CA (US); Sunny K. Chow, Santa Clara, CA (US); Ronald K. Huang, San Jose, CA (US); Gunes Dervisoglu, Santa Clara, CA (US); Kenneth Waters, San Jose, CA (US)

(73) Assignee: Apple Inc., Cupertino, CA (US)

( * ) Notice: Subject to any disclaimer, the term of this patent is extended or adjusted under 35 U.S.C. 154(b) by 667 days.

(21) Appl. No.: 15/692,726

(22) Filed: Aug. 31, 2017

(65) Prior Publication Data

US 2018/0056123 A1 Mar. 1, 2018

Related U.S. Application Data

(60) Provisional application No. 62/381,836, filed on Aug. 31, 2016, provisional application No. 62/381,856, (Continued)

(51) Int. Cl.
*A63B 24/00* (2006.01)
*A63B 71/06* (2006.01)
*G09B 19/00* (2006.01)

(52) U.S. Cl.
CPC ...... *A63B 24/0006* (2013.01); *A63B 24/0062* (2013.01); *A63B 71/0622* (2013.01);
(Continued)

(58) Field of Classification Search
None
See application file for complete search history.

(56) References Cited

U.S. PATENT DOCUMENTS

| 4,566,461 A | 1/1986 | Lubell et al. |
| 5,158,093 A | 10/1992 | Shvartz et al. |

(Continued)

FOREIGN PATENT DOCUMENTS

| AU | 2008100295 A4 | 5/2008 |
| CN | 102481479 A | 5/2012 |

(Continued)

OTHER PUBLICATIONS

Novatel, "IMU Error and Their Effects", Novatel Application Notes APN-064 Rev A p. 1-6, Feb. 21, 2014.
(Continued)

*Primary Examiner* — Alexander Satanovsky
*Assistant Examiner* — Brent A. Fairbanks
(74) *Attorney, Agent, or Firm* — Fish & Richardson P.C.

(57) ABSTRACT

Systems and methods of analyzing a user's motion during a swimming session are described. One or more motions sensors can collect motion data of the user. A processor circuit can make motion analysis based on the motion data. The processor circuit can determine if the user's arm swing is a genuine swim stroke. The processor circuit can also determine whether the user is swimming or turning. The processor circuit can also classify the user's swim stroke style. The processor circuit can also determine the user's swim stroke phase. The processor circuit can also determine the user's stroke orbit consistency.

20 Claims, 47 Drawing Sheets

Related U.S. Application Data filed on Aug. 31, 2016, provisional application No. 62/381,644, filed on Aug. 31, 2016, provisional application No. 62/381,972, filed on Aug. 31, 2016, provisional application No. 62/382,006, filed on Aug. 31, 2016.

(52) U.S. Cl.
CPC .. *G09B 19/0038* (2013.01); *A63B 2024/0012* (2013.01); *A63B 2024/0071* (2013.01); *A63B 2071/0663* (2013.01); *A63B 2208/03* (2013.01); *A63B 2220/17* (2013.01); *A63B 2220/40* (2013.01); *A63B 2220/44* (2013.01); *A63B 2220/62* (2013.01); *A63B 2220/803* (2013.01); *A63B 2220/836* (2013.01); *A63B 2230/06* (2013.01); *A63B 2244/20* (2013.01)

(56) References Cited

U.S. PATENT DOCUMENTS

| | | | |
|---|---|---|---|
| 5,663,897 A | 9/1997 | Geiser | |
| 5,664,499 A | 9/1997 | Kingsmill | |
| 6,013,008 A | 1/2000 | Fukushima | |
| 6,059,724 A | 5/2000 | Campell et al. | |
| 6,582,380 B2 | 6/2003 | Kazlausky et al. | |
| 6,687,535 B2 | 2/2004 | Hautala et al. | |
| 6,837,827 B1 | 1/2005 | Lee et al. | |
| 6,868,338 B1 * | 3/2005 | Elliott ............. | A63B 24/0021 340/990 |
| 7,254,516 B2 | 8/2007 | Case, Jr. et al. | |
| 7,311,675 B2 | 12/2007 | Peifer | |
| 7,377,180 B2 | 5/2008 | Cunningham | |
| 7,387,029 B2 | 6/2008 | Cunningham | |
| 7,467,060 B2 | 12/2008 | Kulach et al. | |
| 7,534,206 B1 | 5/2009 | Lovitt et al. | |
| 7,647,196 B2 | 1/2010 | Kahn et al. | |
| 7,690,556 B1 | 4/2010 | Kahn et al. | |
| 7,771,320 B2 | 8/2010 | Riley et al. | |
| 7,805,149 B2 | 9/2010 | Werner et al. | |
| 7,841,967 B1 | 11/2010 | Kahn et al. | |
| 8,290,480 B2 | 10/2012 | Abramson et al. | |
| 8,483,775 B2 | 7/2013 | Buck et al. | |
| 8,531,180 B2 | 9/2013 | Piemonte et al. | |
| 8,589,174 B2 | 11/2013 | Nelson et al. | |
| 8,638,320 B2 | 1/2014 | Harley et al. | |
| 8,653,956 B2 | 2/2014 | Berkobin et al. | |
| 8,784,271 B2 | 7/2014 | Brumback et al. | |
| 8,890,854 B2 | 11/2014 | Tenuta et al. | |
| 8,892,391 B2 | 11/2014 | Tu et al. | |
| 8,894,576 B2 | 11/2014 | Alwan et al. | |
| 8,911,329 B2 | 12/2014 | Lin et al. | |
| 8,928,635 B2 | 1/2015 | Harley et al. | |
| 9,195,305 B2 | 11/2015 | Markovic et al. | |
| 9,264,862 B2 | 2/2016 | Tu et al. | |
| 9,413,871 B2 | 8/2016 | Nixon et al. | |
| 9,448,250 B2 | 9/2016 | Pham et al. | |
| 9,526,430 B2 | 12/2016 | Srinivas et al. | |
| 9,788,794 B2 | 10/2017 | Le Boeuf et al. | |
| 9,918,646 B2 | 3/2018 | Alvarado et al. | |
| 9,998,864 B2 | 6/2018 | Kumar et al. | |
| 10,098,549 B2 | 10/2018 | Tan et al. | |
| 10,154,789 B2 | 12/2018 | Raghuram et al. | |
| 10,188,347 B2 | 1/2019 | Self et al. | |
| 10,206,627 B2 | 2/2019 | Le Boeuf et al. | |
| 10,219,708 B2 | 3/2019 | Altini | |
| 10,244,948 B2 | 4/2019 | Pham et al. | |
| 10,290,260 B2 | 5/2019 | Wu et al. | |
| 10,292,606 B2 | 5/2019 | Wisbey et al. | |
| 10,512,406 B2 | 12/2019 | Martinez et al. | |
| 10,524,670 B2 | 1/2020 | Raghuram et al. | |
| 10,620,232 B2 | 4/2020 | Tu et al. | |
| 10,687,707 B2 | 6/2020 | Tan et al. | |
| 10,687,752 B2 | 6/2020 | Pham et al. | |
| 10,694,994 B2 | 6/2020 | Alvarado et al. | |
| 10,699,594 B2 | 6/2020 | Mermel et al. | |
| 10,617,912 B2 | 7/2020 | Rao et al. | |
| 10,709,933 B2 | 7/2020 | Tan et al. | |
| 2001/0022828 A1 | 9/2001 | Pyles | |
| 2002/0019585 A1 | 2/2002 | Dickinson | |
| 2003/0032460 A1 | 2/2003 | Cannon et al. | |
| 2003/0138763 A1 * | 7/2003 | Roncalez ........... | A63B 24/0003 434/254 |
| 2004/0064061 A1 | 4/2004 | Nissila | |
| 2005/0107723 A1 | 5/2005 | Wehman et al. | |
| 2005/0124906 A1 | 6/2005 | Childre et al. | |
| 2005/0212701 A1 | 9/2005 | Nimmo | |
| 2006/0064277 A1 | 3/2006 | Jung et al. | |
| 2006/0136173 A1 | 6/2006 | Case et al. | |
| 2006/0190217 A1 | 8/2006 | Lee et al. | |
| 2006/0217231 A1 | 9/2006 | Parks et al. | |
| 2007/0100666 A1 | 5/2007 | Stivoric et al. | |
| 2007/0150229 A1 | 6/2007 | Fujiwara | |
| 2007/0219059 A1 | 9/2007 | Schwartz et al. | |
| 2007/0275825 A1 | 11/2007 | O'Brien | |
| 2007/0276271 A1 | 11/2007 | Chan | |
| 2008/0096726 A1 | 4/2008 | Riley et al. | |
| 2008/0214360 A1 | 9/2008 | Stirling et al. | |
| 2009/0009320 A1 | 1/2009 | O'Connor et al. | |
| 2009/0024332 A1 | 1/2009 | Karlov et al. | |
| 2009/0043531 A1 | 2/2009 | Kahn et al. | |
| 2009/0063099 A1 | 3/2009 | Counts et al. | |
| 2009/0240461 A1 | 9/2009 | Makino et al. | |
| 2009/0319221 A1 | 12/2009 | Kahn et al. | |
| 2010/0030350 A1 | 2/2010 | House | |
| 2010/0130890 A1 | 5/2010 | Matsumura et al. | |
| 2010/0184564 A1 | 7/2010 | Molyneux et al. | |
| 2010/0204952 A1 | 8/2010 | Irlam et al. | |
| 2010/0210953 A1 | 8/2010 | Sholder et al. | |
| 2010/0210975 A1 | 8/2010 | Anthony, III et al. | |
| 2010/0217099 A1 | 8/2010 | Leboeuf et al. | |
| 2010/0274102 A1 | 10/2010 | Teixeira | |
| 2010/0298656 A1 | 11/2010 | McCombie et al. | |
| 2011/0040193 A1 | 2/2011 | Seppanen et al. | |
| 2011/0054359 A1 | 3/2011 | Sazonov et al. | |
| 2011/0082008 A1 | 4/2011 | Cheung et al. | |
| 2011/0131012 A1 | 6/2011 | Czaja et al. | |
| 2011/0152695 A1 | 6/2011 | Granqvist et al. | |
| 2011/0195707 A1 | 8/2011 | Faerber et al. | |
| 2011/0238485 A1 | 9/2011 | Haumont et al. | |
| 2011/0301436 A1 | 12/2011 | Teixeira | |
| 2012/0006112 A1 | 1/2012 | Lee et al. | |
| 2012/0083715 A1 | 4/2012 | Yuen et al. | |
| 2012/0172677 A1 | 7/2012 | Logan et al. | |
| 2012/0238832 A1 | 9/2012 | Jang et al. | |
| 2012/0296455 A1 | 11/2012 | Ohnemus et al. | |
| 2012/0322621 A1 | 12/2012 | Bingham et al. | |
| 2013/0023739 A1 | 1/2013 | Russel | |
| 2013/0041590 A1 | 2/2013 | Burich et al. | |
| 2013/0053990 A1 | 2/2013 | Ackland | |
| 2013/0085861 A1 | 4/2013 | Dunlap | |
| 2013/0096943 A1 | 4/2013 | Carey et al. | |
| 2013/0135097 A1 | 5/2013 | Doezema | |
| 2013/0158686 A1 | 6/2013 | Zhang et al. | |
| 2013/0178335 A1 | 7/2013 | Lin et al. | |
| 2013/0197377 A1 | 8/2013 | Takahiko et al. | |
| 2013/0218053 A1 | 8/2013 | Kaiser et al. | |
| 2013/0267794 A1 | 10/2013 | Fernstrom et al. | |
| 2014/0071082 A1 | 3/2014 | Singh et al. | |
| 2014/0073486 A1 | 3/2014 | Ahmed et al. | |
| 2014/0087708 A1 | 3/2014 | Kalita et al. | |
| 2014/0088444 A1 | 3/2014 | Saalasti et al. | |
| 2014/0107932 A1 | 4/2014 | Luna | |
| 2014/0109390 A1 | 4/2014 | Manning | |
| 2014/0121471 A1 | 5/2014 | Walker | |
| 2014/0167973 A1 | 6/2014 | Letchner et al. | |
| 2014/0172238 A1 | 6/2014 | Craine | |
| 2014/0172361 A1 | 6/2014 | Chiang et al. | |
| 2014/0197946 A1 | 7/2014 | Park et al. | |
| 2014/0200906 A1 | 7/2014 | Bentley et al. | |
| 2014/0207264 A1 | 7/2014 | Quy | |
| 2014/0213920 A1 | 7/2014 | Lee et al. | |
| 2014/0221854 A1 | 8/2014 | Wai | |
| 2014/0228649 A1 | 8/2014 | Rayner et al. | |

(56) References Cited

U.S. PATENT DOCUMENTS

| | | |
|---|---|---|
| 2014/0244071 A1 | 8/2014 | Czaja et al. |
| 2014/0266789 A1 | 9/2014 | Matus |
| 2014/0276127 A1 | 9/2014 | Ferdosi et al. |
| 2014/0278139 A1 | 9/2014 | Hong et al. |
| 2014/0278229 A1* | 9/2014 | Hong ................ A61B 5/486 702/160 |
| 2014/0316305 A1 | 10/2014 | Venkatraman et al. |
| 2014/0348367 A1 | 11/2014 | Vavrus et al. |
| 2015/0087929 A1 | 3/2015 | Rapoport et al. |
| 2015/0088006 A1 | 3/2015 | Rapoport et al. |
| 2015/0100141 A1 | 4/2015 | Hughes |
| 2015/0105096 A1 | 4/2015 | Chowdhury et al. |
| 2015/0119728 A1 | 4/2015 | Blackadar et al. |
| 2015/0147734 A1* | 5/2015 | Flores .............. G09B 19/0015 434/247 |
| 2015/0148632 A1 | 5/2015 | Benaron |
| 2015/0182149 A1 | 7/2015 | Rapoport et al. |
| 2015/0250417 A1 | 9/2015 | Cheng et al. |
| 2015/0256689 A1 | 9/2015 | Erkkila et al. |
| 2015/0260514 A1 | 9/2015 | Menelas et al. |
| 2015/0327804 A1 | 11/2015 | Lefever et al. |
| 2015/0328523 A1 | 11/2015 | Heling et al. |
| 2015/0338926 A1 | 11/2015 | Park et al. |
| 2015/0345985 A1 | 12/2015 | Fung et al. |
| 2015/0357948 A1 | 12/2015 | Goldstein |
| 2015/0374240 A1 | 12/2015 | Lee |
| 2016/0021238 A1 | 1/2016 | Abramson et al. |
| 2016/0054449 A1 | 2/2016 | Pekonen et al. |
| 2016/0057372 A1 | 3/2016 | Raghuram et al. |
| 2016/0058302 A1 | 3/2016 | Raghuram et al. |
| 2016/0058329 A1 | 3/2016 | Srinivas et al. |
| 2016/0058332 A1 | 3/2016 | Tan et al. |
| 2016/0058333 A1 | 3/2016 | Arnold et al. |
| 2016/0058356 A1 | 3/2016 | Raghuram et al. |
| 2016/0058370 A1 | 3/2016 | Raghuram et al. |
| 2016/0058371 A1 | 3/2016 | Singh Alvarado et al. |
| 2016/0058372 A1 | 3/2016 | Raghuram et al. |
| 2016/0059079 A1 | 3/2016 | Watterson |
| 2016/0084869 A1* | 3/2016 | Yuen ................ G01P 15/0888 73/510 |
| 2016/0147319 A1 | 5/2016 | Agarwal et al. |
| 2016/0166178 A1 | 6/2016 | Fuss et al. |
| 2016/0170998 A1 | 6/2016 | Frank et al. |
| 2016/0206248 A1 | 7/2016 | Sartor et al. |
| 2016/0242646 A1 | 8/2016 | Obma |
| 2016/0256058 A1 | 9/2016 | Pham et al. |
| 2016/0269572 A1 | 9/2016 | Erkkila et al. |
| 2016/0287177 A1 | 10/2016 | Huppert et al. |
| 2016/0314633 A1 | 10/2016 | Bonanni et al. |
| 2016/0361020 A1 | 12/2016 | LeBoeuf et al. |
| 2016/0363449 A1 | 12/2016 | Metzler et al. |
| 2016/0374614 A1 | 12/2016 | Cavallaro et al. |
| 2017/0007166 A1 | 1/2017 | Roover et al. |
| 2017/0061817 A1* | 3/2017 | Mettler May ........ A61B 5/1123 |
| 2017/0074897 A1 | 3/2017 | Mermel et al. |
| 2017/0082649 A1 | 3/2017 | Tu et al. |
| 2017/0094450 A1 | 3/2017 | Tu et al. |
| 2017/0111768 A1 | 4/2017 | Smith et al. |
| 2017/0181644 A1 | 6/2017 | Meer et al. |
| 2017/0188893 A1 | 7/2017 | Venkatraman et al. |
| 2017/0202486 A1 | 7/2017 | Martikka et al. |
| 2017/0211936 A1 | 7/2017 | Howell et al. |
| 2017/0242499 A1 | 8/2017 | Shah et al. |
| 2017/0242500 A1 | 8/2017 | Shah et al. |
| 2017/0251972 A1 | 9/2017 | Jayaraman et al. |
| 2017/0259116 A1 | 9/2017 | Mestas |
| 2017/0269734 A1 | 9/2017 | Graff |
| 2017/0269785 A1 | 9/2017 | Abdollahian et al. |
| 2017/0273619 A1 | 9/2017 | Singh Alvarado et al. |
| 2017/0347885 A1 | 12/2017 | Tan et al. |
| 2017/0367658 A1 | 12/2017 | LeBoeuf et al. |
| 2018/0028863 A1* | 2/2018 | Matsuda ............ A63B 24/0006 |
| 2018/0049694 A1 | 2/2018 | Singh Alvarado et al. |
| 2018/0050235 A1 | 2/2018 | Tan et al. |
| 2018/0055375 A1 | 3/2018 | Martinez et al. |
| 2018/0055439 A1 | 3/2018 | Pham et al. |
| 2018/0056123 A1 | 3/2018 | Rao et al. |
| 2018/0056128 A1 | 3/2018 | Narasimha Rao et al. |
| 2018/0056129 A1 | 3/2018 | Narasimha Rao et al. |
| 2018/0279914 A1 | 10/2018 | Patek et al. |
| 2018/0344217 A1 | 12/2018 | Perry et al. |
| 2019/0076063 A1 | 3/2019 | Kent et al. |
| 2021/0068689 A1 | 3/2021 | Ochs et al. |
| 2021/0068712 A1 | 3/2021 | Humblet et al. |
| 2021/0068713 A1 | 3/2021 | Dervisoglu et al. |
| 2021/0093917 A1 | 4/2021 | Dervisoglu et al. |
| 2021/0093918 A1 | 4/2021 | Dervisoglu et al. |

FOREIGN PATENT DOCUMENTS

| | | |
|---|---|---|
| CN | 104218976 A | 12/2014 |
| CN | 105031905 A | 11/2015 |
| CN | 105068656 A | 11/2015 |
| GB | 2465824 | 6/2010 |
| IN | 259/KOL/2015 | 12/2015 |
| JP | 2010-051333 A | 3/2010 |
| JP | 2013-039316 A | 2/2013 |
| JP | 2014-042757 A | 3/2014 |
| JP | 2016-150018 A | 8/2016 |
| JP | 2018-000543 A | 1/2018 |
| JP | 2018-015187 A | 2/2018 |
| RO | 122807 B1 | 2/2010 |
| WO | 03/61779 A1 | 7/2003 |
| WO | 2010090867 | 8/2010 |
| WO | 2011/105914 A1 | 9/2011 |
| WO | 2015/126182 A1 | 8/2015 |
| WO | 2015/200900 A1 | 12/2015 |
| WO | 2016/044831 A1 | 3/2016 |
| WO | 2016/073620 A1 | 5/2016 |

OTHER PUBLICATIONS

Kyle, Chester R., "Reduction of Wind Resistance and Power Output of Racing Cyclists and Runners Travelling in Groups", Ergonomics, vol. 22, No. 4, 1979, pp. 387-397.

KINprof, May 31, 2011, Predictive VO2max tests, Web Video, Retrieved from: https://www.youtube.com/watch?v=_9e3HcY1sm8.

PCT International Application No. PCT/US2017/049693, International Search Report dated Aug. 12, 2017, 3 pages.

Your Fitness FAQ, Why is it important to warm up and cool down in a workout?, 2012, Web, Retrieved from: http://www.yourfitnessfaq.com/whyisitimportanttowarmupandcooldowninaworkout.html.

Vella et al, Exercise After-Burn: Research Update, 2005, Web, Retrieved from: http://www.unm.edu/~lkravitz/Article%20folder/epocarticle.html.

Song et al., "Training Activity Recognition Systems Online Using Real-Time Crowdsourcing", University of Rochester Computer Science, UbiCom' 12, Sep. 5-8, 2012 (2 pages).

Rowlands et al., "Assessing Sedentary Behavior with the GENEActiv: Introducing the Sedentary Sphere". Medicine and science in sports and exercise 46.6 (2014): 1235-1247.

Hasson et al., "Accuracy of four resting metabolic rate production equations: Effects of sex, body mass index, age, and race/ethnicity", Journal of Science and Medicine in Sport, 2011, vol. 14, p. 344-351.

Lucas et al., "Mechanisms of orthostatic intolerance following very prolonged exercise", 2008, J Appl Physiol, 105: 213-225.

Kunze et al., "Where am i: Recognizing on-body positions of wearable sensors." Location-and context-awareness. Springer Berlin Heidelberg, 2005. 264-275.

Keytel et al., "Prediction of energy expenditure from heart rate monitoring during submaximal exercise", 2005, Journal of Sports Sciences, 23(3):289-97.

Sabatini, Kalman-filter-based orientation determination using inertial/magnetic sensors: observability analysis and performance evaluation, Sep. 27, 2011, Sensors 2011, 11, 9182-9206.

Jackson et al., "Prediction of functional aerobic capacity without exercise testing", Medicine and Science in Sports and Exercise, 22(6), 863-870, 1990.

(56) References Cited

OTHER PUBLICATIONS

Isaacs et al., "Modeling energy expenditure and oxygen consumption in human exposure models: accounting for fatigue and EPOC", 2008, Journal of Exposure Science and Environmental Epidemiology, 18: 289-298.

Human Kinetics, Aerobic Workout Components, 2011, Web, Retrieved from: http://www.humankinetics.com/excerpts/excerpts/aerobicworkoutcomponentsexcerpt.

Gao et al., "Evaluation of accelerometer based multi-sensor versus single-sensor activity recognition systems." Medical engineering & physics 36.6 (2014): 779-785.

Frankenfield et al., "Comparison of Predictive Equations for Resting Metabolic Rate in Healthy Nonobese and Obese adults: A systematic review". Journal of the American Dietetic Association. May 2005, vol. 105, No. 5, p. 775-789.

Chu, "In-Vehicle Driver Detection Using Mobile Phone Sensors", Submitted for Graduation with departmental Distinction in Electrical and Computer Engineering, Apr. 20, 2011, pp. 1-21.

Bo et al., "TEXIVE: Detecting Drivers Using Personal Smart Phones by Leveraging Inertial Sensors", Department of Computer Science, Illinois Institute of Technology, Chicago IL, Dec. 7, 2014, pp. 1-12.

Brooks, G.A. et al., "Exercise Physiology: Human Bioenergetics and Its Applications," Fourth Edition, McGraw Hill, ISBN 0-07-255642-0, Chapter 2: Bioenergetics, Chapter 10: Metabolic Response to Exercise: Lactate Metabolism During Exercise and Recovery, Excess Postexercise O2 Consumption (EPOC), O2 Deficit, O2 Debt, and the Anaerobic Threshold, Chapter 16: Cardiovascular Dynamics During Exercise, Chapter 21: Principles of Endurance Conditioning, Chapter 27: Exercise Testing and Prescription, 141 pages (2004).

Bruce, R.A. et al., "Exercising testing in adult normal subjects and cardiac patients," Pediatrics, vol. 32, No. Suppl., pp. 742-756 (Oct. 1963).

Bruce, R.A. et al., "Maximal oxygen intake and nomographic assessment of functional aerobic impairment in cardiovascular disease," American Heart Journal, vol. 85, Issue 4, pp. 546-562 (Apr. 1973).

Burke, Edmund R., "High-Tech Cycling," Second Edition, Human Kinetics, Chapter 4: Optimizing the Crank Cycle and Pedaling Cadence, Chapter 5: Cycling Biomechanics, Chapter 6: Cycling Power, Chapter 10: Physiology of Professional Road Cycling, Chapter 11: Physiology of Mountain Biking, 131 pages (2003).

Cavanagh, P.R. et al., "The effect of stride length variation on oxygen uptake during distance running," Medicine and Science in Sports and Exercise, vol. 14, No. 1, pp. 30-35 (1982).

Earnest, C.P. et al., "Cross-sectional association between maximal estimated cardiorespiratory fitness, cardiometabolic risk factors and metabolic syndrome for men and women in the Aerobics Center Longitudinal Study," Mayo Clin Proceedings, vol. 88, No. 3, pp. 259-270, 20 pages (Mar. 2013).

Fox, S.M. et al., "Physical Activity and the Prevention of Coronary Heart Disease," Bull. N.Y. Acad. Med., vol. 44, No. 8, pp. 950-967 (Aug. 1968).

Glass, S., et al., "ACSM's Metabolic Calculations Handbook," Lippincott Williams & Wilkins, 124 pages (2007).

Lavie, C.J. et al., "Impact of cardiorespiratory fitness on the obesity paradox in patients with heart failure," Mayo Clinic Proceedings, vol. 88, No. 3, pp. 251-258 (Mar. 2013).

Margaria, R. et al., "Energy cost of running," Journal of Applied Physiology, vol. 18, No. 2, pp. 367-370 (Mar. 1, 1963).

Mcardle, W.D. et al., "Exercise Physiology: Nutrition, Energy and Human Performance," Seventh Edition, Lippincott Williams & Wilkins, Chapter 5: Introduction to Energy Transfer, Chapter 6: Energy Transfer in the Body, Chapter 7: Energy Transfer During Exercise, Chapter 8: Measurement of Human Energy Expenditure, Chapter 9: Human Energy Expenditure During Rest and Physical Activity, Chapter 10: Energy Expenditure During Walking, Jogging, Running and Swimming, Chapter 11: Individual Differences and Measurement of Energy Capacities, Chapter 21: Training for.

Myers, J. et al., "Exercise Capacity and Mortality Among Men Referred for Exercise Testing," The New England Journal of Medicine, vol. 346, No. 11, pp. 793-801 (Mar. 14, 2002).

Noakes, Timothy D., "Lore of Running," Fourth Edition, Human Kinetics, Chapter 2: Oxygen Transport and Running Economy, Chapter 3: Energy Systems and Running Performance, 157 pages (2002).

Rapoport, Benjamin I., "Metabolic Factors Limiting Performance in Marathon Runners," PLoS Computational Biology, vol. 6, Issue 10, 13 pages (Oct. 2010).

Tanaka, H. et al., "Age-predicted maximal heart rate revisited," Journal of the American College of Cardiology, vol. 37, Issue 1, pp. 153-156 (Jan. 2001).

Wang, L. et al., "Time constant of heart rate recovery after low level exercise as a useful measure of cardiovascular fitness," Conf. Proc. IEEE Eng. Med. Biol. Soc., vol. 1, pp. 1799-1802 (2006).

Yamaji, et al., "Relationship Between Heart Rate and Relative Oxygen Intake in Male Subjects Aged 10 to 27 Years", J. Human Ergol., 7:29-39, Jan. 27, 1978.

International Search Report and Written Opinion received for PCT Patent Application No. PCT/US2018/047290, dated Nov. 8, 2018, 14 pages.

Le, et al., "Sensor-based Training Optimization of a Cyclist Group", Seventh International Conference on Hybrid Intelligent Systems, IEEE 2007, pp. 265-270.

U.S. Appl. No. 17/015,912, filed Sep. 9, 2020, Humblet et al.
U.S. Appl. No. 17/015,965, filed Sep. 9, 2020, Dervisoglu et al.
U.S. Appl. No. 17/016,020, filed Sep. 9, 2020, Ochs et al.

Alexander, "Energetics and Optimization of Human Walking and Running," Am J Human Biology, Mar. 20, 2002, 14:641-648.

Lasecki, "Real-Time Crowd Labeling for Deployable Activity Recognition," University of Rochester Computer Science, Feb. 23, 2013, 10 pages.

Latt et al., "Walking speed, cadence and step length are selected to optimize the stability of head and pelvis accelerations," Experimental Brain Research, Aug. 24, 2007, 184: 201-209.

Morgan et al., "Effect of step length optimization on the aerobic demand of running," Journal of Applied Physiology, 1994, 245-251.

PCT International Preliminary Report on Patentability in International Appln. No. PCT/US2017/049693, dated Mar. 5, 2019, 8 pages.

PCT International Preliminary Report on Patentability in International Appln. No. PCT/US2018/047290, dated Mar. 17, 2020, 9 pages.

Pfitzinger.com "Optimal Marathon Training Sessions, Distance Coach. com, Intelligent Training for Distance Runners," archived May 15, 2012, <https://web.archive.org/web/20120515081237/http://www.pfitzinger.com/marathontraining.shtml>, printed Jan. 20, 2017, 3 pages.

Romijn et al., "Regulation of endogenous fat and carbohydrate metabolism in relation to exercise intensity and duration," Am. J. Physiol., 1993, 6:1-13.

Triendurance.com "Running with a Higher Cadence, Triendurance," Oct. 23, 2021, retrieved from<https ://web. archive.org/web/20080228162904/http ://www.trienduranee .com/Related. asp? PageID=14&NavID=7>, 2 pages.

\* cited by examiner

SYSTEMS AND METHODS OF SWIMMING ANALYSIS

PRIORITY CLAIM

This application claims priority to and the benefit of U.S. Provisional Patent Application No. 62/381,836, titled "Systems and Methods of Arm Swing Motion Determination", which was filed on Aug. 31, 2016 and is incorporated by reference herein in its entirety.

This application claims priority to and the benefit of U.S. Provisional Patent Application No. 62/381,856, titled "Systems and Methods for Determining Orbit Consistency," which was filed on Aug. 31, 2016 and is incorporated by reference herein in its entirety.

This application claims priority to and the benefit of U.S. Provisional Patent Application No. 62/381,644, titled "Systems and Methods for Motion Determination using Likelihood Ratios," which is filed on Aug. 31, 2016 and is incorporated by reference herein in its entirety.

This application claims priority to and the benefit of U.S. Provisional Patent Application No. 62/381,972, titled "Systems and Methods of Classifying Swim Strokes," which was filed on Aug. 31, 2016 and is incorporated by reference herein in its entirety.

This application claims priority to and the benefit of U.S. Provisional Patent Application No. 62/382,006, titled "Systems and Methods of Determining Swim Stroke Phase," which was filed on Aug. 31, 2016 and is incorporated by reference herein in its entirety.

CROSS-REFERENCE TO RELATED APPLICATIONS

This application relates to co-pending U.S. patent application Ser. No. 15/691,245, titled "Systems and Methods for Determining Swimming Metrics," which is file on Aug. 30, 2017 and is incorporated by reference herein in its entirety.

This application relates to co-pending U.S. patent application Ser. No. 15/692,237, titled "Systems and Methods of Swimming calorimetry," which is filed on Aug. 31, 2017 and is incorporated by reference herein in its entirety.

FIELD

The present disclosure relates generally to swimming analysis.

BACKGROUND

When a user is doing activities that includes an arm swing motion, there is often a need to measure a user's arm extension. As an example, when a user is swimming laps, the user's arm extension can help distinguish between a small incidental arm swing motion and a true swim stroke. In addition, determining arm extension can be used to classify different types of swimming strokes. Accordingly, it is desirable to provide methods and systems of determining arm swing motion.

Further, when a user is doing activities that includes multiple types of motions, there is often a need to classify the types of motions. As an example, when a user is swimming laps, the user can switch between two types of motions: swimming and turning. As another example, when a user is running, the user can switch between running and walking. Knowing which type of motions a user is doing is useful in many applications including estimating energy expenditure of the user. Accordingly, it is desirable to provide methods and systems of determining a user's types of motions.

Generally, there are four common swim stroke styles: butterfly, freestyle, breaststroke and backstroke. When a user is swimming, the user can perform any of the different swim stroke styles and change styles throughout the course of his or her swimming session. Knowing which type of swim style a user is doing is useful in many applications including estimating energy expenditure of a user, stroke counting, lap counting and distance calibration. Accordingly, it is desirable to provide methods and systems for classifying swim stroke style.

However, classifying different swim stroke styles is difficult without breaking the swim stroke styles down into common individual phases (e.g., glide, pull, transition and recovery). Knowing a swim stroke phase that a user is executing is not only helpful in identifying swim stroke style, but is also useful in turn detection, lap counting, stroke counting, swimming versus not swimming detection, and coaching/measuring "stroke goodness" by comparing a user's stroke to an ideal set of phase parameters. Accordingly, it is desirable to provide methods and systems of determining swim stroke phase.

When a user is swimming, there is often a need to determine the consistency of the user's arm movements, or orbits. An example of a movement to track is a user's swimming stroke. For example, in an ideal situation, an individual swimming freestyle should exhibit nearly exact replicas of the stroke. But in practice, the ability of an individual to repeat a stroke exactly can be affected by many factors. Therefore, a measure of consistency of a user's stroke orbits can imply the user's skill, efficiency, fatigue, and/or health (e.g., inability to repeat movements may be a sign of disease or injury). Accordingly, it is desirable to provide methods and systems of determining consistency of a user's stroke orbits while swimming.

SUMMARY

The present disclosure relates to a method for improving an accuracy of a wearable device while determining a user's arm motion. In some embodiments, the method comprising: receiving, by a processor circuit of a wearable device, motion data from one or more motion sensors of the wearable device, wherein the one or more motion sensors comprises at least one of an accelerometer or a gyroscope; determining, by the processor circuit using the motion data, rotational data expressed in a first frame of reference based on the motion data; determining, by the processor circuit, a moment arm length based on the rotational data; comparing, by the processor circuit, the moment arm length with a threshold length; determining, by the processor circuit, the user's arm swing is a genuine swim stroke based upon comparing the moment arm length with the threshold length; calculating, by the processor circuit, at least one of a swimming metric or an energy expenditure of the user in response to determining the user's arm swing is a swim stroke, wherein the swimming metric comprises at least one of turns, breaths, laps, swim strokes, or swim stroke styles; and outputting, by the processor circuit, the at least one of the swimming metric or the energy expenditure of the user. In some embodiments, the first frame of reference can be a body-fixed frame of reference with respect to the user device. In some embodiments, the method can include solving a least-squares equation.

The present disclosure also relates to a method for improving an accuracy of a wearable device while determining a user is swimming. In some embodiments, the method can include: receiving, by a processor circuit of a wearable device, a set of training data of the user; receiving, by the processor circuit, motion data from one or more motion sensors of the wearable device, wherein the one or more motion sensors comprises at least one of an accelerometer or a gyroscope; determining, by the processor circuit, a yaw angle of the user based on the motion data; retrieving, by the processor circuit, a value of likelihood ratio corresponding to the yaw angle; and comparing, by the processor circuit, the value of likelihood ratio with a threshold value; determining, by the processor circuit, the user is swimming based upon comparing the value of likelihood ratio with the threshold value; calculating, by the processor circuit, at least one of a swimming metric or an energy expenditure of the user in response to determining the user is swimming, wherein the swimming metric comprises at least one of turns, breaths, laps, swim strokes, or swim stroke styles; and outputting, by the processor circuit, the at least one of the swimming metric or the energy expenditure of the user.

The present disclosure also relates to a method for improving an accuracy of a wearable device while classifying a user's swim stroke style. In some embodiments, the method can include: receiving, by a processor circuit of a wearable device, motion data from one or more motion sensors of the wearable device, wherein the one or more motion sensors comprises at least one of an accelerometer or a gyroscope; calculating, by the processor circuit, a fundamental period based on the received motion data; determining, by the processor circuit, rotational data of the wearable device, wherein the rotational data is expressed in a frame of reference; extracting, by the processor circuit, one or more features from the rotational data; determining, by the processor circuit, the user's swim stroke style based on the one or more features; and outputting, by the processor circuit, the determined swim stroke style. In some embodiments, the frame of reference can be a body-fixed frame of reference with respect to the wearable device. In some embodiments, the frame of reference can be an inertial frame of reference.

In some embodiments, the one or more features comprise at least one of: a mean crown orientation of the wearable device, a correlation of user's arm and wrist rotation, or a contribution of rotation about a crown of the wearable device to a total angular velocity. In some embodiments, the one or more features comprise at least one of: a relative arm rotation about a band of the wearable device during a pull phase, a moment arm of the user, a ratio of acceleration z to rotation y, a mean gravity crown weighted by acceleration, a correlation between an orientation of top of a band of the wearable device and rotation around a band of the wearable device, a root mean square (RMS) of a crown rotation, a minimum rotation around a crown of the wearable device, a maximum rotation around a band of the wearable device, or a maximum rotation x over y.

The present disclosure also relates to a method for improving an accuracy of a wearable device while determining phases of a user's swim stroke. In some embodiments, the method can include: receiving, by a processor circuit of a wearable device, motion data from one or more motion sensors of the wearable device, wherein the one or more motion sensors comprises at least one of an accelerometer or a gyroscope; determining, by the processor circuit using the motion data, a first set of rotational data of the wearable device, wherein the first set of rotational data is expressed in a first frame of reference; converting, by the processor circuit, the first set of rotational data of the wearable device into a second set of rotational expressed in a second frame of reference; determining, by the processor circuit, a glide phase of a user's swim stroke based the second set of rotational data; determining, by the processor circuit, a transition phase of the user's swim stroke based on the second set of rotational data; determining, by the processor circuit, a pull phase and a recovery phase of the user's swim stroke based on the determined glide phase and transition phase; calculating, by the processor circuit, one or more swimming metric of the user based on the determined glide, transition, pull and recovery phases of the user's swim stroke, wherein the one or more swimming metrics comprise at least one of turns, breaths, laps, swim strokes, or swim stroke styles; and outputting the calculated one or more swimming metrics of the user. In some embodiments, the first frame of reference can be a body-fixed frame of reference with respect to the wearable device. In some embodiments, the second frame of reference can be an inertial frame of reference.

The present disclosure also relates to a method for improving an accuracy of a wearable device while determining a user's stroke orbit consistency. In some embodiments, the method can include: receiving, by a processor circuit of a wearable device, motion data from one or more motion sensors of the wearable device, wherein the one or more motion sensors comprises at least one of an accelerometer or a gyroscope; determining, by the processor circuit using the motion data, rotational data of the user device, wherein the rotational data is expressed in a frame of reference; determining, by the processor circuit, a first direction along which the rotational data have the least variance in a first past period; determining, by the processor circuit, a second direction along which the rotational data have the least variance in a second past period; determining, by the processor circuit, a difference between the first direction and the second direction; determining, by the processor circuit, a stroke orbit consistency of the user based on the difference between the first direction and the second direction; and outputting, by the processor circuit, the determined stroke orbit consistency. In some embodiments, the frame of reference can be a body-fixed frame of reference with respect to the user device. In some embodiments, the frame of reference can be an inertial frame of reference.

In some embodiments, the method can include determining an axis of rotation. In some embodiments, the first past period can be substantially 10 seconds. In some embodiments, the second past period can be substantially 3 minutes.

The present disclosure also relates to a method for improving an accuracy of a wearable device while determining a user's stroke orbit consistency. In some embodiments, the method can include: receiving, by a processor circuit of a wearable device, motion data from one or more motion sensors of the wearable device, wherein the one or more motion sensors comprises at least one of an accelerometer or a gyroscope; determining, by the processor circuit using the motion data, rotational data expressed in a frame of reference; determining, by the processor circuit, a histogram of the user's stroke orbit using the rotational data; determining, by the processor, a level of entropy based on the histogram; determining, by the processor circuit, a level of orbit consistency of the user based on the determined level of entropy; and outputting, by the processor circuit, the determined level of orbit consistency of the user. In some embodiments, the frame of reference can be a body-fixed frame of reference with respect to the user device. In some embodiments, the frame of reference can be an inertial frame of reference.

Other features and advantages will become apparent from the following detailed description and drawings.

BRIEF DESCRIPTION OF THE DRAWINGS

Various objects, features, and advantages of the present disclosure can be more fully appreciated with reference to the following detailed description of the present disclosure when considered in connection with the following drawings, in which like reference numerals identify like elements.

DETAILED DESCRIPTION

In the following description, numerous specific details are set forth regarding the systems, methods and media of the present disclosure and the environment in which such systems, methods and media may operate, etc., in order to provide a thorough understanding of the present disclosure. It will be apparent to one skilled in the art, however, that the present disclosure may be practiced without such specific details, and that certain features, which are well known in the art, are not described in detail in order to avoid complication of the present disclosure. In addition, it will be understood that the examples provided below are exemplary, and that it is contemplated that there are other systems, methods, and media that are within the scope of the present disclosure.

The present disclosure describes a wearable device that may be configured to determine a user's arm extension during the user's activities. The wearable device can include one or more motion sensors to collect data about the wearable device's position and orientation in space and to track changes to the wearable device's position and orientation over time. Because a user can wear the wearable device, the motion information can provide information about the user's movements. For example, when a user is swimming, the user's arms are typically swinging along a particular path and at a particular frequency. If the user wears the wearable device on the user's wrist, the wearable device may be able to infer that the user is swimming in a certain style by sensing the way the user's arm moves in a certain path. When the user is swimming, there is a fairly periodic motion of the user's arm/wrist that can be tracked by the wearable device.

Figure 1:
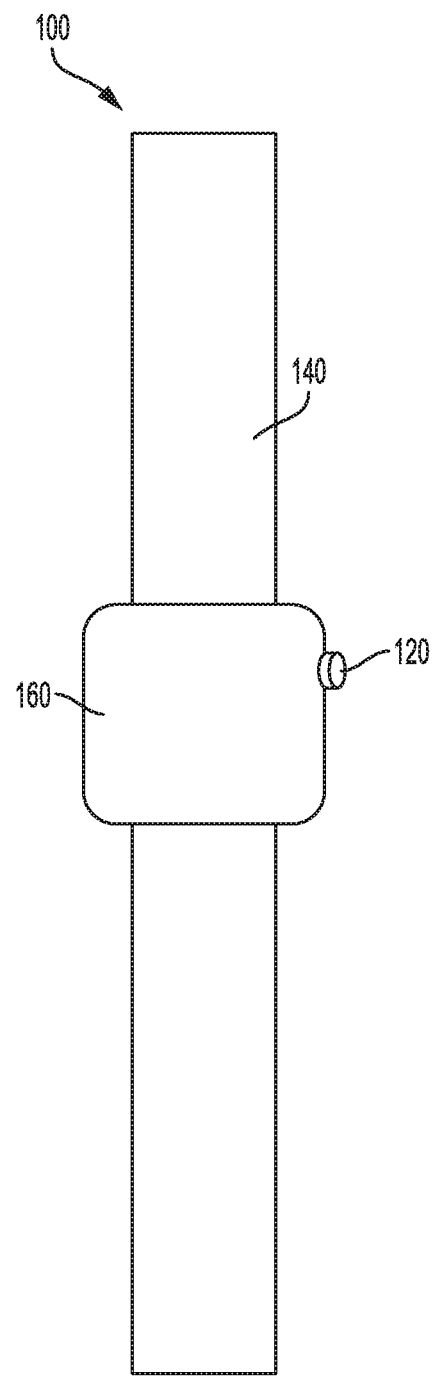
FIG. 1 illustrates a wearable device (or a "user device") according to some embodiments of the present disclosure.

FIG. 1 shows an example of a wearable device (or a "user device") 100 according to some embodiments of the present disclosure. In some embodiments, wearable device 100 may be any suitable wearable device, such as a watch and/or a fitness band configured to be worn around an individual's wrist.

Figure 2:
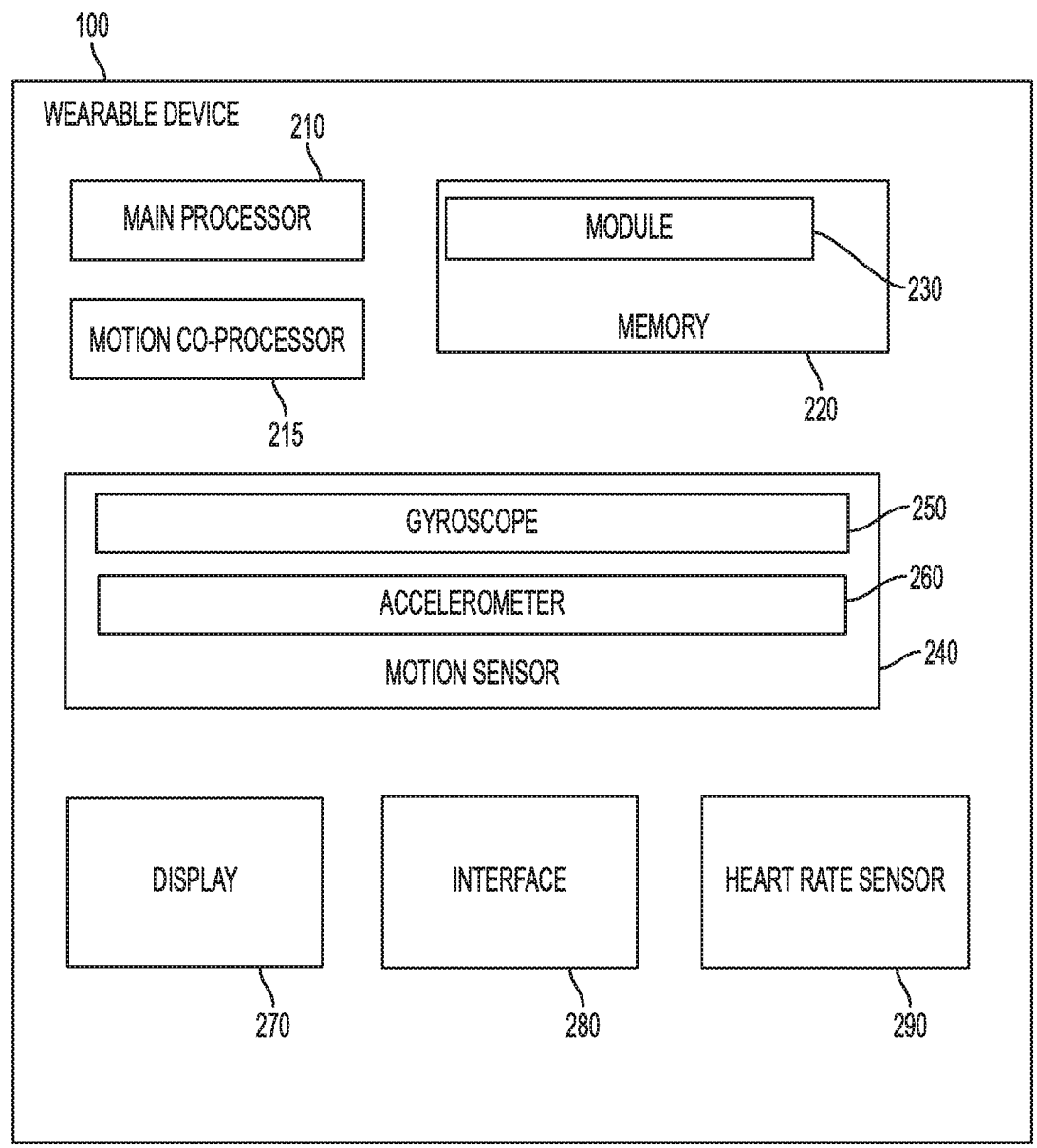
FIG. 2 illustrates a block diagram of a wearable device according to some embodiments of the present disclosure.

FIG. 2 depicts a block diagram of exemplary components that may be found within wearable device 100 according to some embodiments of the present disclosure. In some embodiments, wearable device 100 can include a main processor 210 (or "application processor"), a motion co-processor 215, a memory 220, one or more motion sensors 240, a display 270, an interface 280, and a heart rate sensor 290. Wearable device 100 may include additional modules, fewer modules, or any other suitable combination of modules that perform any suitable operation or combination of operations.

In some embodiments, main processor 210 can include one or more cores and can accommodate one or more threads to run various applications and modules. Software can run on main processor 210 capable of executing computer instructions or computer code. Main processor 210 can also be implemented in hardware using an application specific integrated circuit (ASIC), programmable logic array (PLA), field programmable gate array (FPGA), or any other integrated circuit.

In some embodiments, wearable device 100 also includes motion co-processor 215 which may draw less power than the main processor 210. Whereas the main processor 210 may be configured for general purpose computations and communications, the motion co-processor 215 may be configured to perform a relatively limited set of tasks, such as receiving and processing data from motion sensor 240, heart rate sensor 290, and other modules within the wearable device 100. In many embodiments, the main processor 210 may be powered down at certain times to conserve power, while the motion co-processor 215 remains powered on. Thus, the motion co-processor 215 is sometimes referred to as an "always-on" processor (AOP). Motion co-processor 215 may control when the main processor 210 is powered on or off.

Memory 220 can be a non-transitory computer readable medium, flash memory, a magnetic disk drive, an optical drive, a programmable read-only memory (PROM), a read-only memory (ROM), or any other memory or combination of memories. Memory 220 can include one or more modules 230.

Main processor 210 or motion co-processor 215 can be configured to run module 230 stored in memory 220 that is configured to cause main processor 210 or motion co-processor 215 to perform various steps that are discussed throughout the present disclosure, such as, for example, the methods described in connection with FIG. 4, FIG. 11, and FIG. 12.

In some embodiments, wearable device 100 can include one or more motion sensors 240. For example, motion sensors 240 can include a gyroscope 250 and an accelerometer 260. In some embodiments, accelerometer 260 may be a three-axis accelerometer that measures linear acceleration in up to three-dimensions (for example, x-axis, y-axis, and z-axis). In some embodiments, gyroscope 250 may be a three-axis gyroscope that measures rotational data, such as rotational movement and/or angular velocity, in up to three-dimension (for example, yaw, pitch, and roll). In some embodiments, accelerometer 260 may be a microelectromechanical system (MEMS) accelerometer, and gyroscope 250 may be an MEMS gyroscope. Main processor 210 or motion co-processor 215 of wearable device 100 may receive motion information from one or more motion sensors 240 to track acceleration, rotation, position, or orientation information of wearable device 100 in six degrees of freedom through three-dimensional space.

In some embodiments, wearable device 100 may include other types of sensors in addition to accelerometer 260 and gyroscope 250. For example, wearable device 100 may include an altimeter or barometer, or other types of location sensors, such as a GPS sensor. Wearable device 100 may also include display 270. Display 270 may be a screen, such as a crystalline (e.g., sapphire) or glass touchscreen, configured to provide output to the user as well as receive input from the user via touch. For example, display 270 may be configured to display a current heart rate or daily average energy expenditure. Display 270 may receive input from the user to select, for example, which information should be displayed, or whether the user is beginning a physical activity (e.g., starting a session) or ending a physical activity (e.g., ending a session), such as a swimming session, a running session, a weight lifting session, a walking session or a cycling session. In some embodiments, wearable device 100 may present output to the user in other ways, such as by producing sound with a speaker (not shown), and wearable device 100 may receive input from the user in other ways, such as by receiving voice commands via a microphone (not shown).

In some embodiments, wearable device 100 may communicate with external devices via interface 280, including a configuration to present output to a user or receive input from a user. Interface 280 may be a wireless interface. The wireless interface may be a standard Bluetooth (IEEE 802.15) interface, such as Bluetooth v4.0, also known as "Bluetooth low energy." In other embodiments, the interface may operate according to a cellphone network protocol such as Long Term Evolution (LTE) or a Wi-Fi (IEEE 802.11) protocol. In other embodiments, interface 280 may include wired interfaces, such as a headphone jack or bus connector (e.g., Lightning, Thunderbolt, USB, etc.).

Wearable device 100 can measure an individual's current heart rate from heart rate sensor 290. Heart rate sensor 290 may also be configured to determine a confidence level indicating a relative likelihood of an accuracy of a given heart rate measurement. In other embodiments, a traditional heart rate monitor may be used and may communicate with wearable device 100 through a near field communication method (e.g., Bluetooth).

Wearable device 100 may be configured to communicate with a companion device 300 (FIG. 3), such as a smartphone, as described in more detail herein. In some embodiments, wearable device 100 may be configured to communicate with other external devices, such as a notebook or desktop computer, tablet, headphones, Bluetooth headset, etc.

The modules described above are examples, and embodiments of wearable device 100 may include other modules not shown. For example, some embodiments of wearable device 100 may include a rechargeable battery (e.g., a lithium-ion battery), a microphone or a microphone array, one or more cameras, one or more speakers, a watchband, water-resistant casing or coating, etc. In some embodiments, all modules within wearable device 100 can be electrically and/or mechanically coupled together. In some embodiments, main processor 210 can coordinate the communication among each module.

Figure 3:
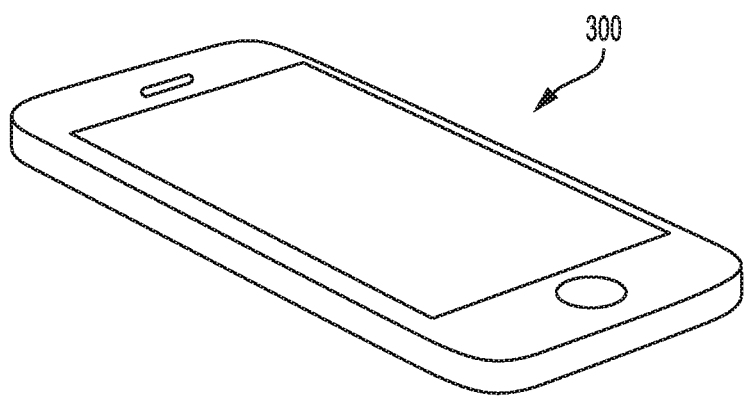
FIG. 3 illustrates a companion device according to some embodiments of the present disclosure.

FIG. 3 shows an example of a companion device 300 according to some embodiments of the present disclosure. Wearable device 100 may be configured to communicate with companion device 300 via a wired or wireless communication channel (e.g., Bluetooth, Wi-Fi, etc.). In some embodiments, companion device 300 may be a smartphone, tablet computer, or similar portable computing device. Companion device 300 may be carried by the user, stored in the user's pocket, strapped to the user's arm with an armband or similar device, placed in a mounting device, or otherwise positioned within communicable range of wearable device 100. In some embodiments, companion device 300 may include a variety of sensors, such as location and motion sensors (not shown). When companion device 300 is available for communication with wearable device 100, wearable device 100 may receive additional data from companion device 300 to improve or supplement its calibration or calorimetry processes. For example, in some embodiments, wearable device 100 may not include a GPS sensor as opposed to an alternative embodiment in which wearable device 100 may include a GPS sensor. In the case where wearable device 100 may not include a GPS sensor, a GPS sensor of companion device 300 may collect GPS location information, and wearable device 100 may receive the GPS location information via interface 280 (FIG. 2) from companion device 300.

In another example, wearable device 100 may not include an altimeter or barometer, as opposed to an alternative embodiment in which wearable device 100 may include an altimeter or barometer. In the case where wearable device 100 may not include an altimeter or barometer, an altimeter or barometer of companion device 300 may collect altitude or relative altitude information, and wearable device 100 may receive the altitude or relative altitude information via interface 280 (FIG. 2) from the companion device 300.

In another example, wearable device 100 may receive motion information from companion device 300. Wearable device 100 may compare the motion information from companion device 300 with motion information from one or more motion sensors 240 of wearable device 100. Motion information such as data from accelerometer 260 and/or gyroscope 250 may be filtered (e.g. by a high-pass, low-pass, band-pass, or band-stop filter) in order to improve the quality of motion information. For example, a low-pass filter may be used to remove some ambient noise.

Wearable device 100 may use sensed and collected motion information to predict a user's activity. Examples of activities may include, but are not limited to, walking, running, cycling, swimming, weight lifting etc. Wearable device 100 may also be able to predict or otherwise detect when a user is sedentary (e.g., sleeping, sitting, standing still, driving or otherwise controlling a vehicle, etc.) Wearable device 100 may use a variety of motion information, including, in some embodiments, motion information from a companion device. Wearable device 100 may use a variety of heuristics, algorithms, or other techniques to predict the user's activity. Wearable device 100 may also estimate a confidence level (e.g., percentage likelihood, degree of accuracy, etc.) associated with a particular prediction (e.g., 90% likelihood that the user is swimming) or predictions (e.g., 60% likelihood that the user is swimming and 40% likelihood that the user is performing a non-swimming activity).

There are multiple frames of reference that are useful to consider when characterizing a device's motion, for example, a body-fixed reference frame and an inertial reference frame. Switching between these reference frames can be accomplished by performing a rotation, or a series of rotations. Because most of the data that is being collected by the motion sensors is in the body-fixed reference frame, in order to use the data to count swimming strokes, the data is first transformed from the body-fixed reference frame to the inertial frame.

Figure 4A:
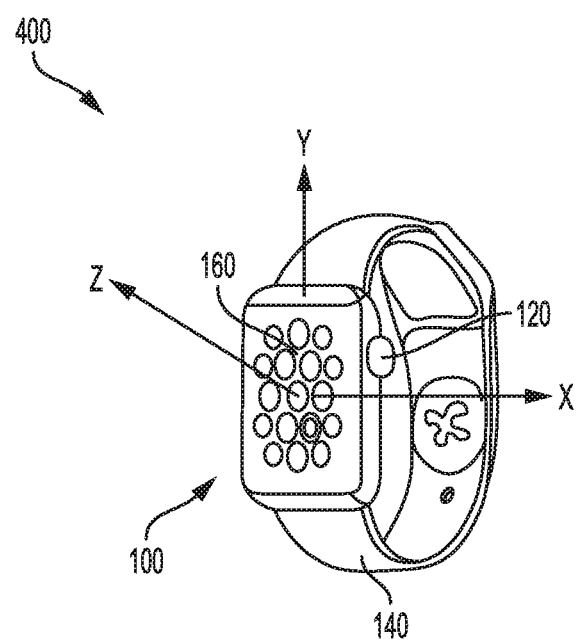
FIGS. 4A-4D illustrate examples of a body-fixed frame of reference according to some embodiments of the present disclosure.

FIG. 4A illustrates an example of a body-fixed frame of reference 400 according to some embodiments of the present disclosure. In FIG. 4A, the rotational axes of body-fixed frame of reference 400 are with respect to wearable device 100. For example, the z-axis is perpendicular to the display surface 160 of wearable device 100. The x-axis and the y-axis can be chosen relatively arbitrarily as long as the three axes are perpendicular to each other. In FIG. 4A, the x-axis is parallel with the direction pointed by crown 120 of wearable device 100, and the y-axis is parallel with the direction of band 140 of wearable device 100 (assuming the direction pointed by crown 120 of wearable device 100 is perpendicular to the direction of band 140 of wearable device 100).

Figure 4B:
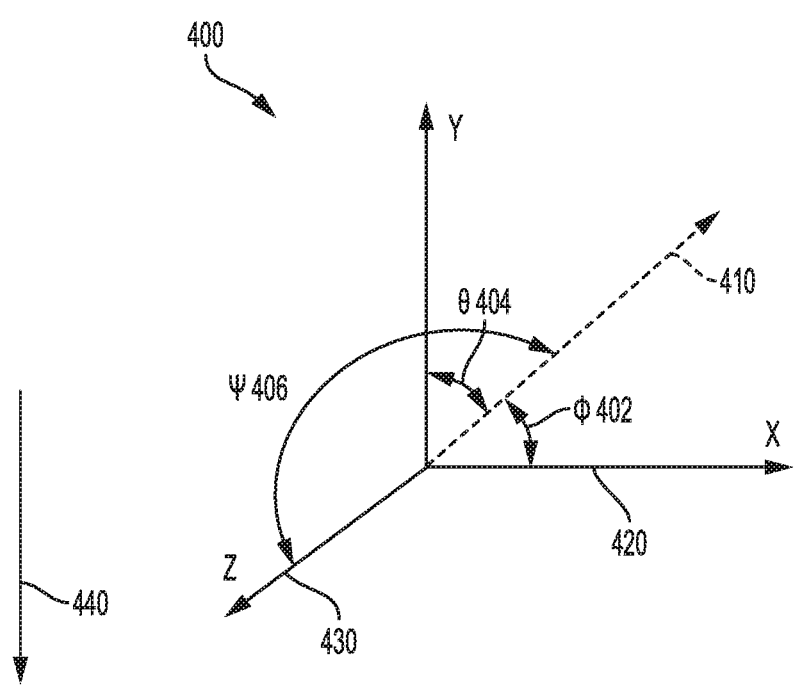
Figure 4C:
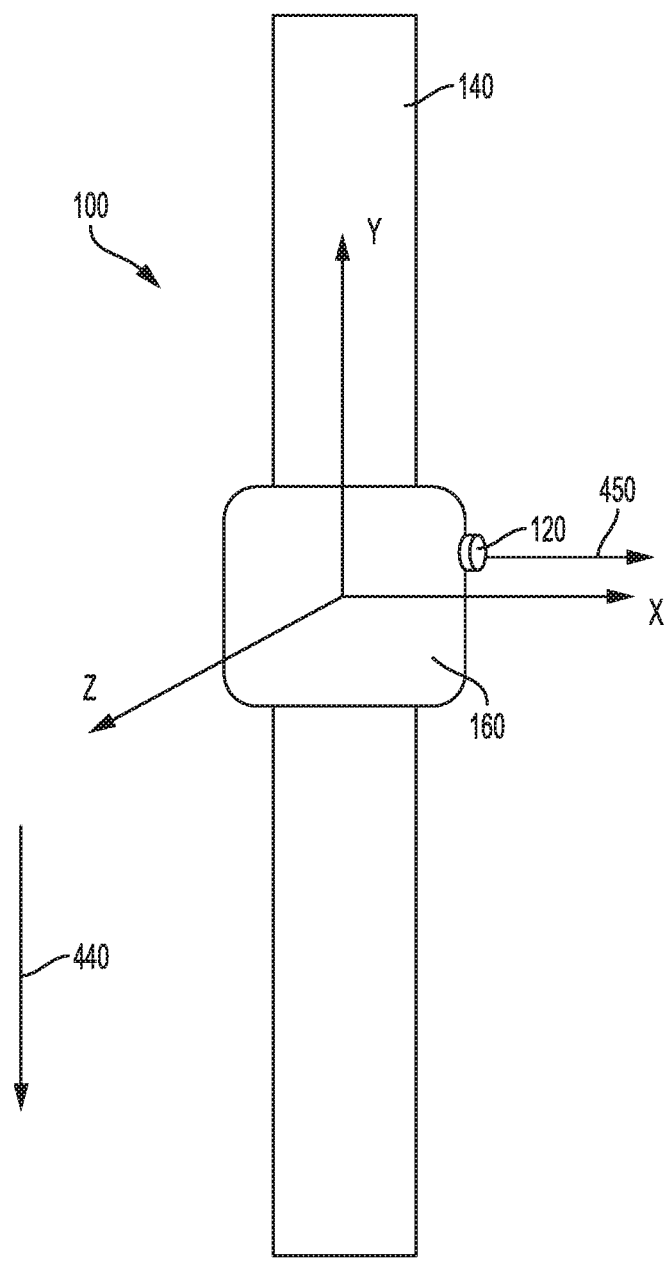
Figure 4D:
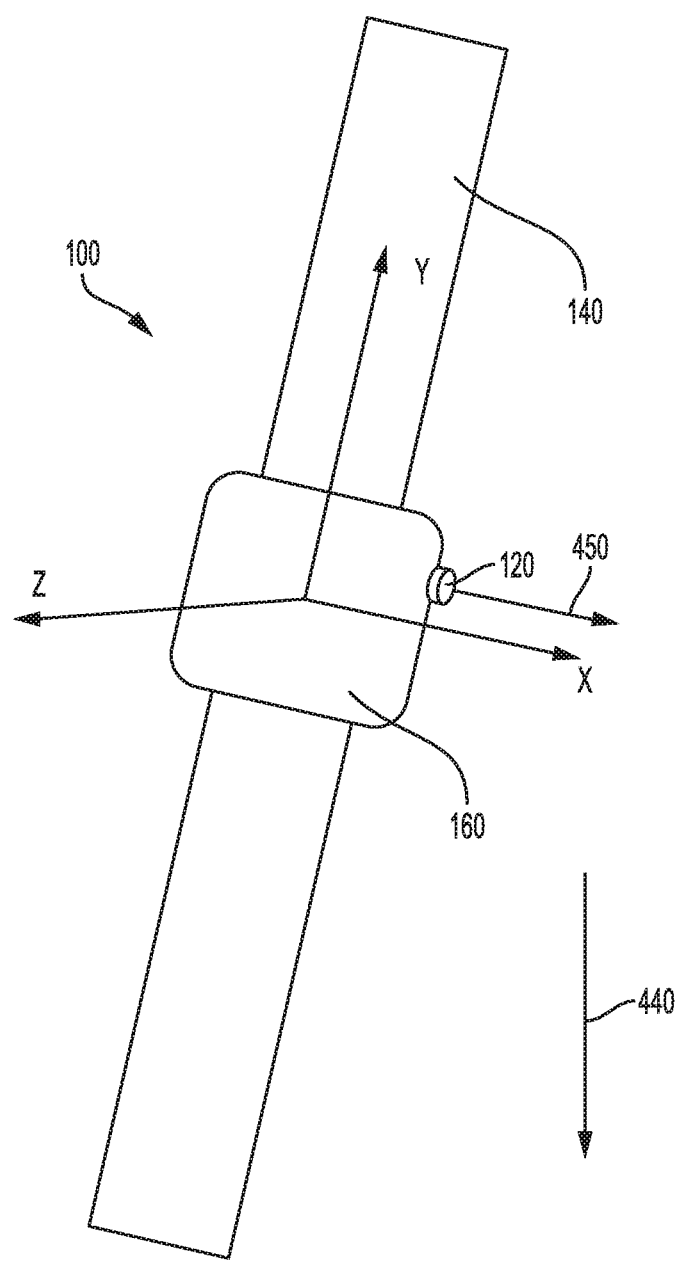

FIGS. 4B-4D illustrate examples to express one or more orientations in body-fixed frame of reference 400 according to some embodiments of the present disclosure. In FIG. 4B, an orientation/direction 410 has an angle ($\phi$) 402 with respect to the positive x-axis, an angle ($\theta$) 404 with respect to the positive y-axis, and an angle ($\psi$) 406 with respect to the positive z-axis. The direction 410 can be expressed in body-fixed frame of reference 400 as [cos($\phi$), cos($\theta$), cos($\psi$)], which is a non-limiting example/format of the first set of three dimensional rotational data. For example, direction 420 in FIG. 4B is parallel with and pointing toward the positive x-axis, so the angle ($\phi$) between direction 420 and the positive x-axis is 0-degree; the angle ($\theta$) between direction 420 and the positive y-axis is 90-degrees; and the angle ($\psi$) between direction 420 and the positive z-axis is 90-degrees. Therefore, direction 420 can be expressed as [cos(0), cos(90), cos(90)], which is [1, 0, 0]. As another example, direction 430 in FIG. 4B is parallel with and pointing toward the positive z-axis, so the angle ($\phi$) between direction 430 and the positive x-axis is 90-degrees; the angle ($\theta$) between direction 430 and the positive y-axis is 90-degrees; and the angle ($\psi$) between direction 430 and the positive z-axis is 0-degree. Therefore, direction 430 can be expressed as

[cos(90), cos(90), cos(0)], which is [0, 0, 1]. As yet another example, direction 440 represents direction of gravity in FIG. 4B and is parallel with and pointing toward the negative y-axis, so the angle (φ) between direction 440 and the positive x-axis is 90-degrees; the angle (θ) between direction 440 and the positive y-axis is 180-degrees; and the angle (ψ) between direction 440 and the positive z-axis is 90-degrees. Therefore, direction 440 can be expressed as [cos(90), cos(180), cos(90)], which is [0, −1, 0].

In FIG. 4C, wearable device 100 is held vertically. As discussed earlier, the x-axis is parallel with the direction pointed by crown 120, the y-axis is parallel with band 140, and the z-axis is perpendicular to display surface 160. Direction 450 in FIG. 4C represents the direction pointed by crown 120, so the angle (φ) between direction 450 and the positive x-axis is 0-degrees; the angle (θ) between direction 450 and the positive y-axis is 90-degrees; and the angle (ψ) between direction 450 and the positive z-axis is 90-degrees. Therefore, direction 450 can be expressed as [cos(0), cos(90), cos(90)], which is [1, 0, 0], As another example, direction 440 represents direction of gravity in FIG. 4C and is parallel with and pointing toward the negative y-axis, so the angle (φ) between direction 440 and the positive x-axis is 90-degree; the angle (θ) between direction 440 and the positive y-axis is 180-degrees; and the angle (ψ) between direction 440 and the positive z-axis is 90-degrees. Therefore, direction 440 in FIG. 4C can be expressed as [cos(90), cos(180), cos(90)], which is [0, −1, 0], In FIG. 4D, wearable device 100 is rotated 45-degrees clockwise compared with FIG. 4C. As discussed earlier, the x-axis is parallel with the direction pointed by crown 120, the y-axis is parallel with band 140, and the z-axis is perpendicular to display surface 160. Direction 450 in FIG. 4D represents the direction pointed by crown 120, so the angle (φ) between direction 450 and the positive x-axis is 0-degrees; the angle (θ) between direction 450 and the positive y-axis is 90-degrees; and the angle (ψ) between direction 450 and the positive z-axis is 90-degrees. Therefore, direction 450 can be expressed as [cos(0), cos(90), cos(90)], which is [1, 0, 0], As another example, direction 440 represents the direction of gravity in FIG. 4D. The angle (φ) between direction 440 and the positive x-axis is 45-degrees; the angle (θ) between direction 440 and the positive y-axis is 135-degrees; and the angle (ψ) between direction 440 and the positive z-axis is 90-degrees. Therefore, direction 440 in FIG. 5D can be expressed as [cos(45), cos(135), cos(0)], which is [0.707, −0.707, 0].

It is noted that the expression of direction 450 is the same in FIG. 4C and FIG. 4D even though wearable device 100 has rotated. This is because the body-fixed frame of reference 400 is always fixed with respect to wearable device 100. As a result, when the position of wearable device 100 changes, the three axes in the body-fixed frame of reference 400, as well as direction 450, change too, while the relative position between direction 450 and the three axes remain the same. On the other hand, although the direction of gravity 440 does not change in an "absolute" sense, it does change its position relative to the wearable device 100, when the wearable device 100 changes position. Therefore, the expression of gravity direction 440 does not stay fixed in the body-fixed frame of reference 400 when wearable device 100 changes position.

Figure 5:
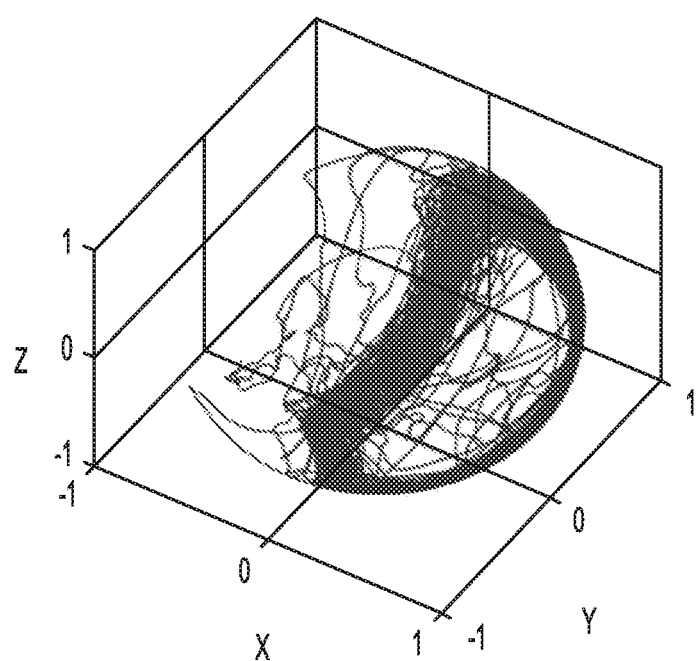
FIG. 5 illustrates a set of rotational data of a wearable device in a body-fixed frame of reference according to some embodiments of the present disclosure.

FIG. 5 illustrates a first set of rotational data of wearable device 100 according to some embodiments of the present disclosure. Specifically, FIG. 5 illustrates estimation of the gravity in the body-fixed frame of reference 400. The x-axis shows cos(φ) where φ is the angle between gravity and the positive x-axis in the body-fixed frame of reference 400. The y-axis shows cos(θ), where θ is the angle between gravity and the positive y-axis in the body-fixed frame of reference 400. The z-axis shows cos(ψ), where ψ is the angle between gravity and the positive z-axis in the body-fixed frame of reference 400. For example, if at a moment wearable device 100 is facing up toward the sky, and display surface is parallel with the ground, then the gravity direction can be expressed as [0, 0, −1]. As another example, if crown is pointed towards the ground, then the gravity direction can be expressed as [1, 0, 0]. Gravity estimation in body-fixed frame of reference can help indicate when wearable device 100 is making a pitch and/or roll movement. For example, as discussed above, when a user's wrist was in a position such that crown is pointed towards the ground, the gravity direction is [1, 0, 0]. If the user then is rolling his or her wrist up for 90-degree, then display surface of wearable device 100 is facing up toward the sky, and display surface is parallel with the ground, then the gravity direction is expressed as [0, 0, −1]. If the user then is pitching his or her wrist up for 90-degree, then crown of wearable device 100 is facing up toward the sky, and the gravity direction is expressed as [−1, 0, 0]. These examples illustrate that gravity direction in the body-fixed frame of reference 400 can change in response to pitch and/or roll movement. In some embodiments, the gravity estimation in body-fixed frame of reference 400 can be used together with accelerometer 260 to estimate gravity. However, the gravity direction in the body-fixed frame of reference 400 does not change in response to yaw movement. For example, if wearable device 100 is facing up toward the sky, and display surface is parallel with the ground, then the gravity direction is expressed as [0, 0, −1]; then if the user making yaw movement along the horizon plane, the gravity direction remains as [0, 0, −1]. Also, as discussed above, because wearable device 100 is rotating the same as the body-fixed frame of reference 400, the directions of wearable device 100 and components thereof are fixed. For example, no matter whether crown is pointing up, straight, or down, the crown direction is always expressed in body-fixed frame of reference 400 as [1, 0, 0]. Therefore, in some embodiments, it is more suitable to express the positions of wearable device 100 in a frame of reference that is not body-fixed in order to more readily indicate the movements of wearable device 100 with respect to external references.

Figure 6:
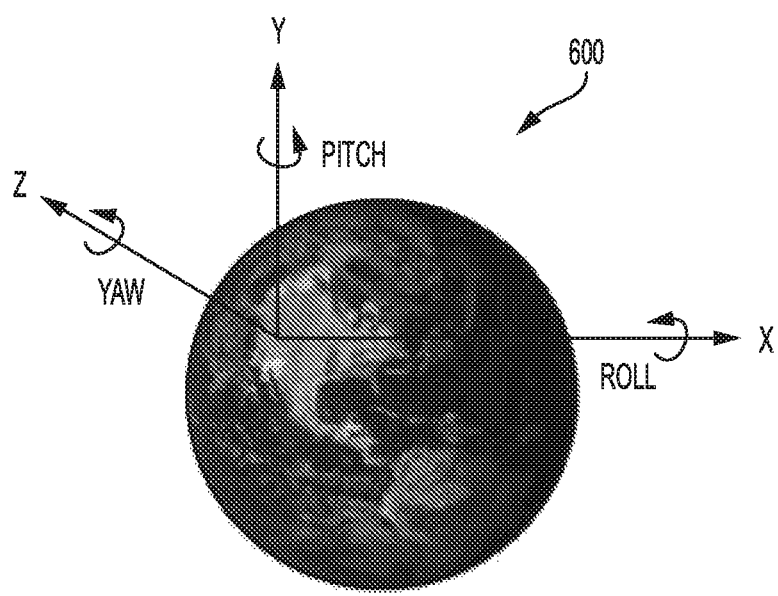
FIG. 6 illustrates an example of an inertial frame of reference according to some embodiments of the present disclosure.

FIG. 6 illustrates an inertial frame of reference 600 according to some embodiments of the present disclosure. In FIG. 6, the z-axis (or the yaw axis) is based on the direction of gravity. The x-axis (or the roll axis) and the y-axis (or the pitch axis) can be chosen relatively arbitrarily as long as the three axes are perpendicular to each other.

Figure 7A:
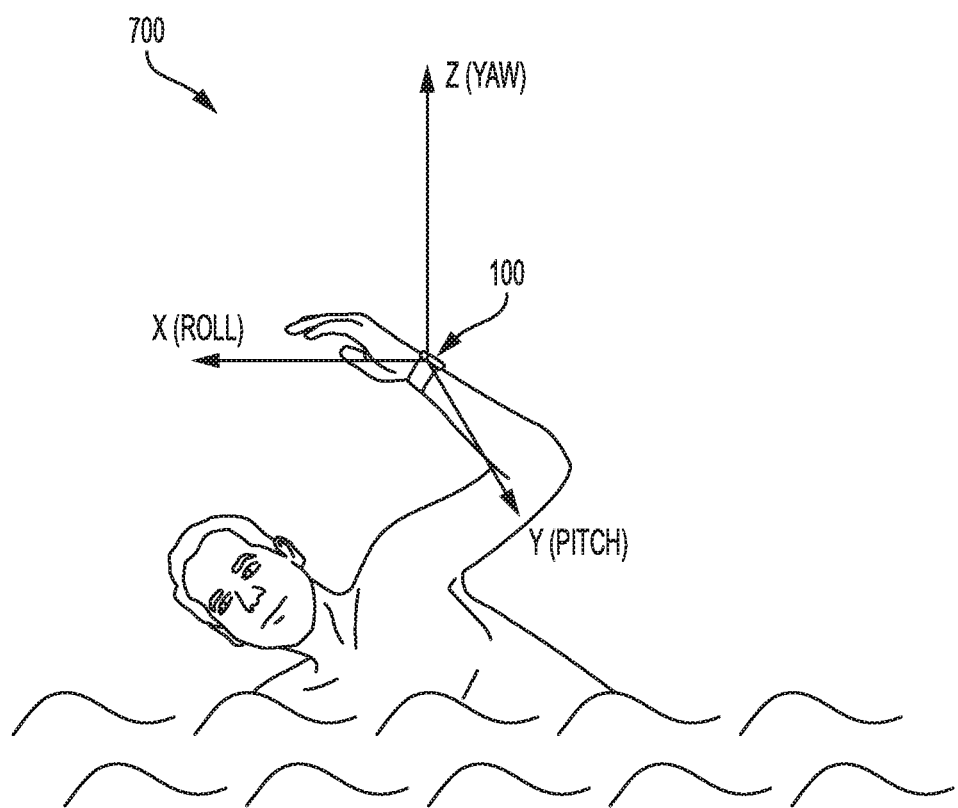
FIGS. 7A-7D illustrate examples of an inertial frame of reference according to some embodiments of the present disclosure.

FIGS. 7A-7D illustrate an example of an inertial frame of reference 700 according to some embodiments of the present disclosure. FIG. 7A depicts inertial frame of reference 700 in a context where a user is swimming. In FIG. 7A, the user wears wearable device 100. But the z-axis (or the yaw axis) in the inertial frame of reference is based on the direction of gravity rather than the wearable device itself. Additionally, assuming the user is swimming laps, the x-axis (or the roll axis) is substantially parallel to the direction of the laps, and the y-axis (or the pitch axis) is perpendicular to the other two axes. In some embodiments, the x-axis (or the roll axis) and the y-axis (or the pitch axis) can be chosen relatively arbitrarily as long as the three axes are perpendicular to each other. In FIG. 7A, the z-axis is also referred to as yaw axis because any yaw movement rotates around the z-axis. Similarly, the x-axis is also referred to as roll axis because any roll movement rotates around the x-axis. And the y-axis is also referred to as pitch axis because any pitch movement rotates around the y-axis. By knowing the difference between the three-axis in the fixed-body frame of reference 400 and the three-axis in the inertial frame of reference 700, the rotational data expressed in the fixed-body frame of reference 400 can be converted into the rotational data expressed in the inertial frame of reference 700 using techniques appreciated by people skilled in the art such as the one discussed in Sabatini.

Figure 7B:
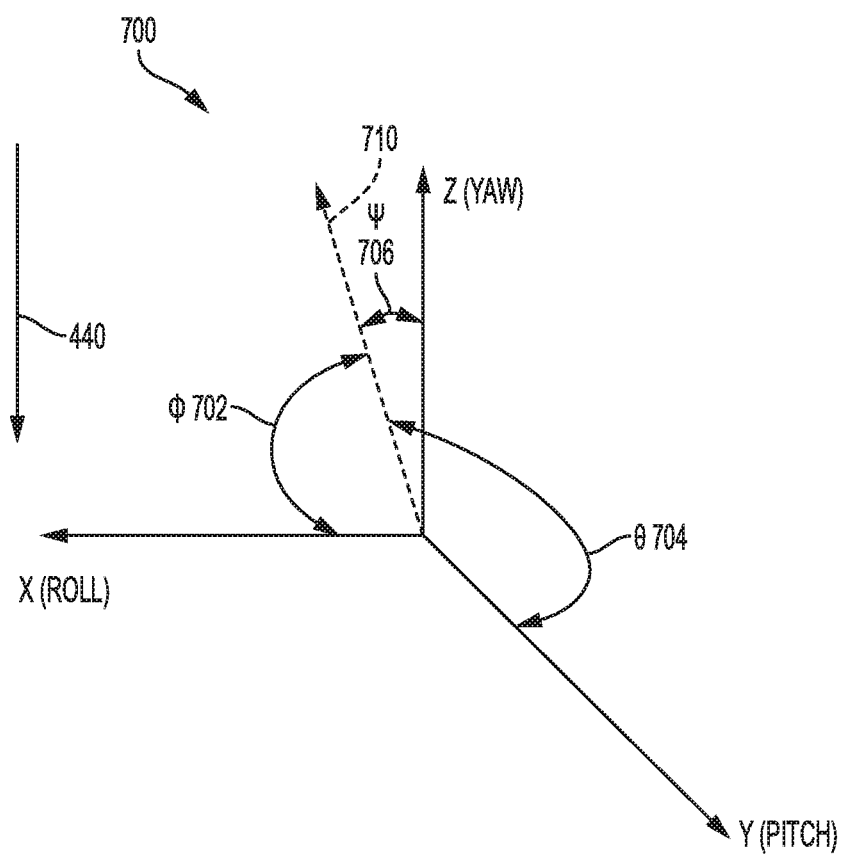

FIG. 7B illustrates that wearable device 100 can make rotational movement with respect to inertial frame of reference 700. In FIG. 7B, an orientation/direction 710 has an angle ($\phi$) 702 with respect to the positive x-axis, an angle ($\theta$) 704 with respect to the positive y-axis, and an angle ($\psi$) 706 with respect to the positive z-axis. The direction 710 can be expressed in body-fixed frame of reference 700 as [$\cos(\phi)$, $\cos(\theta)$, $\cos(\psi)$], which is a non-limiting example/format of the second set of rotational data.

Figure 7C:
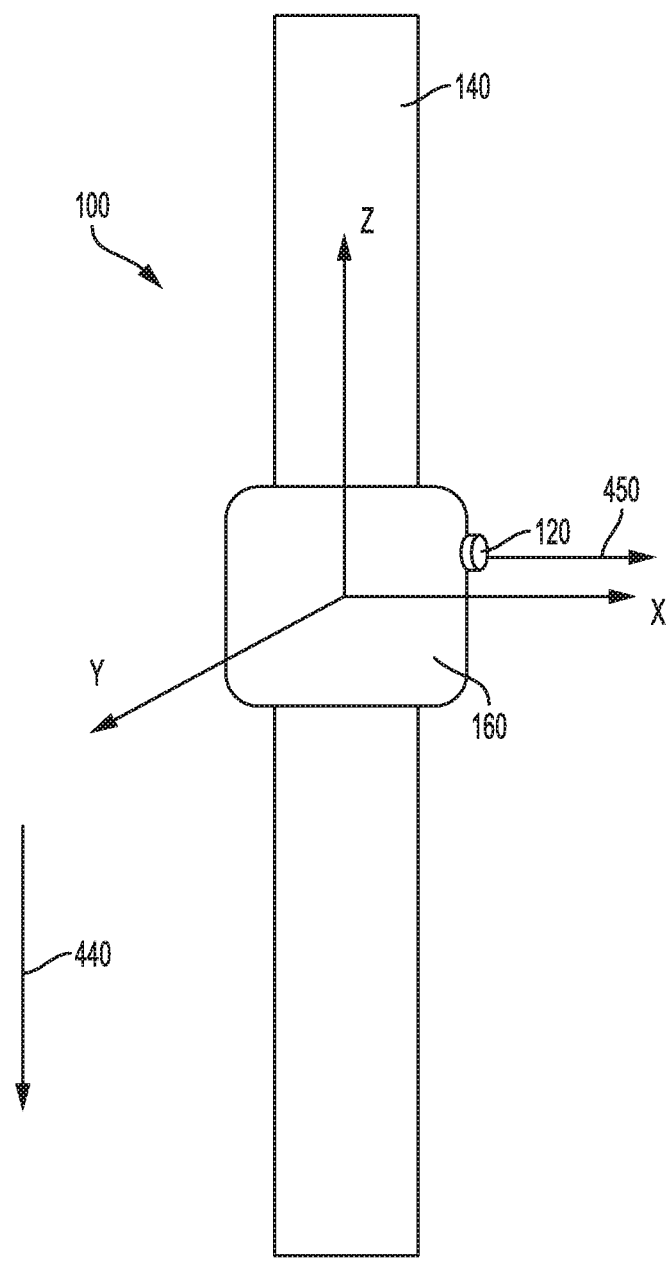
Figure 7D:
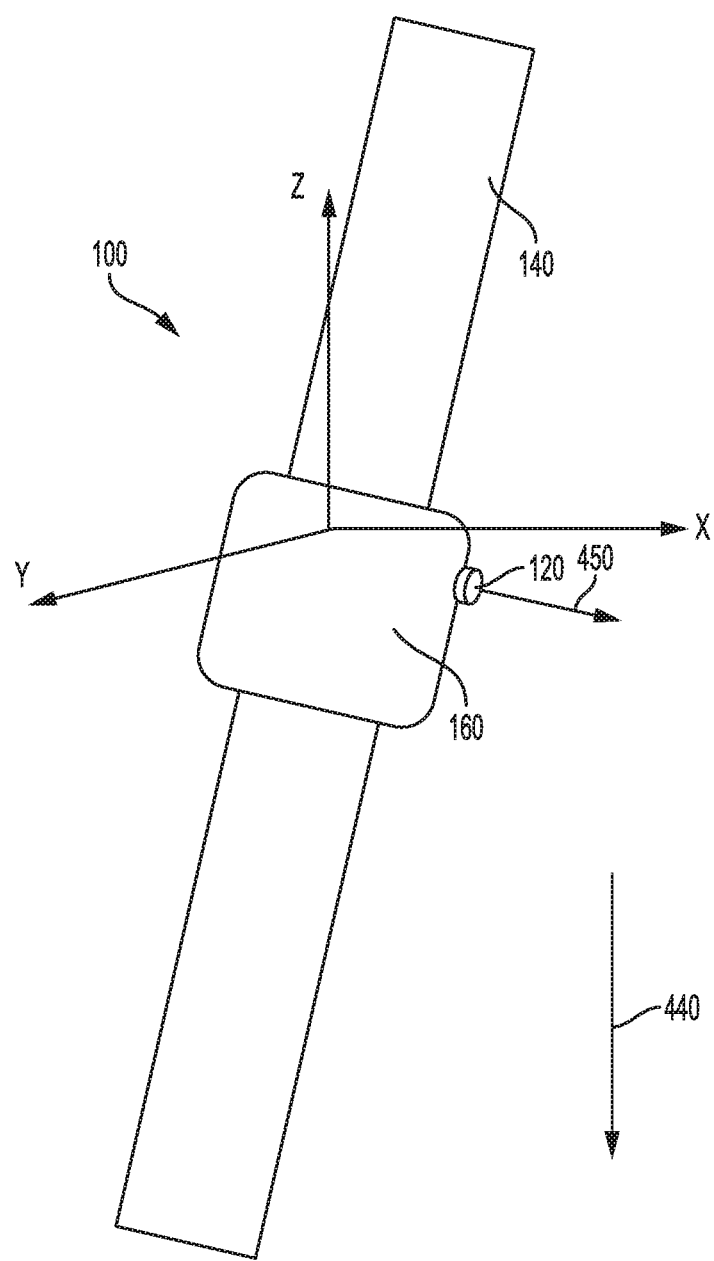

FIGS. 7C and 7D illustrate how same orientations in FIGS. 4C and 4D can be expressed differently in inertial frame of reference 700. In FIG. 7C, wearable device 100 is held vertically, which is the same as FIG. 4C. As discussed earlier, the z-axis is based on the gravity in inertial frame of reference 700. In FIG. 7C, the positive z-axis is chosen as the direct opposite position of gravity, the x-axis is perpendicular to the z-axis and pointing right horizontally, and the y-axis is perpendicular to both x-axis and y-axis and pointing "out" of FIG. 7C. Direction 450 in FIG. 7C represents the direction pointed by crown 120, so the angle ($\phi$) between direction 450 and the positive x-axis is 0-degree; the angle ($\theta$) between direction 450 and the positive y-axis is 90-degree; and the angle ($\psi$) between direction 450 and the positive z-axis is 90-degree. Therefore, direction 450 can be expressed as [$\cos(0)$, $\cos(90)$, $\cos(90)$], which is [1, 0, 0]. As another example, direction 440 represents direction of gravity in FIG. 7C and is parallel with and pointing toward the negative z-axis, so the angle ($\phi$) between direction 440 and the positive x-axis is 90-degree; the angle ($\theta$) between direction 440 and the positive y-axis is 90-degree; and the angle ($\psi$) between direction 440 and the positive z-axis is 180-degree. Therefore, direction 440 in FIG. 7C can be expressed as [$\cos(90)$, $\cos(90)$, $\cos(180)$], which is [0, 0, −1].

In FIG. 7D, wearable device 100 is rotated 45-degree clockwise compared with FIG. 7C. Because the three axes are based on gravity, they can remain the same as FIG. 7C. Direction 450 in FIG. 7D represents the direction pointed by crown 120, and the angle ($\phi$) between direction 450 and the positive x-axis is 45-degree; the angle ($\theta$) between direction 450 and the positive y-axis is 90-degree; and the angle ($\psi$) between direction 450 and the positive z-axis is 135-degree. Therefore, direction 450 can be expressed as [$\cos(45)$, $\cos(90)$, $\cos(135)$], which is [0.707, 0, −0.707]. As another example, direction 440 represents direction of gravity in FIG. 7D. The angle ($\phi$) between direction 440 and the positive x-axis is 90-degree; the angle ($\theta$) between direction 440 and the positive y-axis is 90-degree; and the angle ($\psi$) between direction 440 and the positive z-axis is 180-degree. Therefore, direction 440 in FIG. 7D can be expressed as [$\cos(90)$, $\cos(90)$, $\cos(180)$], which is [0, 0, −1].

It is noted that the expression of gravity direction 440 is the same in FIG. 7C and FIG. 7D even though wearable device 100 has rotated. This is because the inertial frame of reference 700 is always fixed with respect to gravity. As a result, when position of wearable device 100 changes, the three axes in inertial frame of reference 700 do not move along. On the other hand, the direction 450 does move with respect to the three axes, so the expression of direction 450 can be changed in the inertial frame of reference 400 even though it is fixed in body-fixed frame of reference 400.

Figure 8:
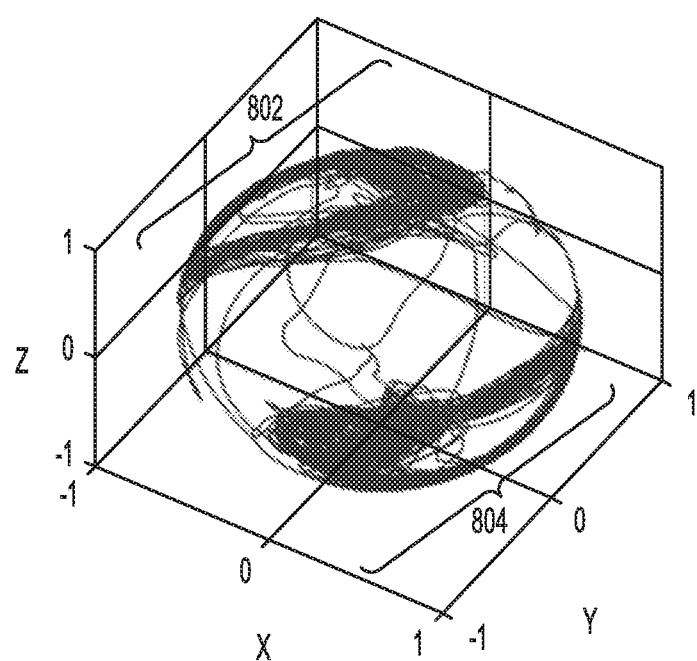
FIG. 8 illustrates a set of rotational data of a wearable device in an inertial frame of reference according to some embodiments of the present disclosure.

FIG. 8 illustrates a first set of rotational data of wearable device 100 according to some embodiments of the present disclosure. Specifically, FIG. 8 illustrates estimation of crown direction in the inertial frame of reference 700 while a user is swimming laps. The x-axis shows $\cos(\phi)$, where $\phi$ is the angle between crown direction and the positive x-axis in the inertial frame of reference 700. The y-axis shows $\cos(\theta)$, where $\theta$ is the angle between crown direction and the positive y-axis in the inertial frame of reference 700. The z-axis shows $\cos(\psi)$, where $\psi$ is the angle between crown direction and the positive z-axis in the inertial frame of reference 700. For example, if at a moment wearable device 100 is facing up toward the sky, display surface is parallel with the ground, and crown is toward the positive x-axis, then the crown direction can be expressed as [1, 0, 0]; if wearable device 100 is making a yaw movements, and crown is toward the negative x-axis, then the crown direction can be expressed as [−1, 0, 0]. As another example, if crown is pointed towards the ground, then the crown direction can be expressed as [0, 0, 1]. The rotational data in FIG. 8 are largely divided into two clusters, 802 and 804, because every time the user makes a turn, the angle $\phi$ between crown direction and the positive x-axis in the inertial frame of reference 700 changes substantially around 180-degree. Therefore, rotational data expressed in FIG. 8 can indicate wearable device 100 undergoes a steady-state change in heading when the data are switching from cluster 802 to cluster 804, or vice versa.

Figure 9:
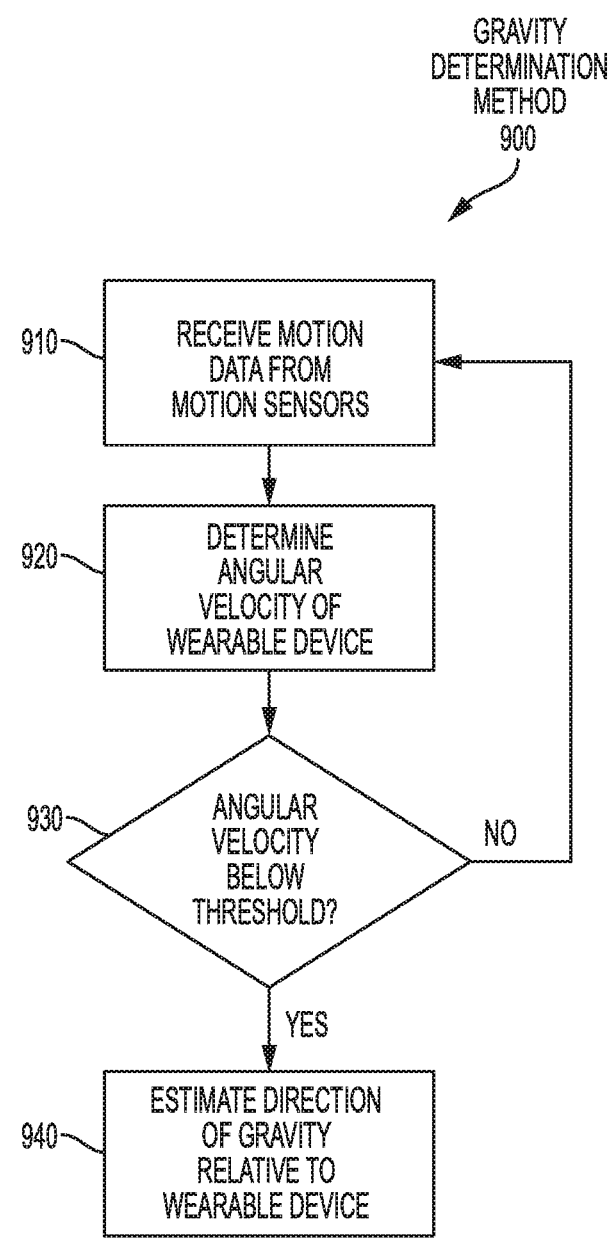
FIG. 9 illustrates a method of determining a direction of gravity according to some embodiments of the present disclosure.

FIG. 9 shows a method 900 for determining a direction of gravity according to some embodiments of the present disclosure. Knowing the direction of gravity is important to determine a frame of reference for motion information, such as rotational data, of wearable device 100. In some embodiments, method 900 can be modified by, for example, having steps combined, divided, rearranged, changed, added, and/or removed. Gravity determination method 900 may begin at step 910.

At step 910, motion information may be received from the one or more motion sensors 240 on a wearable device (e.g., wearable device 100) of a user. In some embodiments, motion information may include three-dimensional rotational information from one or more sensors 240 such as gyroscope 250 and three-dimensional acceleration information from one or more sensors 240 such as accelerometer 260.

At step 920, the angular velocity of wearable device 100 may be determined with respect to a frame of reference such as a body-fixed frame of reference or an inertial frame of reference.

At step 930, the gravity determination method 900 may determine whether the angular velocity of wearable device 100 determined at step 920 is below a threshold. For example, the threshold may be approximately 0.05 radians per second, 0.2 radians per second, or 0.5 radians per second, etc. If the angular velocity exceeds the threshold (e.g., when the user is doing exercise), the gravity determination method 900 may return to step 910. In some embodiments, the gravity determination method 900 may pause or wait for a period of time (e.g., 1 second, 5 seconds, 1 minute, etc.) before proceeding at step 910.

If the angular velocity is below the threshold (e.g., when the user is relatively still), the gravity determination method 900 may proceed to step 940. In some embodiments, at step 930 wearable device 100 also determines if the magnitude of forces acting on wearable device 100 are approximately equal to the normal force of gravity (1G) before proceeding to step 940. If the magnitude is not approximately the normal magnitude, the gravity determination method 900 may also return to block 910. Estimating direction of gravity when the angular velocity is below the threshold (e.g., when the user is relatively still) is important because in that way wearable device 100 will not be interfered or confused by acceleration due to other movements. Hypothetically, if wearable device 100 is having a 1 g acceleration along x-axis, then wearable device 100 may have mistaken the direction of gravity.

At step 940, the direction of gravity relative to wearable device 100 may be estimated. For example, in some embodiments, when wearable device 100 is held relatively still, accelerometer 260 within wearable device 100 may provide data about the direction of forces acting on wearable device 100, which may be attributable primarily to gravity. In some embodiments, gravity determination method 900 may also determine whether the user wearing wearable device 100 is accelerating (e.g., speeding up or slowing down) or traveling at an approximately constant velocity so as to further improve the estimate of the direction of gravity.

In some embodiments, gravity determination method 900 may end after outputting the estimated direction of gravity. In other embodiments, the gravity determination method 900 may return to step 910 to refine or otherwise repeat the method of estimating the direction of gravity relative to the wearable device.

Figure 10:
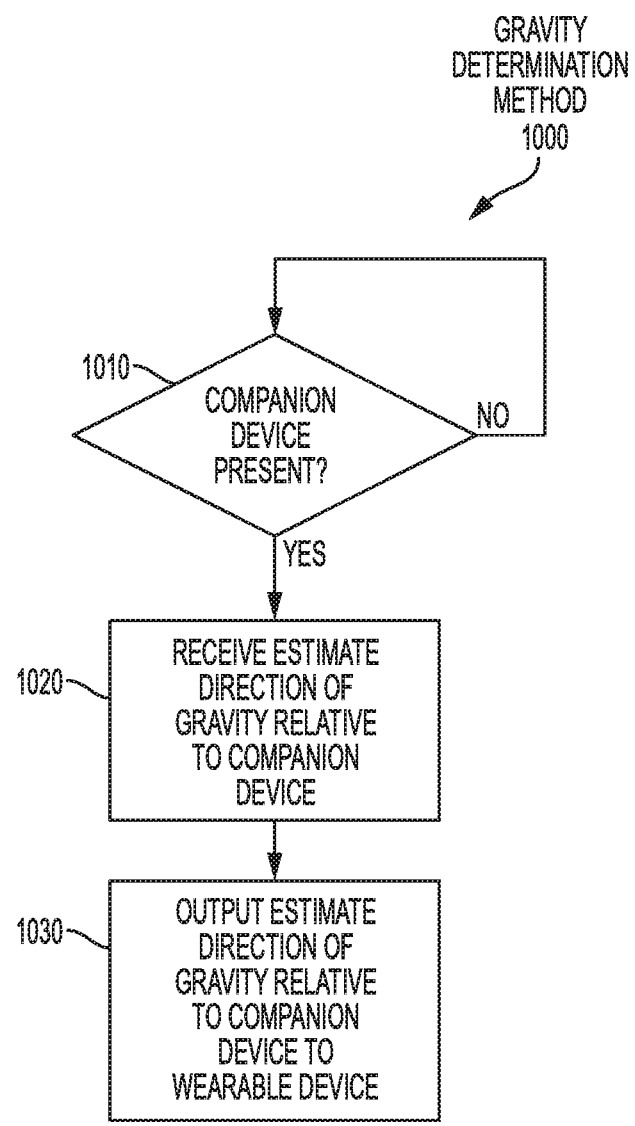
FIG. 10 illustrates a method of determining a direction of gravity according to some embodiments of the present disclosure.

FIG. 10 shows a method 1000 for determining a direction of gravity according to some embodiments of the present disclosure. In some embodiments, the method 1000 can be modified by, for example, having steps combined, divided, rearranged, changed, added, and/or removed. Gravity determination method 1000 can be used when the user has companion device 300 and may begin at step 1010.

At step 1010, gravity determination method 1000 may periodically or continuously check for the presence of a companion device (e.g., companion device 300). For example, in some embodiments, wearable device 100 may determine whether a connection (e.g., Bluetooth, IEEE 802.11 Wi-Fi, or other wireless or wired communication channel) has been established or may be established with companion device 300. If the companion device 300 is present, gravity determination method 1000 may proceed to step 1020.

At step 1020, the direction of gravity relative to companion device 300 may be estimated. In some embodiments, in contrast to the gravity determination method 1000, it may not be necessary to check whether the angular velocity of companion device 300 is below a threshold because most or all of rotation of the angular velocity of companion device 300 may be orthogonal to the direction of gravity.

At step 1030, the direction of gravity relative to companion device 300 may be outputted. In some embodiments, the direction of gravity relative to companion device 300 may be combined or otherwise compared with the direction of gravity relative to wearable device 100. In some embodiments, companion device 300 may further determine a rotation rate around the direction of gravity relative to the companion device and output the rotation rate instead of or in addition to the direction of gravity relative to companion device 300.

In some embodiments, gravity determination method 1000 may end after outputting the estimated direction of gravity. In other embodiments, gravity determination method 1000 may return to step 1010 to refine or otherwise repeat the method of estimating the direction of gravity relative to the wearable device.

Determining Arm Swing Motion

Figure 11:
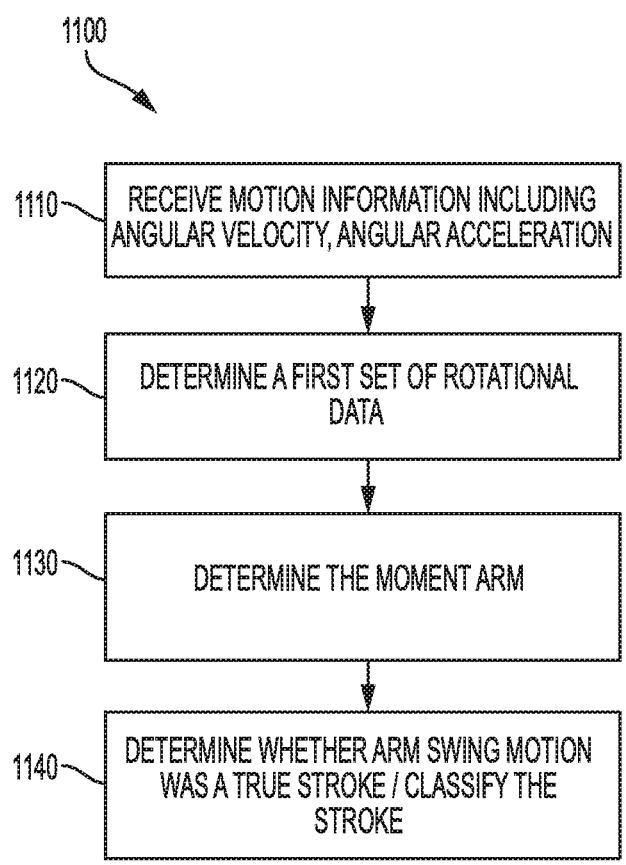
FIG. 11 illustrates a method of determining a user's moment arm according to some embodiments of the present disclosure.
Figure 12:
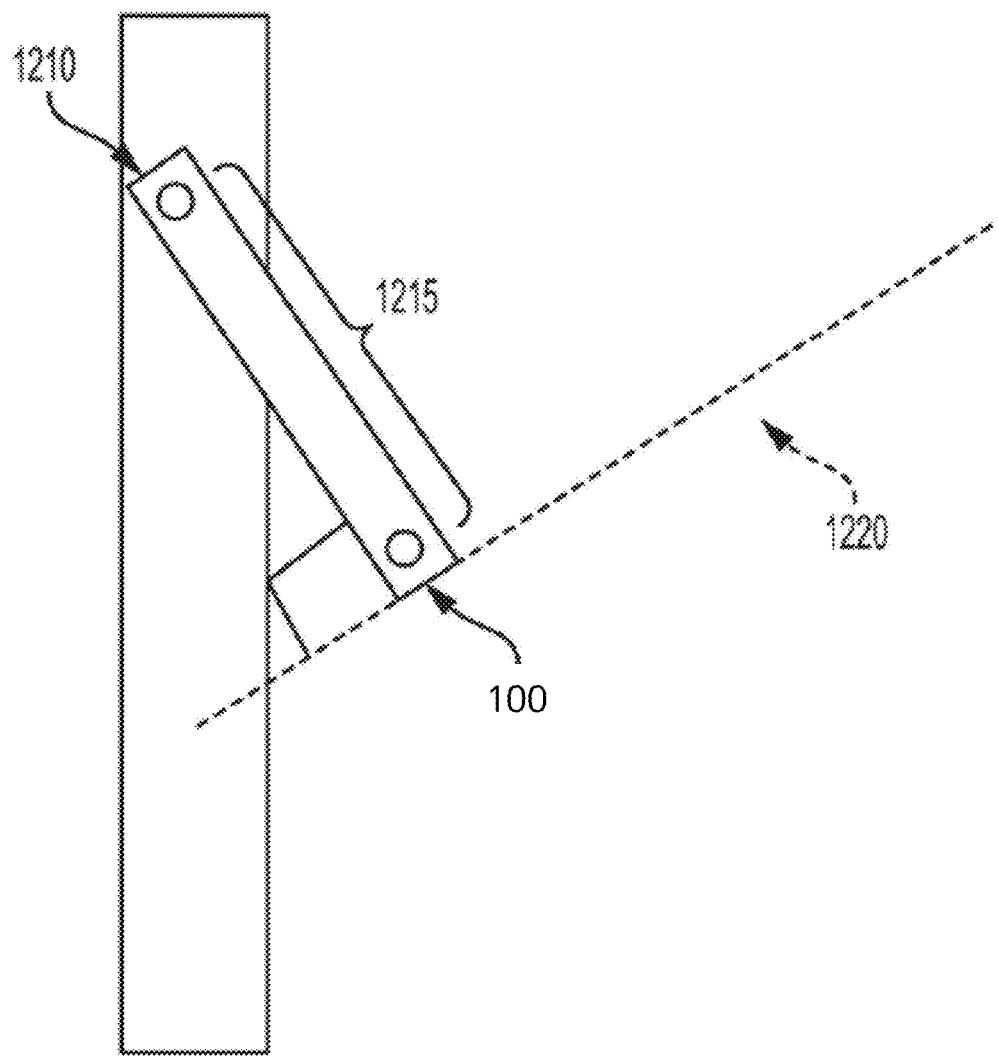
FIG. 12 illustrates an example of a moment arm length according to some embodiments of the present disclosure.

FIG. 11 shows a flow chart illustrating a process 1100 of determining whether a user's arm swing motion is a genuine swim stroke or an incidental motion according to some embodiments of the present disclosure. In some embodiments, the method includes the steps of receiving motion information from one or more motion sensors 240 (step 1110). In some embodiments, the process 1100 can be modified by, for example, having steps combined, divided, rearranged, changed, added, and/or removed.

At step 1110, wearable device 100 receives three dimensional motion information from a motion sensor 240. At step 1120, the wearable device 100 determines a first set of three dimensional rotational data of the wearable device 100. Rotational data can include angular velocity and angular acceleration.

Angular velocity can be expressed by Eq. 1 below:

$$\omega = [\text{rad/s}] \qquad \text{Eq. 1.}$$

Angular acceleration can be represented by Eq. 2 below:

$$\alpha = \Delta\omega/\Delta t \qquad \text{Eq. 2.}$$

In some embodiments, the rotational data is received from gyroscope 250 and is expressed in a body-fixed frame of reference with respect to wearable device 100.

The motion information can also include acceleration measurements of wearable device 100 in up to three-dimensions. The acceleration measurements can be a combination of the radial and tangential acceleration and can be expressed by Eq. 3 below:

$$a = \omega \times (\omega \times r) + (\alpha \times r) \qquad \text{Eq. 3}$$

r=moment arm

In some embodiments, the acceleration measurements are received from accelerometer 260 and are expressed in a body-fixed frame of reference with respect to wearable device 100.

At step 1130, based on the rotational data received from the gyroscope and the acceleration measurements received from the accelerometer, the moment arm can be computed. In some embodiments, for example as shown in FIG. 12, the moment arm 1215, computed by wearable device 100, represents the extension of the arm from the shoulder joint 1210. As shown in FIG. 12, the moment arm 1215 is the perpendicular distance between the shoulder joint 1210 and the shoulder joint's line of force 1220. The line of force 1220 is tangential to the user's arm swing around the shoulder joint, and is constantly changing direction.

In one embodiment the moment arm is computed by taking the matrix representation of the cross product of $a = \omega \times (\omega \times r) + (\alpha \times r)$ as shown in Eq. 3. The following is the computation of the cross product of acceleration (a) to find the moment arm, r:

$$a = WWr$$

(where Wr represents the cross product of $(\omega \times r))+$Ur
(where Ur represents the cross product of $(\alpha \times r)$;

$$a = (WW+U)r$$

We can solve for r by solving the Least-Squares equation for r, for example, by using the Moore Penrose pseudoinverse.

The moment arm can be normalized (N) by taking several samples of accelerometer and gyroscope measurements and finding the average, which can be represented by the equations below:

$$a_N = (WW+U)_N r$$

$$r_N = (WW+U)_N \backslash a_N$$

The computed length of the moment arm represents the user's arm extension, and can be used to determine whether the swimmer's arm swing motion was incidental or a genuine swimming stroke. For example, a user's incidental arm swing generally rotates around the user's elbow joint or wrist, whereas the user's genuine swim stroke generally rotates around the user's shoulder. Therefore, an incidental arm swing will have a shorter moment arm length than a genuine swim stroke. As a result, the larger the moment arm length, the more likely the user's arm swing motion is a genuine swim stroke.

At step 1140, based on the computed moment arm, the wearable device can determine whether the swimmer's arm swing motion was a true swimming stroke and/or classify the arm swing motion as a specific type of swim stroke. Swim stroke types can include freestyle, butterfly, back stroke and breast stroke. In one embodiment, the wearable device stores training data that associates a moment arm length minimum threshold with a true swim stroke. The wearable device can compare the computed moment arm length with the stored threshold, and if the computed arm length is greater than the stored threshold, then the user's arm swing motion is determined to be a true stroke. The training data can be customized for a particular swimmer based on gender, age, or swimming level and/or other suitable characteristic. In some embodiments, the set of training data are observed from training sessions of the swimmer.

For example, a moment arm of less than 5 cm is very likely not a stroke, and a moment arm greater than 25 cm is very likely a stroke. However, between 5-25 cm, the arm swing is likely a stroke, but different levels of confidence will be associated with each length.

Figure 13:
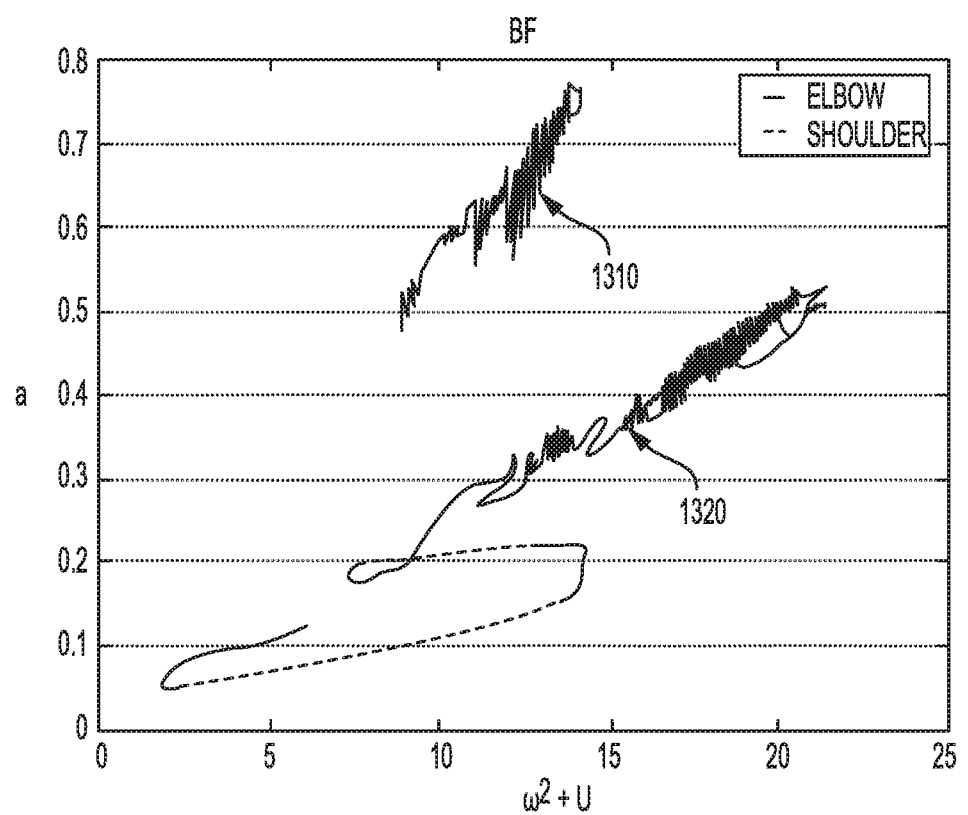
FIG. 13 illustrates motion data of a wearable device in a body-fixed frame of reference according to some embodiments of the present disclosure.

FIG. 13 illustrates a first set of rotational data, including acceleration data, of wearable device 100 for a suitable period of time according to some embodiments of the present disclosure, e.g., 60 seconds. Specifically, FIG. 13 illustrates a first set of rotational data of wearable device 100 worn on a user's wrist during a swimming session, and the first set of rotational data is expressed in the body-fixed frame of reference as described in connection with FIGS. 4A-4D. The x-axis represents WW+u and is measured in $rad^2/s^2$, and the y-axis represents acceleration normalized by gravity and is measured in $m/s^2$.

The time period can be set by a user or the time period can be fixed. In some embodiments, the time period is proportional to a period that the user needs to complete several strokes. The wearable device 100 can dynamically set the time period based on average duration of user's strokes detected by wearable device 100. For example, if it takes a user three seconds to finish a stroke, then the time period can be set to nine seconds. In some embodiments, wearable device 100 can do sub-stroke measurements (e.g., 250 ms) or multi-stroke measurements (e.g., 6-9 seconds). A sub-stroke measurement tends to provide a near real-time measurement, but can be a noisy estimate. While a multi-stroke measurement provides an "average" estimate of moment arm.

In the embodiment shown in FIG. 13, the rotational data, including acceleration data, is measured from two sessions of arm swings: one session of arm swings is rotating around the shoulder joint, as shown by the cluster of dots 1310 that appear at the top of the graph, and the other session of arm swing is rotating around elbow joint, as shown by the cluster of dots 1320 that appear at the bottom of the graph. The slope of the data that is measured from the arm swings around the shoulder joint is steeper than the slope of the data measured from the arm swings around the elbow joint. In this embodiment, the steepness of the slope corresponds to the length of the moment arm. In other words, the steeper the slope, the greater the length of the moment arm. Typically, for a swim stroke, the moment arm length will be greater from the shoulder joint (as represented in FIG. 13 by the steeper slope of dot cluster 1310) than the elbow joint. If the rotation of the arm swing occurs solely around the shoulder, then the moment arm is calculated from the wrist to the shoulder. If the rotation of the arm swing occurs solely around the elbow, then the moment arm is calculated from wrist to elbow. If however, the arm swing motion is a combination of shoulder rotation and wrist rotation, then the combined motion can provide an approximation of the moment arm of that combined motion.

Figure 14A:
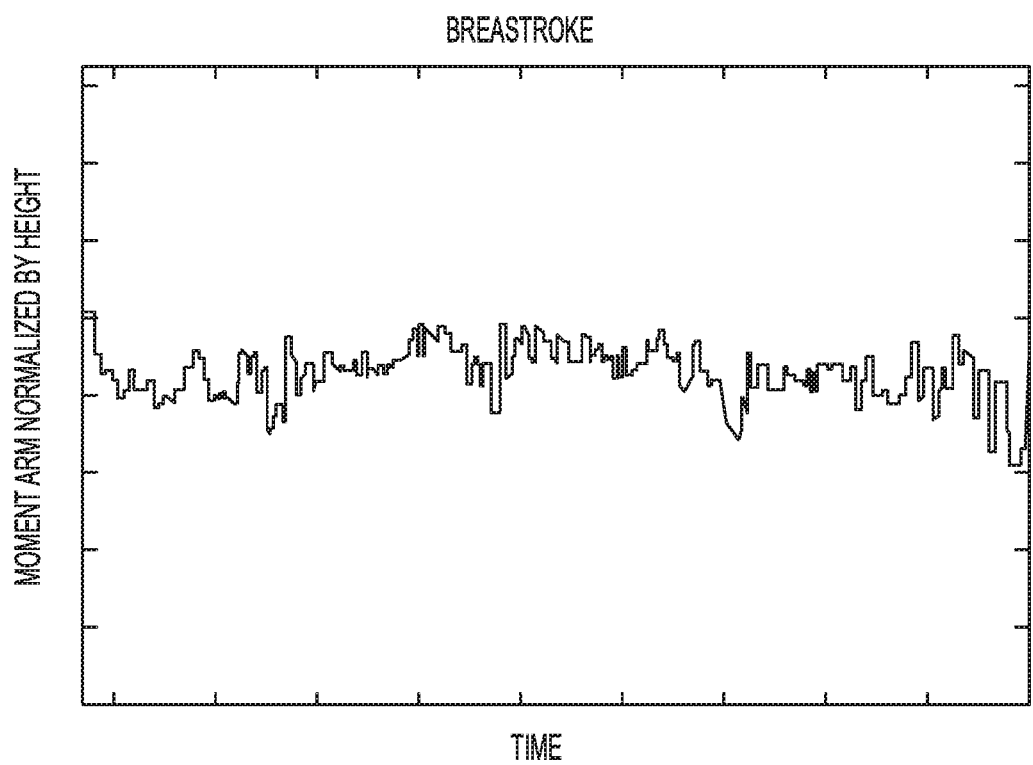
FIGS. 14A-14B illustrates exemplary moment arm calculations according to some embodiments of the present disclosure.
Figure 14B:
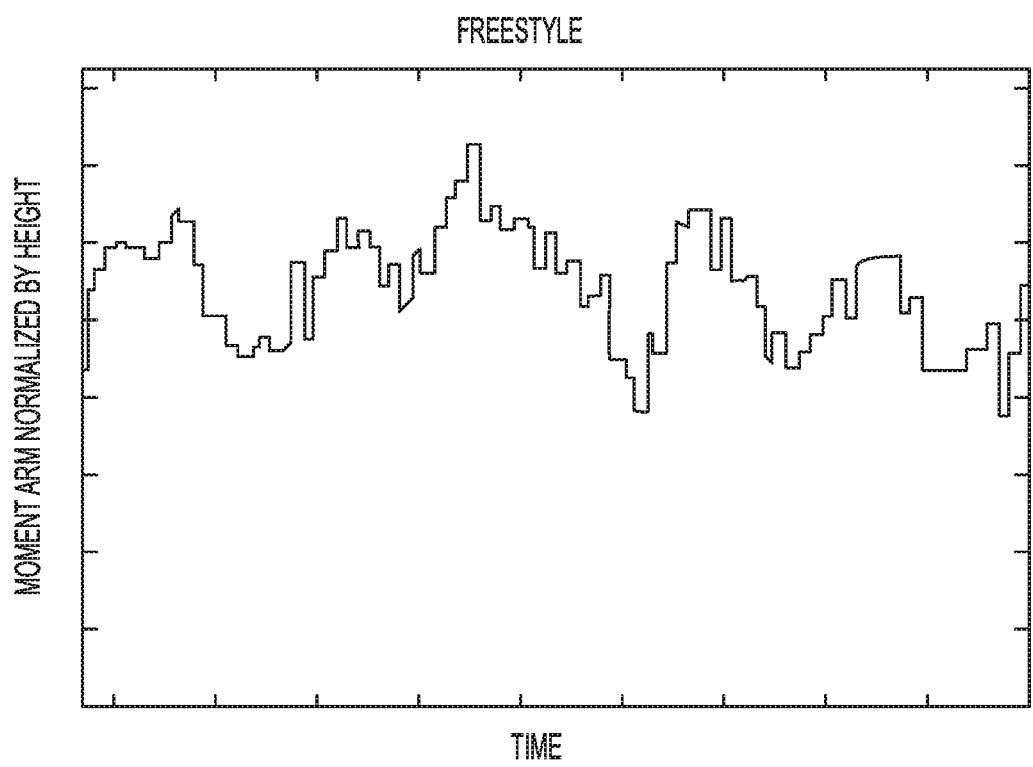

In one embodiment, the wearable device 100 stores training data that associates a moment arm length value that is characteristic of each of the different swim stroke types. The wearable device can compare the computed moment arm length with the characteristic moment arm length value to determine the type of swim stroke. The characteristic moment arm length value for each of the different swim stroke types can be customized for a particular swimmer based on gender, age, swimming level and/or other suitable characteristic. In some embodiments, the set of training data are observed from training sessions of the swimmer. FIG. 14A shows exemplary moment arm measurements characteristic of breaststroke and FIG. 14B shows exemplary moment arm measurements characteristic of freestyle.

In some embodiments, the wearable device 100 converts the first set of motion data from the motion sensors, including the rotational data from the gyroscope and the acceleration measurements from the accelerometer, into a second set of motion information. One drawback of the motion information expressed in the body-fixed frame of reference is, however, that the body-fixed frame of reference cannot readily indicate the movement and/or position of the user's arm/wrist, because the body-fixed frame of reference is with respect to wearable device 100, and wearable device 100 is changing as well while swimming.

To address this issue, wearable device 100 converts the motion data in the body-fixed frame of reference into rotational data in an inertial frame of reference using techniques appreciated by people skilled in the art such as the one discussed in "Kalman-filter-based orientation determination using inertial/magnetic sensors: observability analysis and performance evaluation," Angelo Maria Sabatini, published Sep. 27, 2011, Sensors 2011, 11, 9182-9206.

Motion Determination Using Likelihood Ratios

In many motion/fitness experiments that are conducted for trials, a proctor can tag the type of motion being performed by a user and record one or more characteristics associated with the type of motion. As the user changes the type of motion, the proctor can tag the change of the motion type as well.

For example, when a user is swimming laps back and forth, a proctor can tag when the user is actually swimming forward and when the user is turning. The proctor can also record one or more characteristics associated with the user's swimming or turning, such as speed and yaw angle. After a large number of experiments, there will be a significant amount of data detailing swimming behavior versus turning behavior. As discussed in more detail below, these training data can then be used together with the user's motion information sensed by a wearable device worn by the user to determine the user's types of motions in real time.

Figure 15:
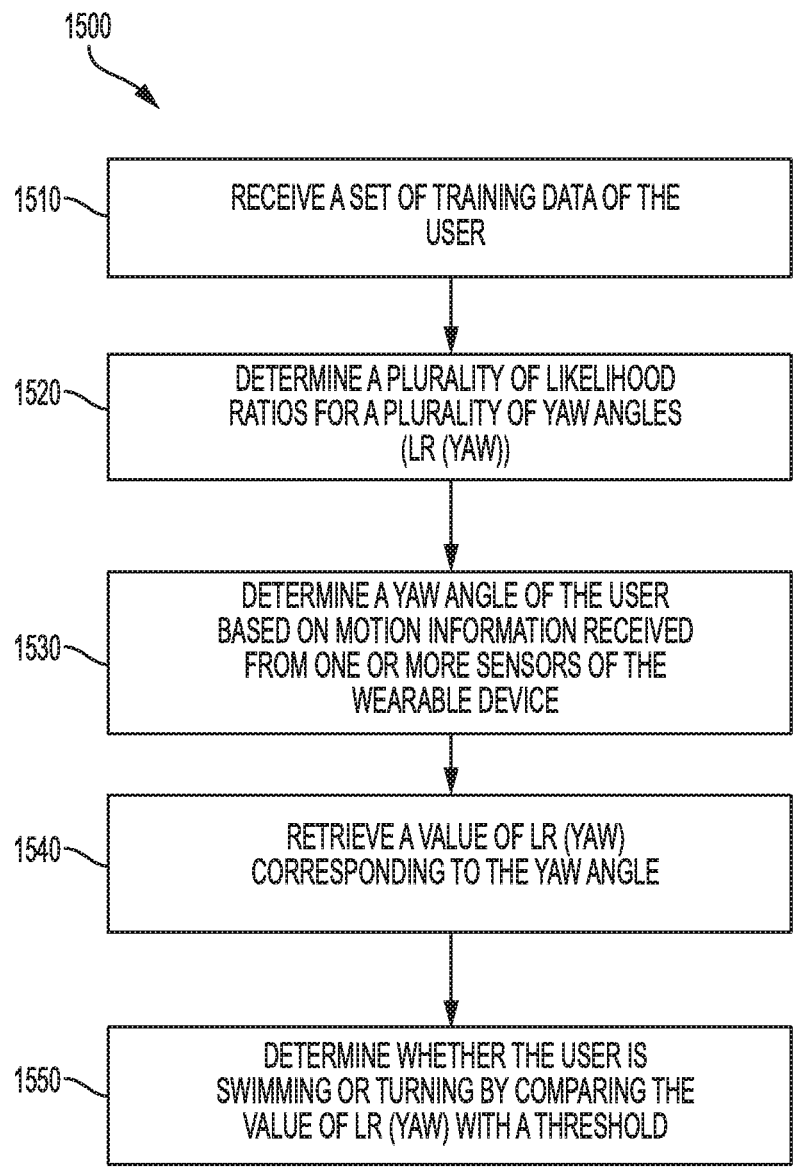
FIG. 15 illustrates a method of classifying a user's types of motions while swimming according to some embodiments of the present disclosure.

FIG. 15 shows a flow chart illustrating a process 1500 of determining whether a user is swimming or turning during a swimming session according to some embodiments of the present disclosure. In some embodiments, the process 1500 can be modified by, for example, having steps combined, divided, rearranged, changed, added, and/or removed. As described in more detail below, in some embodiments, the process 1500 can include five steps. At step 1510, wearable device 100 receives a set of training data of the user. At step 1520, based on the set of training data of the user, wearable device 100 determines a plurality of likelihood ratios for a plurality of yaw angles, LR (yaw). At step 1530, wearable device 100 determines a yaw angle of the user based on motion information received from one or more sensors 240 of wearable device 100. At step 1540, wearable device 100 retrieves a value of LR (yaw) that is corresponding to the yaw angle. At step 1550, wearable device 100 determines whether the user is swimming or turning by comparing the value of LR (yaw) with a threshold.

At step 1510, wearable device 100 receives a set of training data of the user. In some embodiments, the set of training data are observed from training sessions of the user. As discussed above, during these training sessions, a proctor can monitor the user and specify whether the user is swimming or turning. The proctor can also record certain characteristics of the user while swimming. For example, the proctor can record the user's speed and/or yaw angle. In some embodiments, a proctor is not needed; instead, by analyzing the raw data from the accelerometer and/or gyroscope, it can be determined when the user was swimming and turning. As a result, in some embodiments, the learning data can be analyzed and tagged post session.

Figure 18:
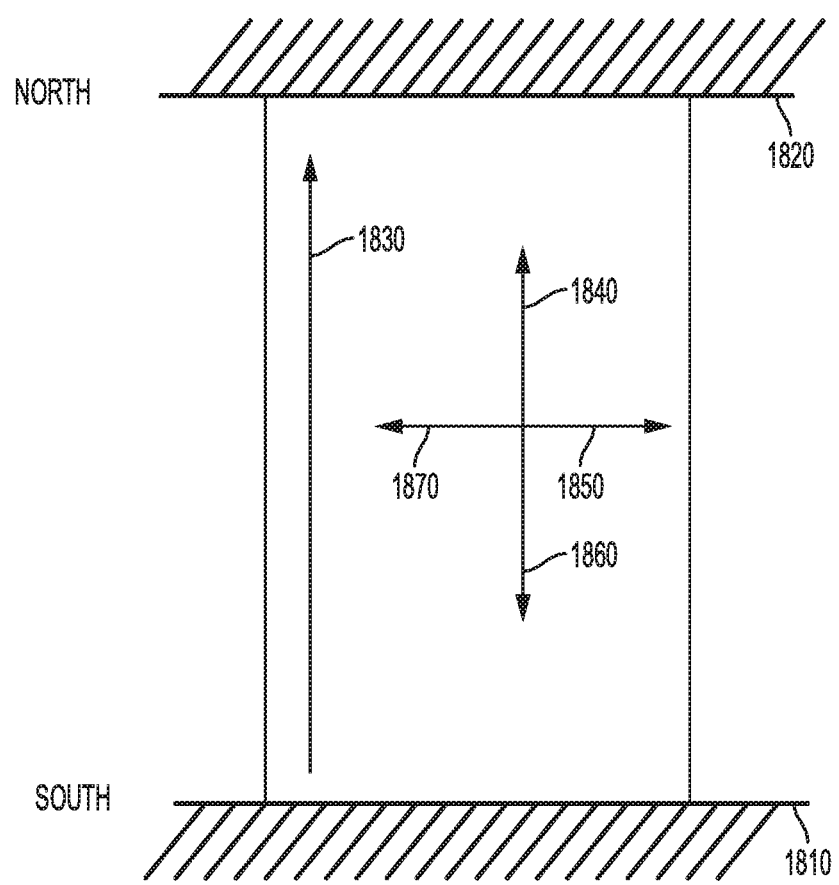
FIG. 18 illustrates yaw angles of a user while swimming according to some embodiments of the present disclosure.

The yaw angle can indicate the angle between the user's instantaneous swimming direction and the user's steady-state swimming direction. For example, FIG. 18 illustrates yaw angles of a user while swimming according to some embodiments of the present disclosure. In FIG. 18, the user is swimming a lap from the south end 1810 to the north end 1820 of a pool. The direction 1830 indicates the steady-state swimming direction of the user. The directions 1840, 1850, 1860, and 1870 indicate four scenarios of instantaneous swimming directions of the user. If the user's instantaneous swimming direction is 1840, then there is 0 degrees between direction 1840 and direction 1830, and the yaw angle of the user can be indicated as 0 degrees. If the user's instantaneous swimming direction is 1850, then there is 90 degrees clockwise from direction 1830 to direction 1850, and the yaw angle of the user can be indicated as 90 degrees. If the user's instantaneous swimming direction is 1860, then there is 180 degrees clockwise from direction 1830 to direction 1860, and the yaw angle of the user can be indicated as 180 degrees. If the user's instantaneous swimming direction is 1870, then there is 270 degrees clockwise from direction 1830 to direction 1870, and the yaw angle of the user can be indicated as 270 degrees. Other suitable ways to indicate the yaw angle can also be used. For example, in some embodiments, when the user's instantaneous swimming direction is 1870, the yaw angle can be noted as 90 degrees rather than 270 degrees to indicate there is 90 degrees counterclockwise difference from direction 1830 to direction 1870.

In some embodiments, the user's motion characteristics, such as yaw angle and/or speed, can be directly observed by the proctor during the training sessions. In some embodiments, the user's motion characteristics are observed by motion sensors 240 of wearable device 100 as described in more detail below. Because the proctor also specifies the user's motion type (for example, swimming versus turning), after one or more training sessions, one can obtain significant amount of raw data detailing swimming behavior versus turning behavior. In some embodiments, the training session can be three to five minutes. In some embodiments, the training session can be a longer duration such as 10 to 20 minutes. In some embodiments, the training session can any suitable duration. The raw data can indicate the user's yaw angle at a given moment and corresponding motion type specified by the protector. For example, the raw data can be in a format as {time tag, yaw angle, motion type}. The raw data can also include other suitable information and can be in any other suitable format. In some embodiments, a proctor is not needed; instead, by analyzing the raw data from the accelerometer and/or gyroscope, it can be determined when the user was swimming and turning. As a result, in some embodiments, the learning data can be analyzed and tagged post session.

The set of training data can then be statistically determined based on the raw data. In one embodiment, the set of training data includes a first probability distribution of a plurality of yaw angles of the user while the user is turning, P (yaw|turning), a second probability distribution of the plurality of yaw angles of the user while the user is swimming, P (yaw|swimming), and a factor, K, indicating a ratio of a first likelihood indicating the user is turning to a second likelihood indicating the user is swimming. In some embodiments, the set of training data can also include any other suitable information.

Figure 16A:
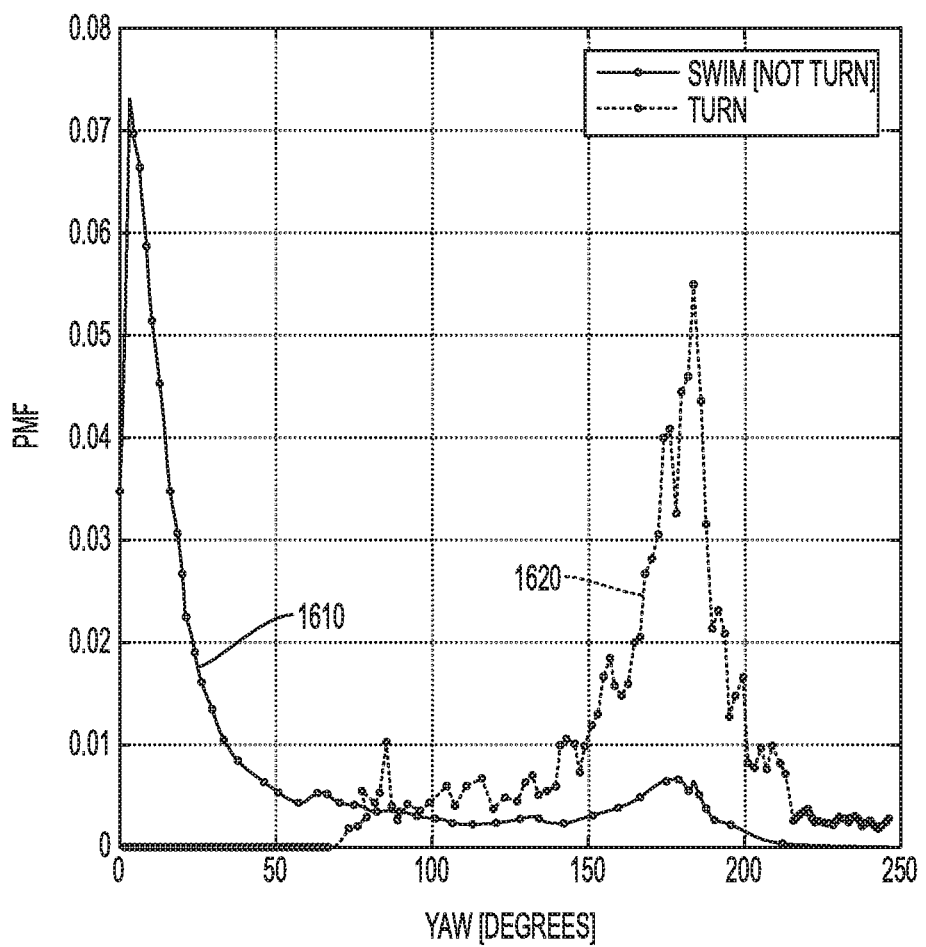
FIGS. 16A and 16B illustrate an example of classifying a user's types of motions according to some embodiments of the present disclosure.

FIG. 16A illustrates probability distributions of a plurality of yaw angles of the user while the user is swimming and turning according to some embodiments of the present disclosure. The x-axis is yaw in degrees, and the y-axis is the probability mass functions (PMF) indicating that the user is swimming and the user is turning. In FIG. 16A, the curve 1610 indicates the second probability distribution of a plurality of yaw angles of the user while the user is swimming, P(yaw|swimming). Also in FIG. 16A, the curve 1620 indicates the first probability distribution of the plurality of yaw angles of the user while the user is turning, P(yaw|turning). In FIG. 16A, P(yaw|swimming)>P(yaw|turning) when the yaw angle is less than approximately 75 degrees. This suggests that when the user is swimming, the yaw angles are more likely to be less than around 75 degrees, and when the user is turning, the yaw angles are more likely to be more than around 75 degrees. Also in FIG. 16A, P(yaw|swimming) has a maximum value at approximately 0 degree, and P (yaw|turning) has a maximum value at approximately 180 degrees. This suggests that when the user is swimming, the yaw angles are most likely around 0 degree, and when the user is turning, the yaw angles are most likely around 180 degrees.

In some embodiments, a factor, K, can indicate the ratio of a first likelihood indicating the user is swimming, P(turning) to a second likelihood indicating the user is turning, P(swimming), and can be expressed by Eq. 4.

$$K = P(\text{turning})/P(\text{swimming}) \qquad \text{Eq. 4.}$$

In some embodiments, K can be estimated based on observation from the user's training sessions. For example, when the user swims in a 100 m pool, the user may be swimming for 50 seconds, and only be turning for 5 seconds.

In this example, at any random time, the user is 10 times more likely to be swimming than turning, and K can be equal to 0.1.

Referring back to FIG. 15, at step 1520, from the set of training data including P(yaw|swimming), P(yaw|turning), and K, a plurality of likelihood ratios, LR(yaw) can be computed. In one embodiment, LR(yaw) can be expressed in Eq. 5 below.

$$LR(yaw)=P(turning|yaw)/P(swimming|yaw) \quad \text{Eq. 5}$$

In Eq. 5, P(swimming|yaw) indicates the probability distribution of the user is swimming at the plurality of yaw angles. Likewise, P(turning|yaw) indicates the probability distribution of the user is turning at the plurality of yaw angles. P(swimming|yaw) and P(turning|yaw) can be further expressed in Eqs. 6 and 7, respectively.

$$P(swimming|yaw)=P(yaw|swimming)*P(swimming)/P(yaw) \quad \text{Eq. 6}$$

$$P(turning|yaw)=P(yaw|turning)*P(turning)/P(yaw) \quad \text{Eq. 7}$$

From Eqs. 4, 5, 6, and 7, LR(yaw) can be further expressed in Eq. 8.

$$\begin{aligned}
LR(yaw) &= P(turning|yaw)/P(swimming|yaw) \quad \text{Eq. 8}\\
&= (P(yaw|turning)*P(turning)/P(yaw))/\\
&\quad (P(yaw|swimming)*P(swimming)/P(yaw))\\
&= P(yaw|turning)/P(yaw|swimming)*(P(turning)/\\
&\quad P(swimming))\\
&= K*P(yaw|turning)/P(yaw|swimming)
\end{aligned}$$

Eq. 8 shows that LR(yaw) can be determined by K, P(yaw|swimming), and P(yaw|turning), which are included in the set of training data and can be all obtained from the raw data from the training sessions.

Alternatively, in some embodiments, LR(yaw) can be expressed in logarithmic scale as shown in Eqs. 9 and 10.

$$\begin{aligned}
LR(yaw) &= \log_{10}(P(turning|yaw)/P(swimming|yaw)) \quad \text{Eq. 9}\\
&= \log_{10}(K*P(yaw|turning)/P(yaw|swimming)) \quad \text{Eq. 10}
\end{aligned}$$

When LR(yaw) is expressed as P(turning|yaw)/P(swimming|yaw) as shown in Eq. 5, if a yaw angle makes the value of LR(yaw) greater than 1, then the user is more likely turning at this yaw angle; and if a yaw angle makes the value LR(yaw) less than 1, then the user is more likely swimming at this yaw angle.

Similarly, when LR(yaw) is expressed as log 10(P(turning|yaw)/P(swimming|yaw)) as shown in Eq. 10, if a yaw angle makes the value of LR(yaw) greater than 0, then the user is more likely turning at this yaw angle; and if a yaw angle makes the value LR(yaw) less than 0, then the user is more likely swimming at this yaw angle.

Figure 16B:
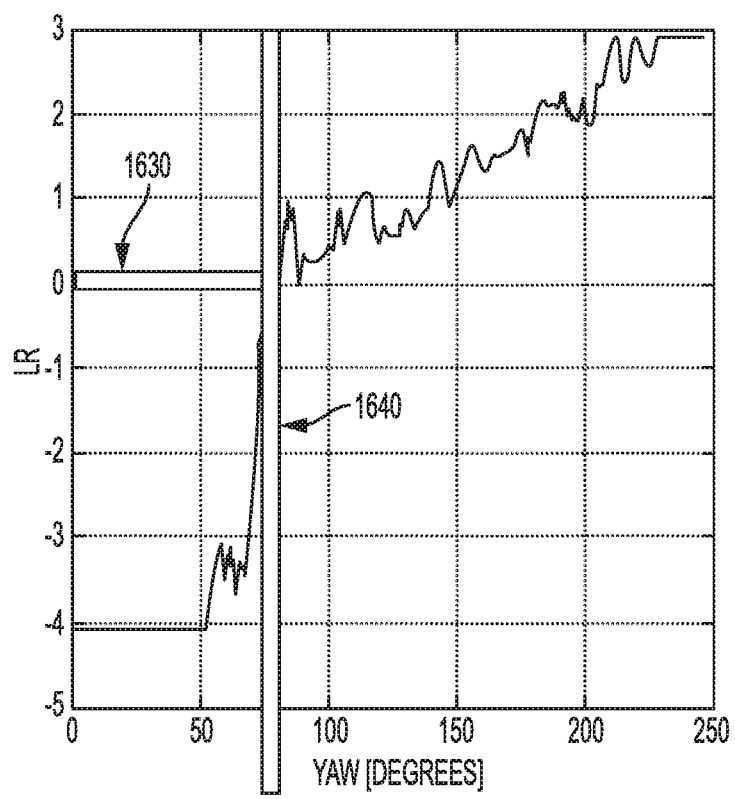

FIG. 16B illustrates the values of LR(yaw) at the plurality of yaw angles when LR(yaw) is expressed in Eq. 10. The x-axis is yaw in degrees and the y-axis is the likelihood ratio. In FIG. 16B, curve 1630 indicates where LR(yaw) is equal to 0. In FIG. 16B, curve 1640 suggests that when the yaw angle is greater than approximately 75 degrees, LR(yaw) is generally greater than 0, and it means that the user is more likely turning; and when the yaw angle is less than approximately 75 degrees, LR(yaw) is generally less than 0, and it means that the user is more likely swimming.

As discussed above with respect to FIG. 15, at step 1510 and 1520, the likelihood ratios of the user's motion at the plurality of yaw angles, LR(yaw), can be determined based on the set of training data. In some embodiments, a lookup table of LR(yaw) can be determined to show values of LR(yaw) at each yaw angle. When the user is in a future swimming session, as soon as a yaw angle of the user is received, a corresponding LR(yaw) value can then be retrieved from the lookup table, and a determination can be made regarding whether the user is swimming or turning in real time. The lookup table can always be fine-tuned and/or updated based on data from additional training sessions.

Figure 17:
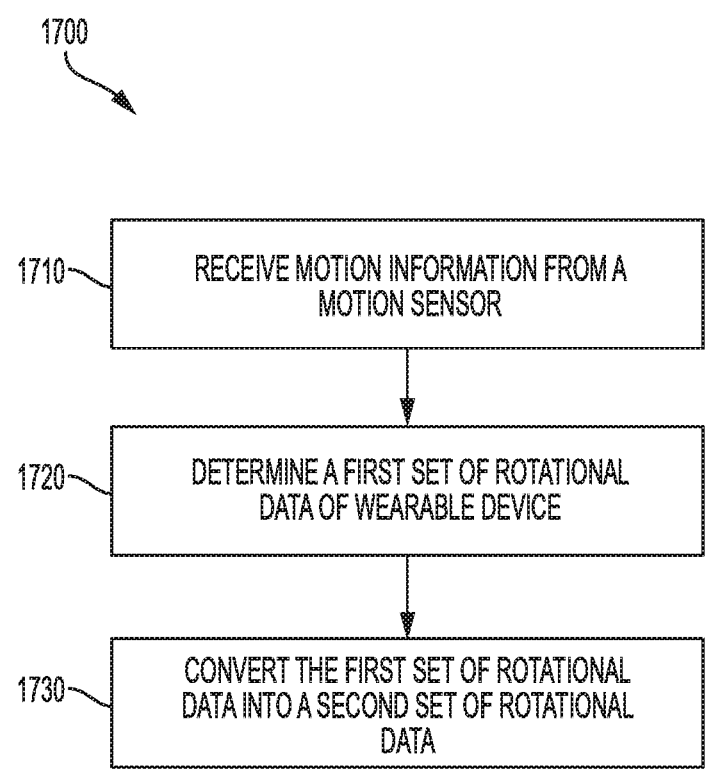
FIG. 17 illustrates a method of receiving motion information from one or more sensors of a wearable device according to some embodiments of the present disclosure.

With reference to FIG. 15, at step 1530, wearable device 100 can determine a real time yaw angle of the user based on motion information received from one or more sensors 240 of wearable device 100. Step 1530 is further explained in FIG. 17. FIG. 17 shows a flow chart illustrating a process 1700 of determining yaw angles of a user while swimming according to some embodiments of the present disclosure. In some embodiments, the process 1700 can be modified by, for example, having steps combined, divided, rearranged, changed, added, and/or removed. As described in more detail below, in some embodiments, the process 1700 can include three steps. At step 1710, wearable device 100 receives motion information from one or more motion sensors 240. At step 1720, wearable device 100 determines a first set of rotational data of wearable device 100. At step 1730, wearable device 100 converts the first set of rational data into a second set of rotational data, which include yaw angles of the user.

At step 1710, motion information may be received from one or more motion sensors 240 on wearable device 100. In some embodiments, motion information may include three-dimensional rotational data of wearable device 100 from gyroscope 250. In some embodiments, motion information may include three-dimensional accelerations of wearable device 100 from accelerometer 260.

At step 1720, wearable device 100 determines a first set of rotational data of wearable device 100 based on the motion information received from one or more motion sensors 240. In some embodiments, the rotational data of wearable device 100 include how wearable device 100 rotates, such as angular position, angular velocity, and/or angular acceleration of wearable device 100, with respect to a frame of reference. In some embodiments, if the rotational data of wearable device 100 is angular acceleration, then angular velocity and/or angular position can be obtained by integrating the angular acceleration over time. Likewise, if the rotational data of wearable device 100 is angular velocity, then angular position can be obtained by integrating the angular velocity over time. In some embodiments, the first set of rotational data is received from gyroscope 250 and is expressed in a body-fixed frame of reference with respect to wearable device 100.

At step 1730, wearable device 100 converts the first set of rotational data into a second set of rotational data. As described above, rotational data in the body-fixed frame of reference cannot readily indicate whether or not wearable device 100 undergoes movements with respect to external references. To address this issue, wearable device 100 converts the rotational data in the body-fixed frame of reference into rotational data in an inertial frame of reference using techniques appreciated by people skilled in the art such as the one discussed in "Kalman-filter-based orientation determination using inertial/magnetic sensors: observability analysis and performance evaluation," Angelo Maria Sabatini, published Sep. 27, 2011, Sensors 2011, 11, 9182-9206.

Referring back to FIG. 15 at step 1540, the yaw angle obtained at step 1530 can be used by wearable device 100 to retrieve a corresponding value of LR(yaw). For example, the value of LR(yaw) can be retrieved from the lookup table of LR(yaw).

At step 1550, based on the retrieved value of LR(yaw), wearable device 100 can determine whether the user is swimming or turning by comparing the retrieved value LR(yaw) with a threshold. Specifically, if LR(yaw) is expressed as in Eq. 5, the threshold can be set at 1: if the retrieved value of LR(yaw) is greater than 1, then the user is more likely swimming; and if the retrieved value LR(yaw) is less than 1, then the user is more likely turning. Similarly, if LR(yaw) is expressed as in Eq. 10, the threshold can be set at 0: if the retrieved value of LR(yaw) is greater than 0, then the user is more likely swimming; and if the retrieved value LR(yaw) is less than 0, then the user is more likely turning.

Classifying Swim Strokes

In some embodiments, the present disclosure describes a wearable device that may be configured to classify a user's swim stroke into one of four common styles, including, freestyle, backstroke, breaststroke, and butterfly.

Figure 19:
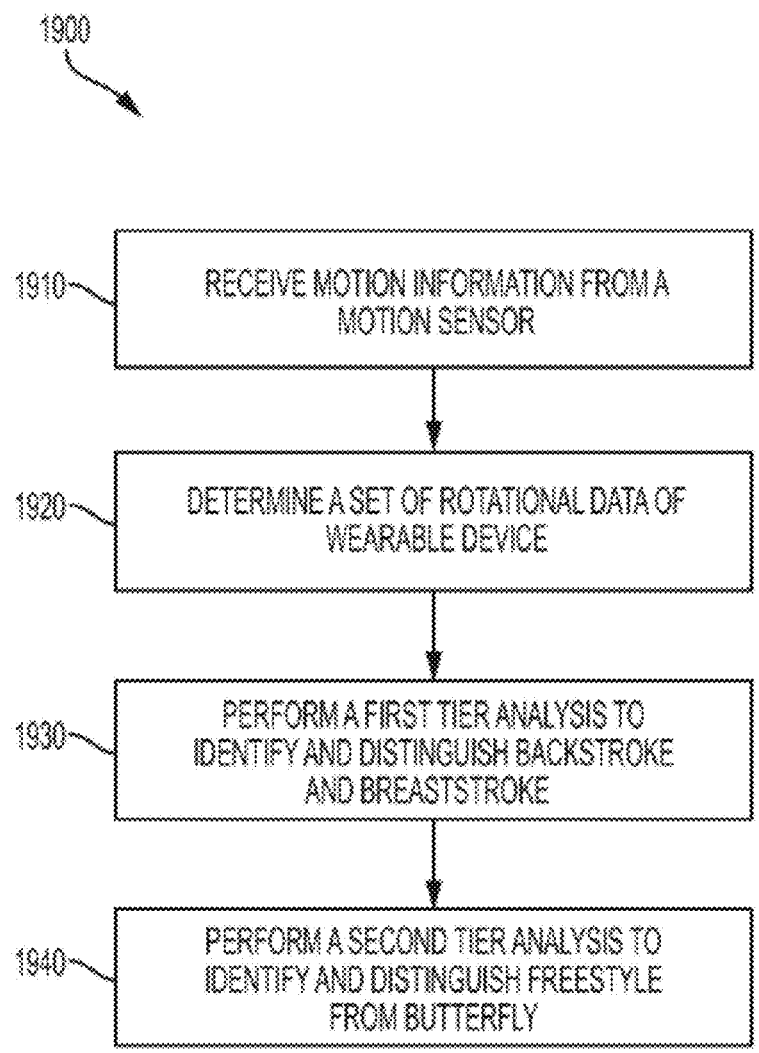
FIG. 19 illustrates a method of classifying a user's swim stroke styles while swimming according to some embodiments of the present disclosure.

FIG. 19 shows a flow chart illustrating a process 1900 for classifying a user's swim stroke style, according to some embodiments of the present disclosure. In some embodiments, the method can include the steps of: receiving information from a motion sensor and calculating a fundamental period (step 1910), determining a set of rotational data of wearable device 100 (step 1920), extracting a first set of features from the set of rotational data to perform a first tier analysis to classify backstroke and breaststroke and distinguish these stroke styles from freestyle and butterfly (step 1930) and extracting a second set of features from the set of rotational data to perform a second tier analysis to distinguish freestyle from butterfly (step 1940). In some embodiments, the process 1900 can be modified by, for example, having steps combined, divided, rearranged, changed, added, and/or removed.

At step 1910, wearable device 100 samples output information from one or more motion sensors 240. In some embodiments, the information can include any combination of gravity, acceleration, rotation or attitude. Based on the sampled information output from motion sensors 240, a fundamental period can be calculated. For example, information from the one or more motion sensors 240 can be sampled at 14 Hz. Based on the stroke rate obtained from the stroke counter, wearable device 100 samples motion information for a period equivalent to two strokes. In some embodiments, if the sampled data does not show a sufficiently periodic signal, then the wearable device 100 resamples the motion sensor information until it receives a sufficiently periodic signal. Process 1900 for classifying a user's stroke can be performed on a per stroke basis, but can be reported to a user after the user completes a lap or some other defined period for reporting the data.

At step 1920, wearable device 100 determines a set of rotational data, including acceleration data, of wearable device 100 in up to three-dimensions based on the information received from one or more motion sensors 240. In some embodiments, the rotational data of wearable device 100 include how wearable device 100 rotates, such as angular position, angular velocity, and/or angular acceleration of wearable device 100, with respect to a frame of reference. In some embodiments, if the rotational data of wearable device 100 is angular acceleration, then angular velocity and/or angular position can be obtained by integrating the angular acceleration over time. Likewise, if the rotational data of wearable device 100 is angular velocity, then angular position can be obtained by integrating the angular velocity over time. In some embodiments, the set of rotational data is received from gyroscope 250 and is expressed in a body-fixed frame of reference with respect to wearable device 100. In some embodiments, the acceleration data is received from accelerometer 260 and is also expressed in a body-fixed frame of reference with respect to wearable device 100.

Figure 20:
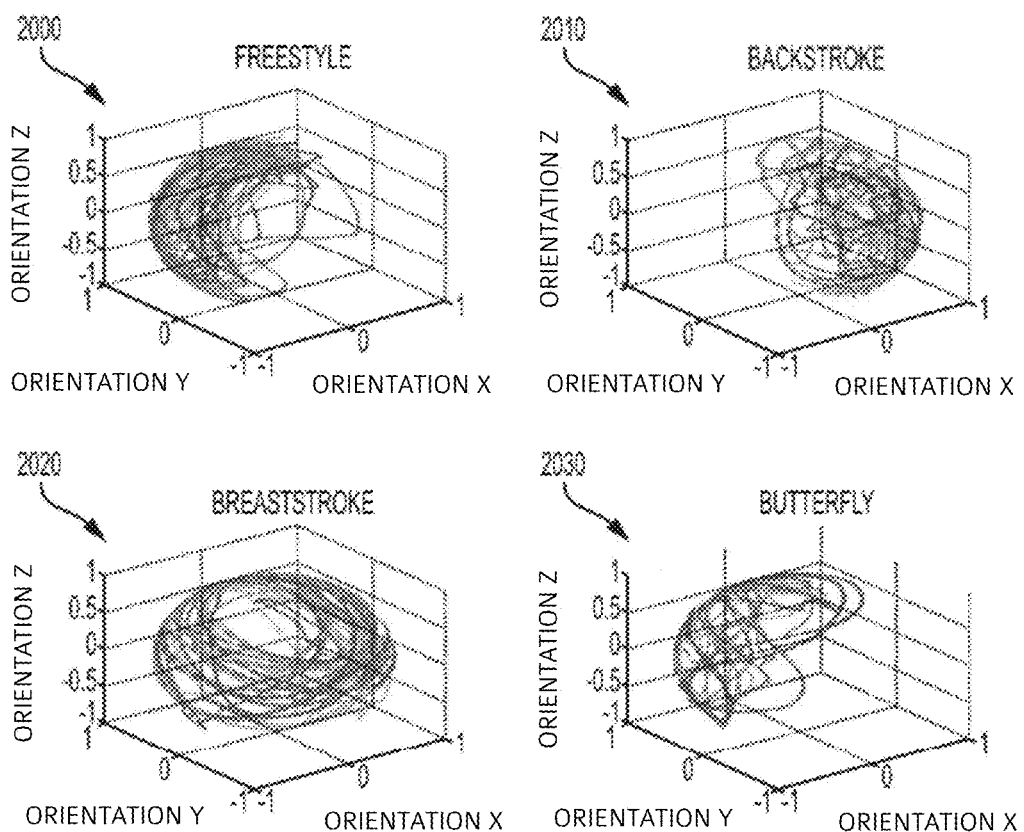
FIG. 20 illustrates an example of classifying a user's swim stroke style according to some embodiments of the present disclosure.

FIG. 20 shows a series of graphs 2000, 2010, 2020, 2030, that depict exemplary 3D paths of the wearable device 100, as worn by a user during a swimming session. Specifically, each graph corresponds to one of the four swim stroke styles (i.e., graph 2000 corresponds to freestyle, graph 2010 corresponds to backstroke, graph 2020 corresponds to breaststroke and graph 2030 corresponds to butterfly) and depicts the 3D path of wearable device 100 for 30 strokes of that stroke style. Each graph includes three axes: an axis that represents the orientation of the face of the wearable device, an axis that represents the orientation of the crown of the wearable device, and an axis that represents the orientation of the band of the wearable device. Each axis ranges from 1, which represents pointing down to the ground, to −1, which represents pointing up towards the sky. As indicated by graphs 2000, 2010, 2020 and 2030, both breaststroke (graph 2020) and backstroke (graph 2010) exhibit unique orbits that make them easy to differentiate from freestyle (graph 2000) and butterfly (graph 2030). However, freestyle and butterfly exhibit similar 3D paths that make them more difficult to distinguish from each other. Accordingly, in some embodiments of the disclosed subject matter, a two tier analysis can be performed. During the first tier of analysis, as described below in connection with step 1930, features are extracted from the set of rotational data to identify breaststroke and backstroke, and distinguish these stroke styles from butterfly and freestyle. If the stroke is identified as breaststroke or backstroke, then a second level of analysis does not have to be performed. Otherwise, if breaststroke and backstroke are ruled out, then a second tier analysis can be performed on the set of rotational data, as described below in connection with step 1940, to identify whether the stroke is freestyle or butterfly. In some embodiments, a second tier analysis can be performed regardless of the results of the first tier analysis.

At step 1930, a first tier analysis can be performed by analyzing certain features from the set of rotational data to identify backstroke and breaststroke and distinguish these stroke styles from butterfly and freestyle. According to some embodiments of the disclosed subject matter, at least three features can be used to identify backstroke and breaststroke and distinguish these stroke styles from butterfly and freestyle. These three features can include (1) mean crown orientation during the fastest part of user's stroke; (2) correlation of user's arm and wrist rotation; and (3) how much rotation about the crown contributes to the total angular velocity. These foregoing features are not intended to differentiate freestyle from butterfly.

Figure 21:
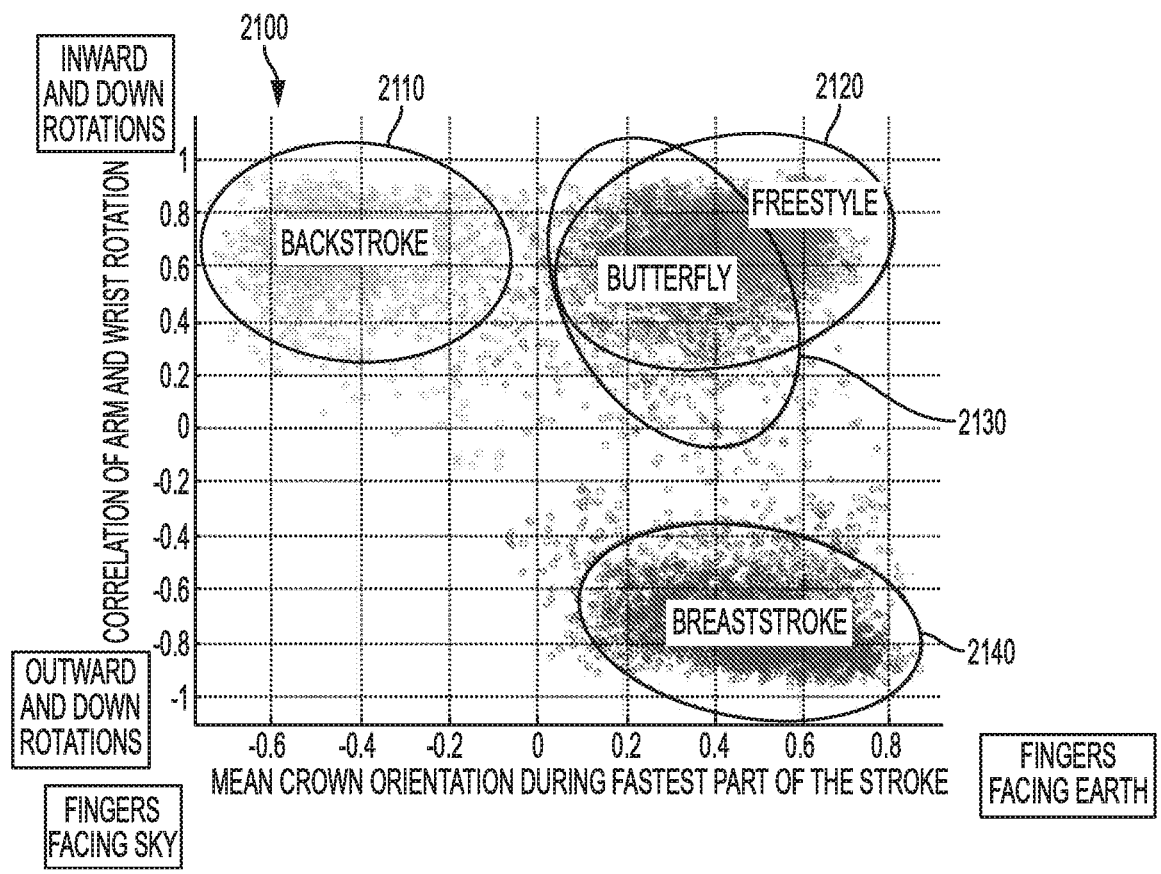
FIG. 21 illustrates an example of classifying a user's swim stroke style according to some embodiments of the present disclosure.

According to some embodiments, as depicted by the graph 2100 in FIG. 21, two of the three features of the first tier analysis are graphed for each of the different swim styles. Specifically, the y-axis represents the correlation of the arm and wrist rotation during the fastest part of the stroke, ranging from −1 (negative correlation, where the wrist and arm rotate in different directions), 0 (no correlation) to 1 (positive correlation, where the wrist and arm rotate in the same direction). As shown in the upper left portion of the graph, the backstroke exhibits a positive correlation of the arm and wrist rotations (i.e., the wrist rotates inward, then the arm rotates downward), while the breaststroke exhibits negative correlation of the arm and wrist rotations (i.e., the wrist rotates outward, then the arm rotates downward). Further, the x-axis of graph 2100, represents the mean crown orientation of the wearable device 100 (which is a proxy for the orientation of a user's fingertips) during the fastest part of the stroke, ranging from −1, where user's fingertips (or the crown) faces up towards the sky, to 1, where the user's fingertips (or crown) is oriented downwards, facing the earth. As depicted in graph 2100, during the fastest part of the backstroke 2110 (i.e., during the recovery phase when the hand is out of the water and making an arc towards the sky), the user's fingertips face upwards towards the sky, while breaststroke 2140, the user's fingertips face downwards towards the earth when the hand is moving fastest.

Also shown in graph 2100, in FIG. 21, the butterfly 2130 and freestyle 2120 strokes exhibit similar correlation between arm and wrist rotation (i.e., both exhibit a positive correlation of the arm and wrist rotations), as well as similar crown orientations during the fastest part of the strokes (i.e., fingertips facing downwards towards the earth), making these strokes difficult to distinguish from each other based on these two features. In contrast, the backstroke is easily distinguishable based on (1) a negative arm-wrist correlation and (2) the mean crown orientation facing up towards the sky during the fastest part of the stroke. The breaststroke is also easily distinguishable based on (1) a positive arm-wrist correlation and (2) the mean crown orientation facing downwards during the fastest part of the stroke.

Figure 22:
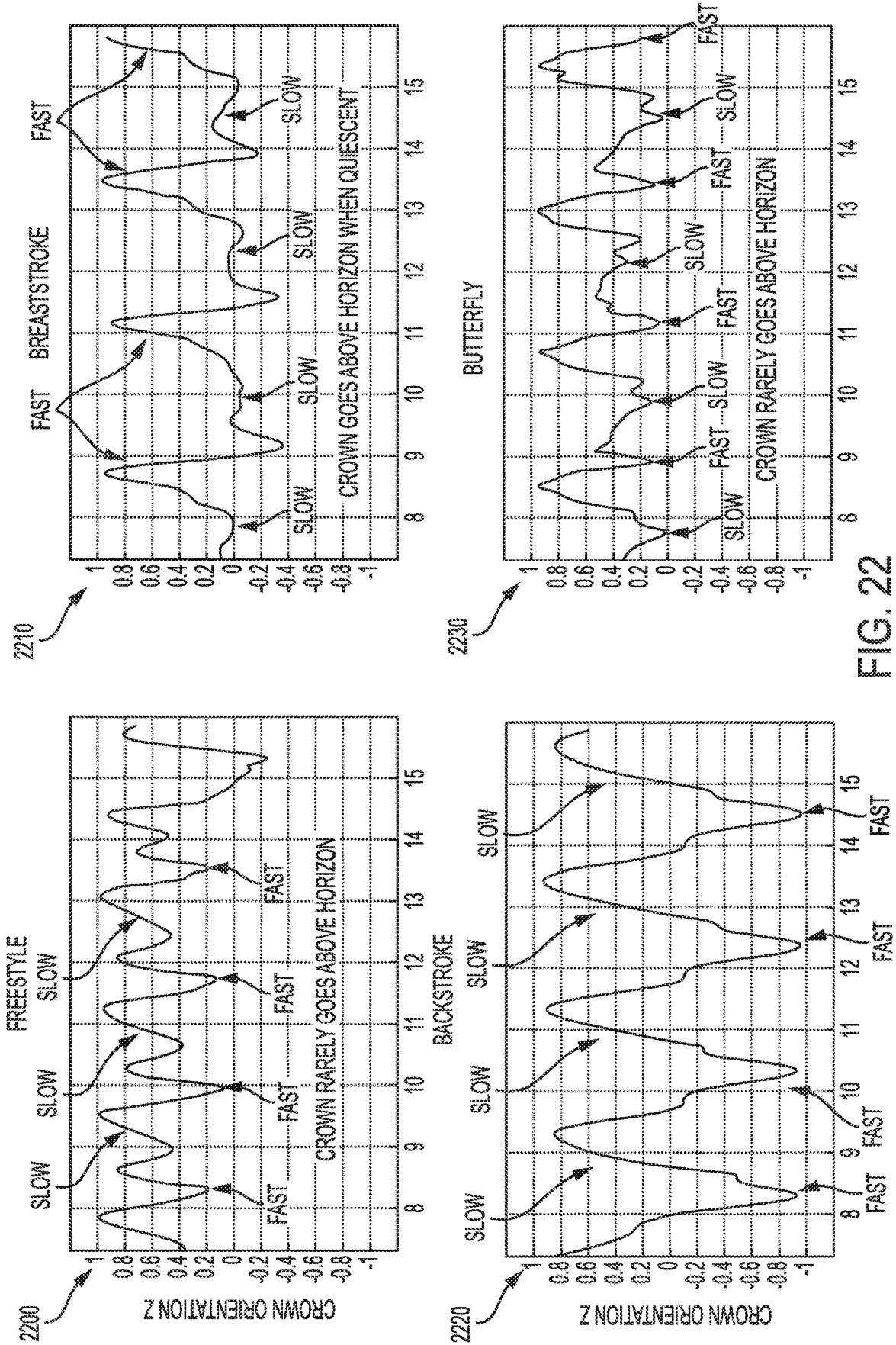
FIG. 22 illustrates an example of classifying a user's swim stroke style according to some embodiments of the present disclosure.

The next series of graphs shown in FIG. 22, focus on the mean crown orientation feature, discussed above in connection with FIG. 21. Specifically, the series of graphs shown in FIG. 22, depict the mean crown orientation with respect to gravity, weighted by the faster parts of the stroke. This feature is a proxy for the direction that the user's fingertips are pointing when the user's arm is moving the fastest. The mean crown orientation feature can be expressed by the following equation:

$$\text{mean\_}gx\_w1 = \text{sum}(\text{gravity\_}x * \text{total\_user\_acceleration}) / \text{sum}(\text{total\_user\_acceleration}) \quad \text{Eq. 11.}$$

The series of graphs depicted in FIG. 22, correspond to the crown orientation for each of the different swim stroke styles (i.e., graph 2200 corresponds to freestyle, graph 2210 corresponds to breaststroke, graph 2220 corresponds to backstroke and graph 2230 corresponds to butterfly). The y-axis of each of the graphs represents crown orientation z, where −1=crown facing up towards the sky, 0=the crown facing parallel to the horizon, and 1=crown facing down towards the earth. The x-axis of each of the graphs represents time in seconds.

The crown orientation feature can be used to identify backstroke and breaststroke and distinguish these stroke styles from the other swim stroke styles. As shown in graph 2220, the user's fingertips in backstroke trace an arc from the horizon to the sky and back to horizon, when the user's arm is out of the water and moving fast. Unlike the other swim stroke styles, the orientation of the crown in backstroke is above the horizon for half the stroke and faces the sky during points of high acceleration.

For breaststroke, as depicted in graph 2210, the crown goes above the horizon during the quiescent portions of the stroke and faces downward during the fastest parts of the stroke. For both freestyle (graph 2200) and butterfly (graph 2230), the crown rarely goes above the horizon and faces parallel to the horizon during the fastest parts of these strokes, making these strokes hard to distinguish from each other based on this feature.

Figure 23:
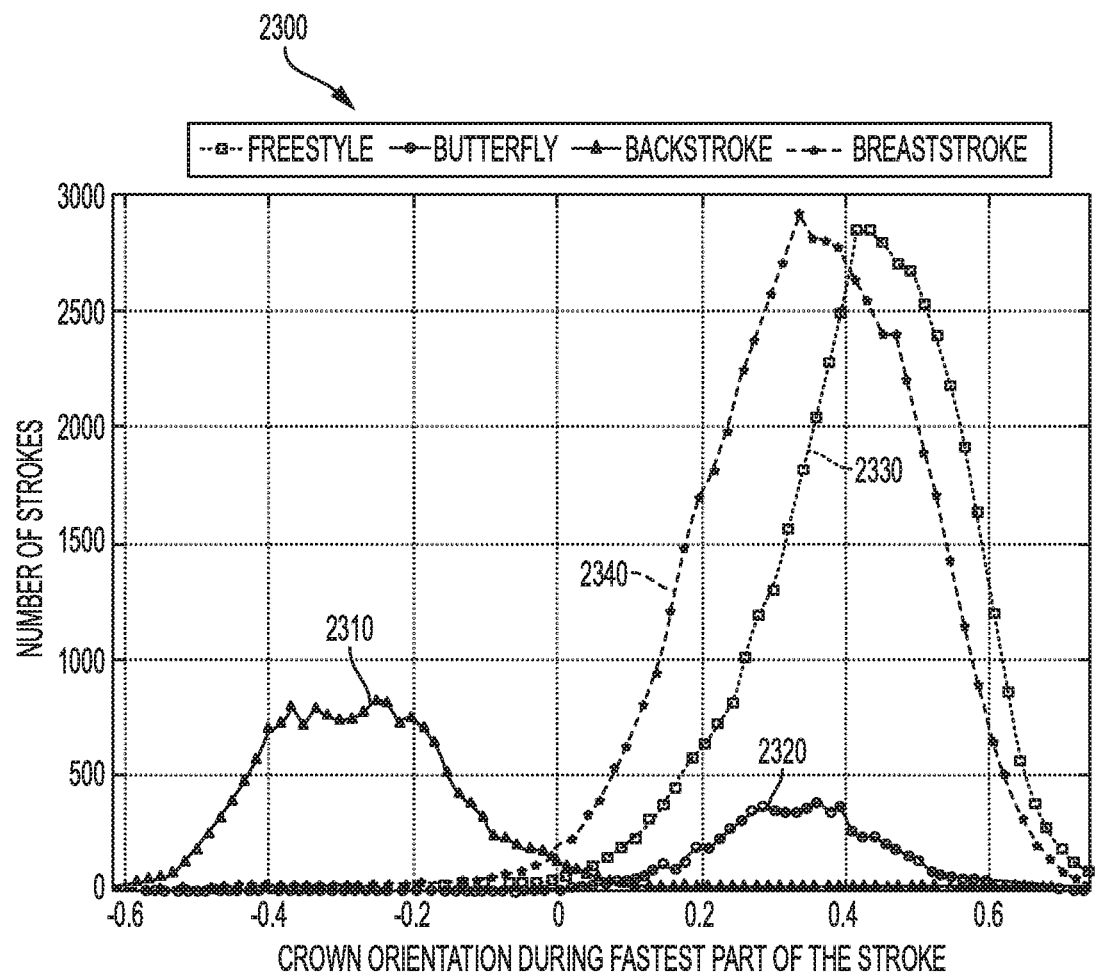
FIG. 23 illustrates an example of classifying a user's swim stroke style according to some embodiments of the present disclosure.

According to some embodiments of the disclosed subject matter, FIG. 23 is another method for graphically depicting the crown orientation feature for the different swim stroke styles. In this embodiment, the x-axis of graph 2300 represents the crown orientation during the fastest part of the stroke (−1=the crown faces up towards the sky, 0=the crown faces parallel to the horizon, 1 the crown faces down towards the earth), and the y-axis represents the number of strokes taken over a large population of swimmers of varying skill. Specifically, graph 2300 shows the crown orientation distribution for the different stroke styles: backstroke (depicted by curve 2310 made up of triangles), butterfly (depicted by curve 2320 made up of circles), freestyle (depicted by curve 2330 made up of squares) and breaststroke (depicted by curve 2340 made up of stars). As shown in graph 2300, using the crown orientation feature, backstroke is most easily distinguishable from the other stroke styles.

Figure 24:
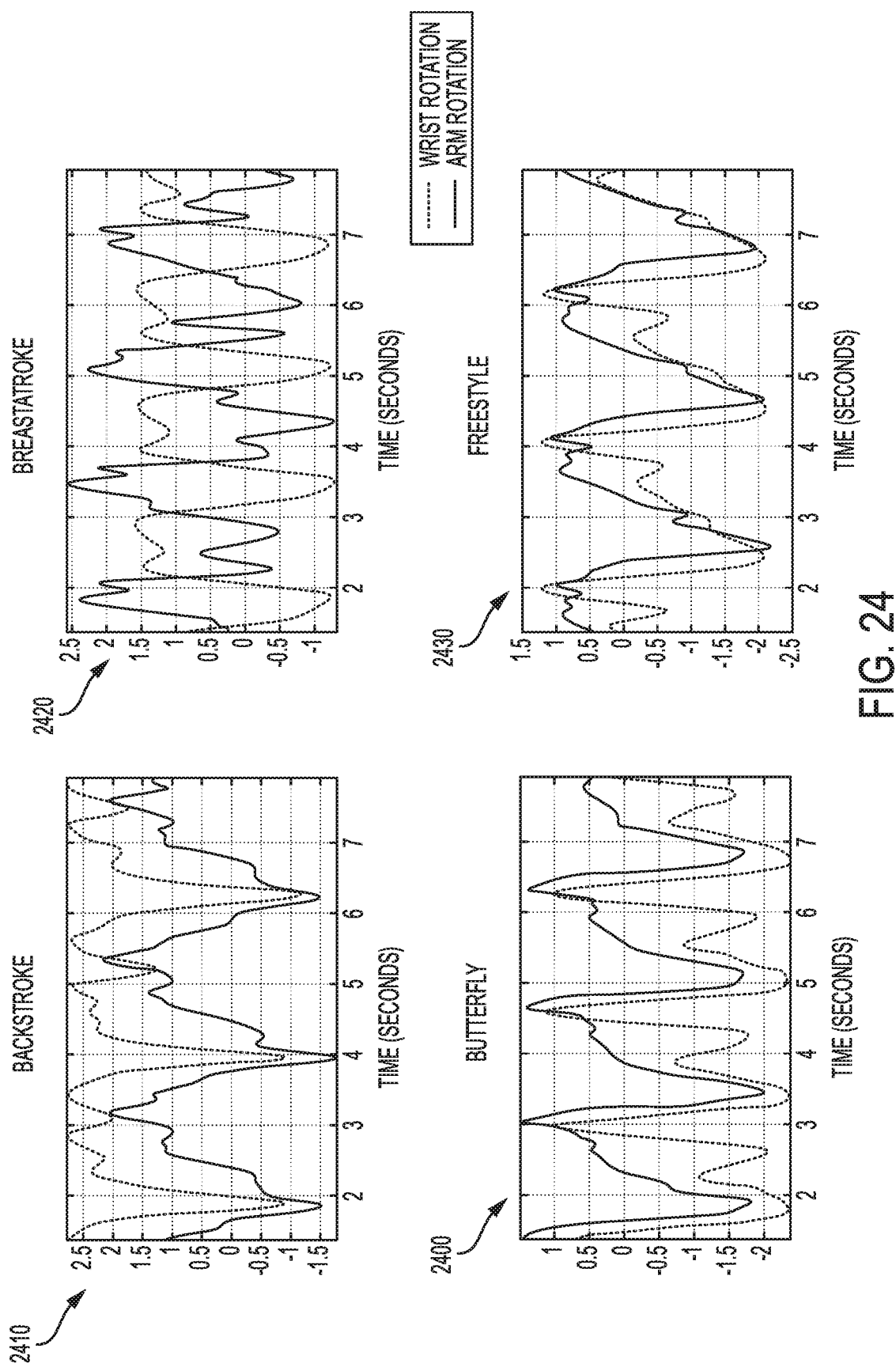
FIG. 24 illustrates an example of classifying a user's swim stroke style according to some embodiments of the present disclosure.

The next series of graphs shown in FIG. 24, focus on the wrist-arm correlation feature, as discussed above in connection with FIG. 21. Each graph corresponds to a different swim stroke style (i.e., graph 2400 corresponds to butterfly, graph 2410 corresponds to backstroke, graph 2420 corresponds to breaststroke and graph 2430 corresponds to freestyle). Specifically, the series of graphs shown in FIG. 24, depict how the position of the top of the band (gravity_y) rotates around the axis perpendicular to the forearm (rotation_y) in relation to the rotation of the forearm. This feature can be expressed by the following equation:

$$\text{gray\_rotation\_norm\_}cfpy\_w1 = \text{weighted Pearson correlation between gravity\_}y \text{ and rotation\_}y \quad \text{Eq. 12.}$$

As shown below, the correlation can be weighted by the total angular velocity at each point to discount clusters that occur during the slower portions of the stroke:

Weighted mean:

$$m(x; w) = \frac{\sum_i w_i x_i}{\sum_i w_i}.$$

Weighted covariance:

$$\text{cov}(x, y; w) = \frac{\sum_i w_i (x_i - m(x; w))(y_i - m(y; w))}{\sum_i w_i}.$$

Weighted correlation:

$$\text{corr}(x, y; w) = \frac{\text{cov}(x, y; w)}{\sqrt{\text{cov}(x, x; w)\text{cov}(y, y; w)}}.$$

The series of graphs in FIG. 24 include an x-axis, which represents the number of samples at a sampling rate of 14 Hz and the y-axis represents motion in a clockwise motion (2.5)

or a counter clockwise motion (−2.5). The series of graphs shown in FIG. 24 are normalized so that they are on the same scale. Specifically, each signal is divided by its standard deviation to normalize their respective magnitude for visualization purposes. Each graph shows two curves: one curve, indicated by a dashed line, represents wrist rotation (i.e., orientation of the top of the band (gravity_y) with rotation around the axis perpendicular to the forearm) and another curve, indicated by a solid line, represents the forearm rotation (rotation_y).

Analyzing the wrist-forearm correlation for each of the swim stroke styles, shows a positive wrist-forearm correlation for all the swim stroke styles, except for the breaststroke. The breaststroke exhibits a negative wrist-forearm correlation. Specifically, for the breaststroke (graph 2420), the wrist rotates outward, then the arm rotates downward. For all the other strokes, as shown by graphs 2400 (butterfly), 2410 (backstroke) and 2430 (freestyle), the wrist rotates inward, then the arm rotates downward (i.e., positive correlation). Accordingly, this wrist-forearm correlation feature can be used to identify the breaststroke and differentiate it from the other stroke styles.

Figure 25:
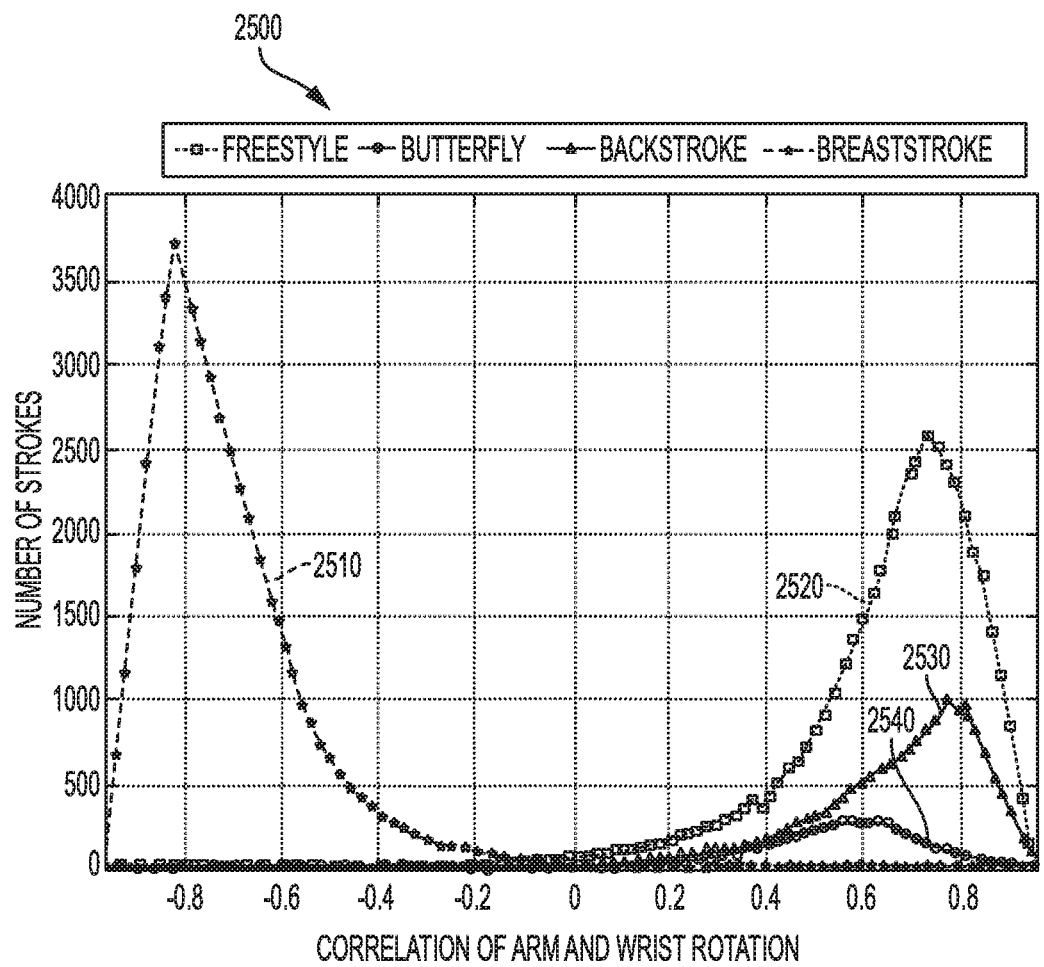
FIG. 25 illustrates an example of classifying a user's swim stroke style according to some embodiments of the present disclosure.

Another way to graphically depict the correlation of arm and wrist rotation feature is shown by graph 2500 in FIG. 25. The x-axis represents the correlation of the arm and wrist rotations, where −1 indicates a negative correlation, 0 indicates no correlation and −1 indicates a positive correlation. The y-axis represent the number of strokes from a large population of swimmers of varying ability. Specifically, graph 2500 depicts the distribution of the correlation of the arm and wrist rotations for the different stroke styles: breaststroke (depicted by curve 2510 made up of stars), freestyle (depicted by curve 2520 made up of squares), backstroke (depicted by curve 2530 made up of triangles) and butterfly (depicted by curve 2540 made up of circles). As shown in graph 2500, using the correlation of the arm and wrist rotation feature, it is easy to distinguish the breaststroke from the other stroke styles.

Figure 26:
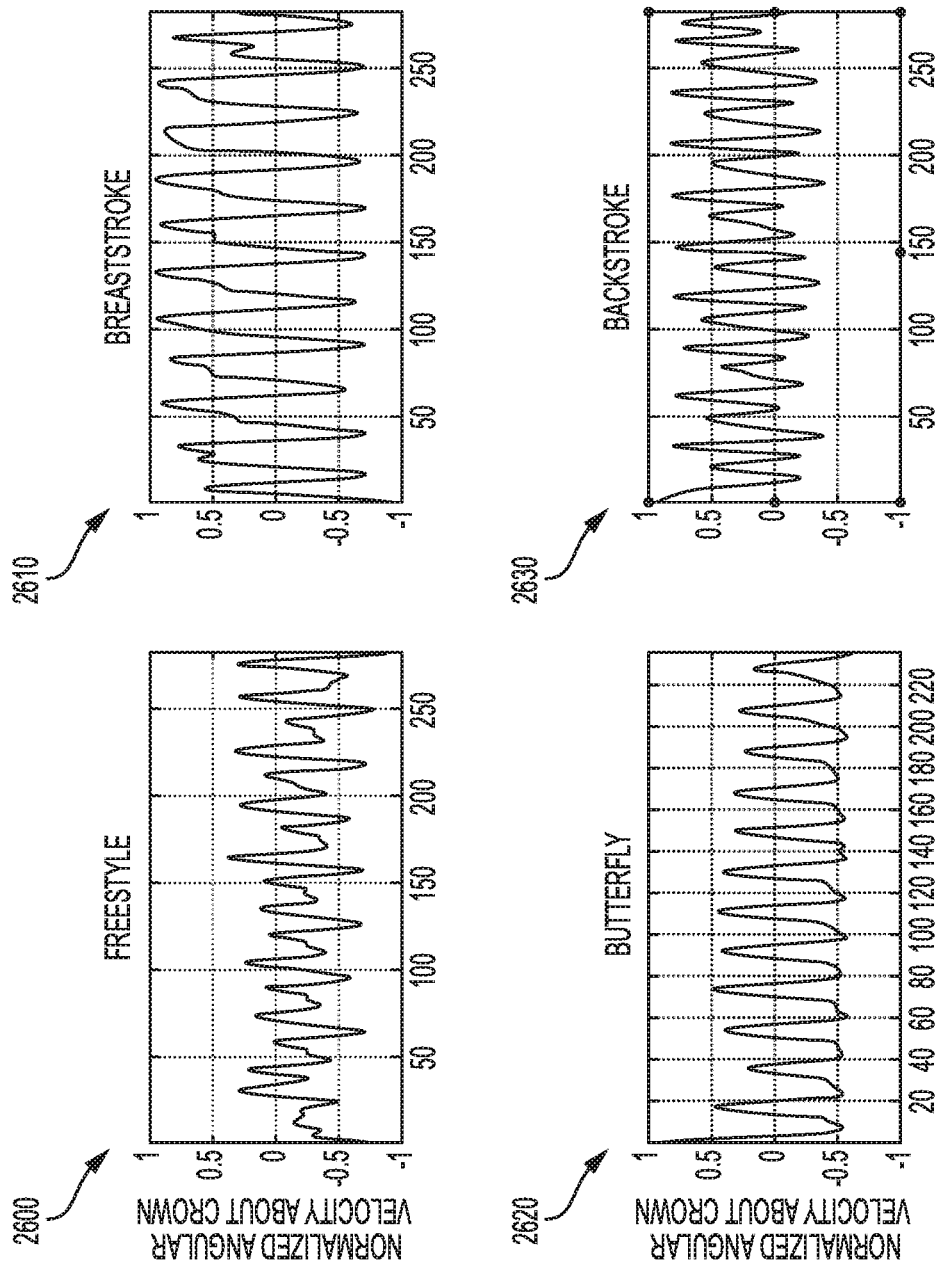
FIG. 26 illustrates an example of classifying a user's swim stroke style according to some embodiments of the present disclosure.

The series of graphs shown in FIG. 26 focus on a third feature that can be used in the first tier analysis, according to some embodiments of the disclosed subject matter, to identify and separate backstroke and breaststroke from freestyle and butterfly. Specifically, this feature analyzes how much the rotation about the crown contributes to the total angular velocity (and the sign).

The series of graphs shown in FIG. 26 include a y-axis, which represents normalized angular velocity about the crown and an x-axis which represents the number of samples, at a sampling rate of 14 Hz. The graphs for freestyle (2600) and butterfly (2620) show a negative rotational mean for Equation 3, which captures fast inward rotation during freestyle and butterfly when the user's arm is out of the water. The graphs for breaststroke (2610) and backstroke (2630), on the other hand, show a positive rotational mean.

Figure 27:
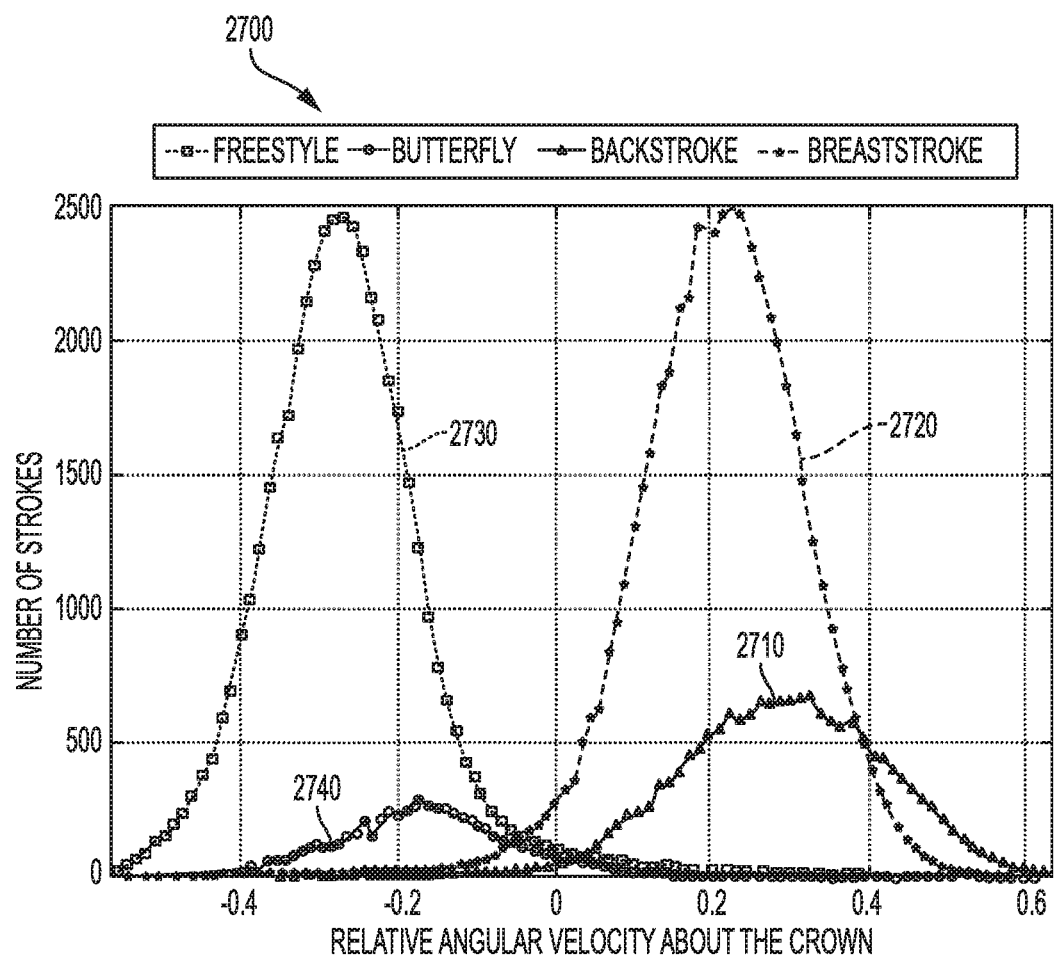
FIG. 27 illustrates an example of classifying a user's swim stroke style according to some embodiments of the present disclosure.

Another way to graphically depict the relative angular velocity about the crown feature is shown by graph 2700 in FIG. 27. The x-axis represents the relative angular velocity about the crown. The y-axis represents the number of strokes from a large population of swimmers with varying skill levels. The graph depicts the distribution for the relative angular velocity about the crown for the different stroke styles. As shown in graph 2700, using the relative angular velocity about the crown feature, it is easy to separate backstroke (depicted by curve 2710 made up of triangles) and breaststroke (depicted by curve 2720 made up of stars) from freestyle (depicted by curve 2730 made up of square) and butterfly (depicted by curve 2740 made up of circles).

The three features detailed above for the first tier analysis may be used in a three-way logistic regression and weighted by their usefulness in classifying a swim stroke style. It is understood that the present disclosure is not limited to a three-way logistic regression and any classifier could be used here, e.g., linear discriminant analysis (LDA), support vector machine (SVM), Neural Networks, etc., to yield similar results. In some embodiments, the arm-wrist correlation feature and the mean crown orientation feature are assigned greater weight than the rotation about the crown feature. It is understood that the three features discussed above are exemplary, and other suitable features may be used as well.

At step 1940, after a first tier analysis is performed on the set of rotational data, a second tier analysis can be performed and certain features from the set of rotational data can be examined to distinguish freestyle from butterfly. In some embodiments, nine features can be used during the second tier analysis to distinguish between butterfly and freestyle.

A first feature that can be used is relative arm rotation about the band during the pull phase, which can be expressed by the following equation:

RMS (rotation $y$ during pull phase)/RMS (rotation $y$ during entire stroke), where RMS is root mean square    Eq. 13.

The ratio for the relative arm rotation features tends to be higher for butterfly, because butterfly, in comparison to freestyle, tends to have more (stronger) rotation around the band of wearable device 100 during the pull phase, but similar or less rotation around the band during the recovery phase. During the recovery phase of butterfly, the palms tend to stay more parallel to the horizon than during freestyle which results in less rotation about the band during recovery. Since the hands are more parallel during recovery in butterfly, the rotation tends to be around the face (less rotation around the band). For freestyle, the hands are less parallel so there is more rotation around the band.

A second feature that can be used is the moment arm feature range(uxz)/range(wy), where:

$uxz$=sqrt(sum(user_$x2$+user_$z2$)),$wy$=abs(rotation_$y$), range($x$)=max($x$)−min($x$)    Eq. 14.

The moment arm feature captures the longer moment arm (i.e., arms outstretched) during butterfly, in comparison to freestyle. This feature compares rotation around the band (i.e., axis y) to the linear acceleration in the plane perpendicular to the band. The longer the moment arm, the more linear acceleration relative to rotation there will be.

Figure 28:
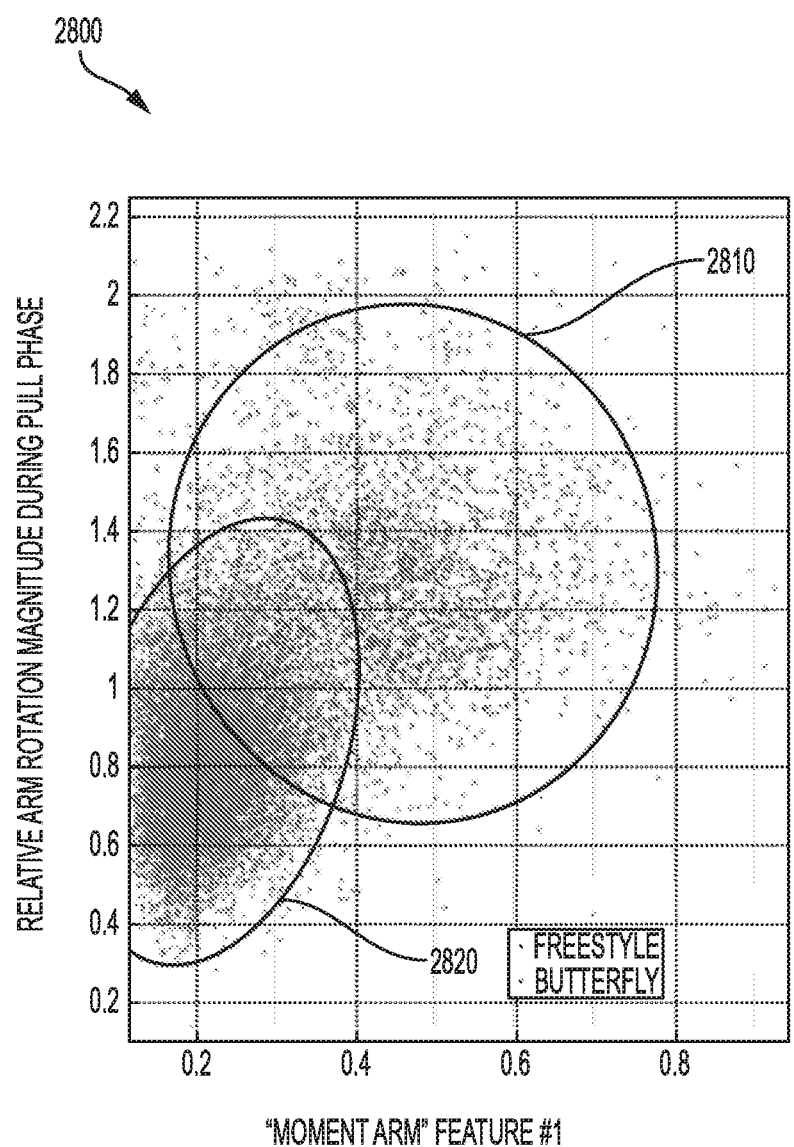
FIG. 28 illustrates an example of classifying a user's swim stroke style according to some embodiments of the present disclosure.

Graph 2800 depicted in FIG. 28, graphs the first and second feature discussed above. Specifically, graph 2800 includes an x-axis, which represents the moment arm feature and a y-axis, which represents relative arm rotation magnitude during the pull phase. As shown by graph 1500, these two features are important in distinguishing butterfly from freestyle.

A third feature that can be used to distinguish butterfly (2810) from freestyle (2820) is the ratio of acceleration z to rotation y. This is another version of moment arm and can be expressed by $uz/wy$, where $uz$=sum(abs(rotation_$y$)),$uz$+sum(abs (user_$z$))    Eq. 15.

A fourth feature that can be used to distinguish butterfly from freestyle is mean gravity crown weighted by acceleration, similar to the feature used during the first tier analysis, discussed above in connection with FIGS. 21-23. This feature measures the orientation of the crown (which is a proxy for the orientation of user's fingertips during the stroke). It is weighted by the faster parts of the stroke to give more weight to the recovery phase of the stroke. In butterfly, the crown orientation with respect to gravity is close to zero, which captures that the user's hands stay more parallel to the horizon during butterfly, in comparison to freestyle.

A fifth feature that can be used to distinguish butterfly from freestyle is the correlation between gravity_y (top of band orientation) and rotation_y (rotation around the band) and can be measured by the equation:

$$r = \frac{\sum_{i=1}^{n}(x_i - \bar{x})(y_i - \bar{y})}{\sqrt{\sum_{i=1}^{n}(x_i - \bar{x})^2}\sqrt{\sum_{i=1}^{n}(y_i - \bar{y})^2}}. \quad \text{Eq. 16}$$

Specifically, this feature measures how the wrist and arm rotate together during the stroke. The wrist and arm correlation is lower for butterfly than freestyle, indicating that there are more times during the butterfly stroke where the arm is rotating, but the wrist is not. This feature also captures that the hands stay more parallel to the horizon during butterfly (i.e., arms swing around with less wrist rotation), in comparison to freestyle.

A sixth feature that can be used to distinguish butterfly from freestyle is RMS of crown rotation, which can be expressed by the equation:

RMS(rotation_x)      Eq. 17.

This feature captures the stronger rotational energy exhibited by butterfly, in comparison to freestyle.

A seventh feature that can be used to distinguish butterfly from freestyle is minimum rotation around the crown, which can be expressed by the equation:

min(rotation_x)      Eq. 18.

This feature also captures the stronger rotational energy exhibited by butterfly, in comparison to freestyle.

An eighth feature that can be used to distinguish butterfly from freestyle is maximum rotation around the band, which can be expressed by the equation:

max(rotation_y)      Eq. 19.

This feature also captures the stronger rotational energy exhibited by butterfly, in comparison to freestyle.

A ninth feature that can be used to distinguish butterfly from freestyle is maximum rotation x over y, which can be expressed by the equation:

max(abs(rotation_x)/max(abs(rotation_y))      Eq. 20.

This feature also captures the stronger rotational energy exhibited by butterfly, in comparison to freestyle.

These nine features can be used together in a two-way logistic regression to distinguish butterfly from freestyle and can be weighted, based on their usefulness in distinguishing butterfly from freestyle. It is understood that most classifiers (SVM, LDA, etc.) will perform similarly with this same feature set. It is further understood that the nine features discussed above are exemplary, and other suitable features may be used as well. In some embodiments, the nine features of the second tier analysis, have the following order of usefulness, ranked from greatest to least:

| Rank | Feature |
| --- | --- |
| 1 | Relative arm rotation during the pull phase |
| 2 | Range ration of ZX acceleration to rotation y |
| 3 | Ratio of acceleration z to rotation y |
| 4 | Max. rotation around band |
| 5 | Max. rotation X over Y |
| 6 | Mean gravity crown weighted by acceleration |
| 7 | Correlation between gravity_y (top of band orientation) compared to rotation_y (rotation around band). |
| 8 | RMS of crown rotation |
| 9 | Min. rotation around crown |

Determining Swim Stroke Phase

Figure 29A:
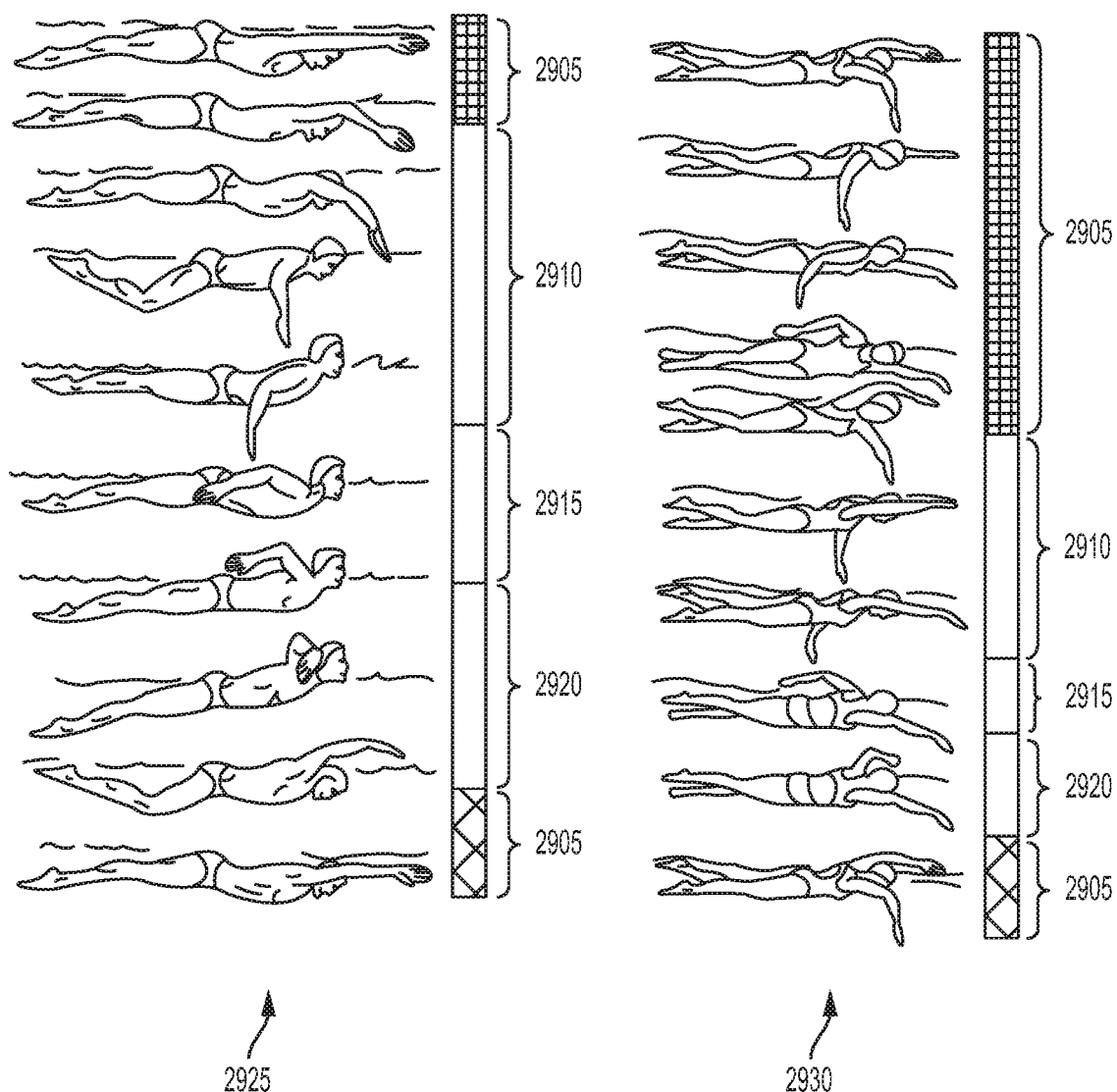
FIGS. 29A-29B illustrate swim stroke phases of different swim stroke styles according to some embodiments of the present disclosure.
Figure 29B:
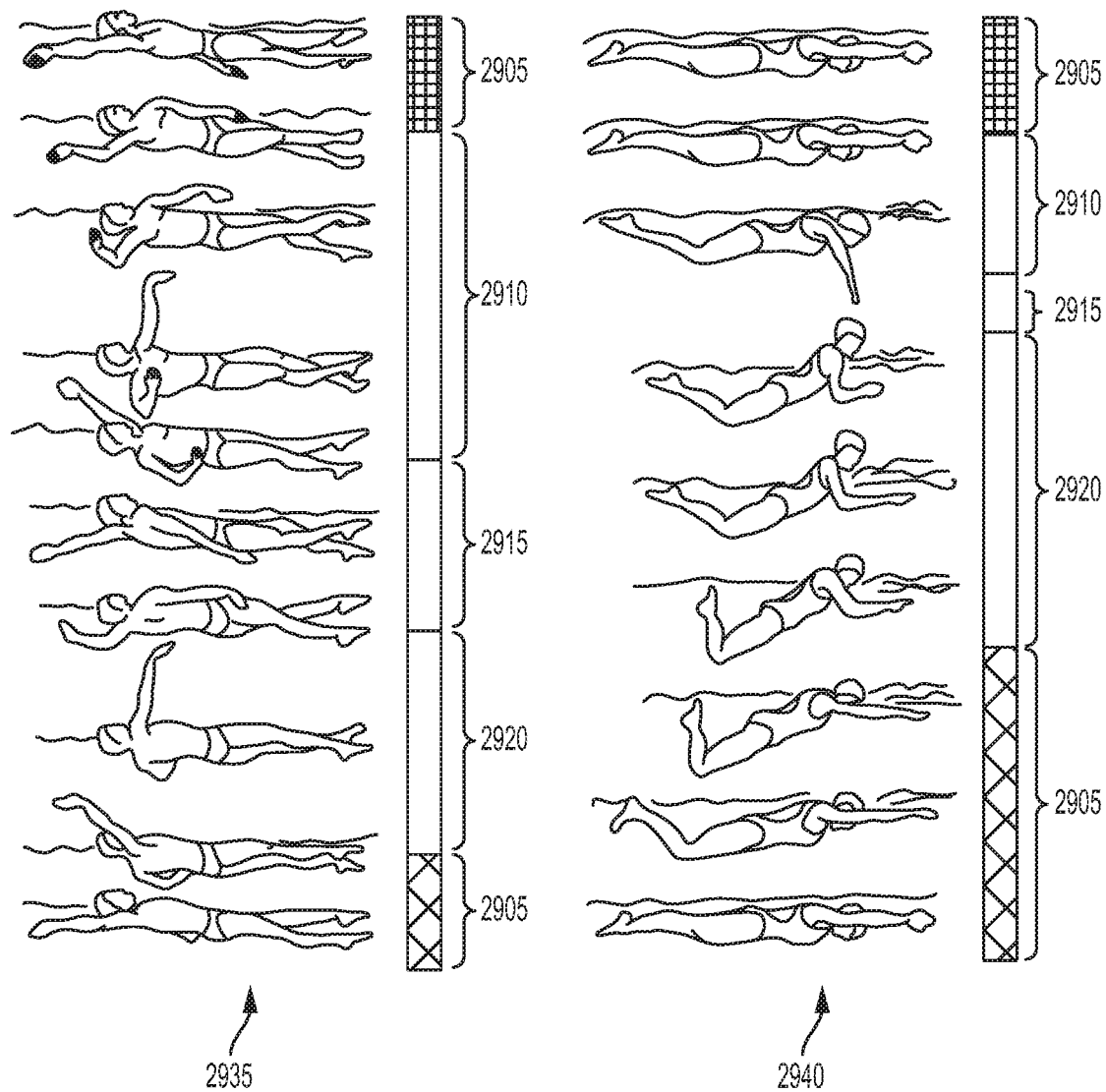

The present disclosure describes a wearable device that may be configured to determine a user's swim stroke phase. As shown in FIGS. 29A-29B a swim stroke (e.g., butterfly 2925, freestyle 2930, backstroke 2935 and breaststroke 2940) can be broken down into four phases: glide 2905, pull 2910, transition 2915 and recovery 2920. Each phase exhibits certain characteristics unique to that phase. For example, glide phase 2905—when the user's arms are stretched out in front of him in the direction of travel—is typically the most quiescent portion of the stroke. This phase exhibits the least amount of user acceleration and most stable wrist orientation compared to the other three phases of the stroke. The next phase (i.e., pull phase 2910) occurs when the user's hand is underwater and propels the swimmer forward. This phase shows increased acceleration from glide phase 2905 and a change in orientation of the swimmer's fingertips. For butterfly, freestyle, and backstroke the fingertips tend to point down through this phase. For backstroke, the fingertips will be more parallel to the horizon during the pull phase. The third phase shown in FIGS. 29A-29B is transition phase 2915, the phase between pull phase 2910 and recovery phase 2920. In transition phase 2915, the orientation of the swimmer's fingertips is opposite to the direction of travel and will exhibit the maximum angle between direction of travel and current orientation of the user's fingertips. This phase commonly has the shortest duration. Finally, recovery phase 2920, when the swimmer brings his hand back around to the direction of travel, will usually exhibit the most acceleration. For butterfly, freestyle and backstroke the hand is out of the water during the recovery phase. For breaststroke the hand remains in the water. The recovery phase will usually exhibit the most acceleration across all stroke styles, but the difference will be less pronounced for breaststroke. It is understood that the strokes provided above are exemplary, and that it is contemplated that other strokes can be broken down into similar phases.

Figure 30:
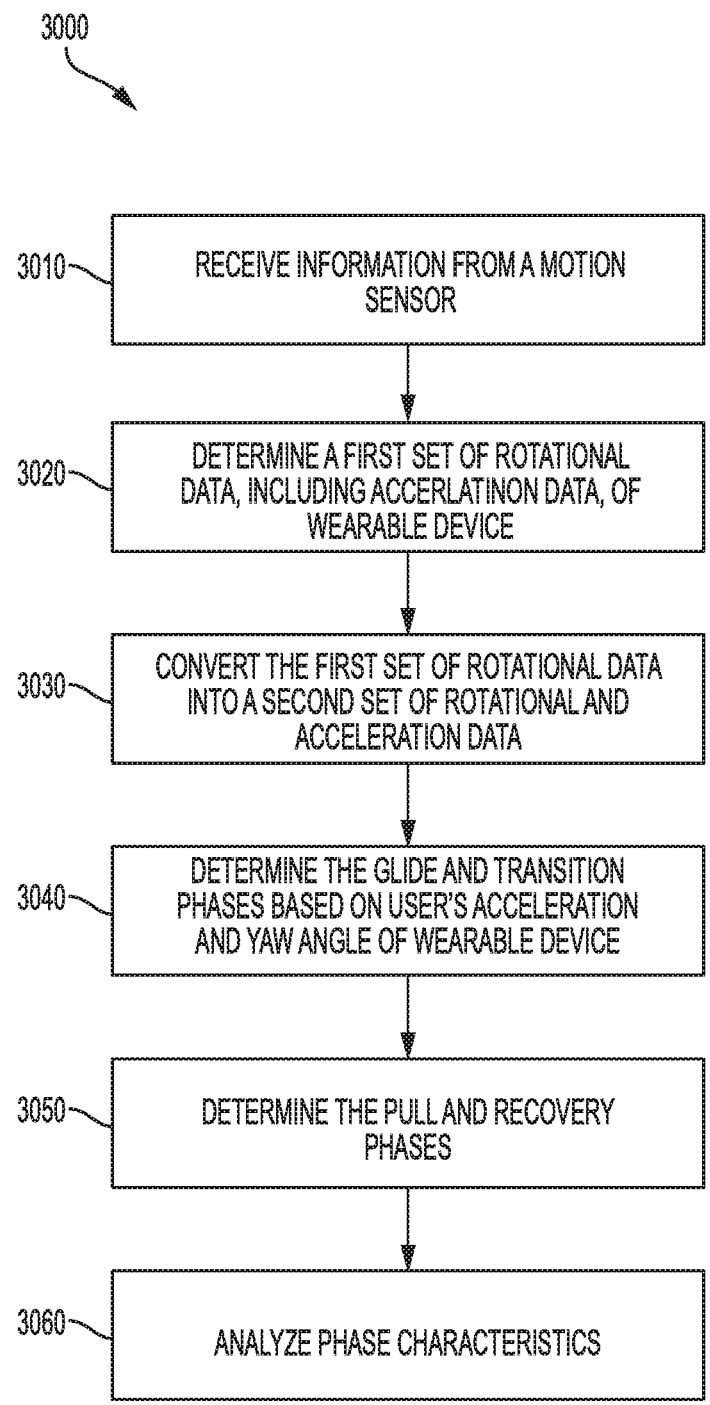
FIG. 30 illustrates a method of determining a user's swim stroke phase according to some embodiments of the present disclosure.

FIG. 30 is a flow chart illustrating a process 3000 for determining a user's swim stroke phase, according to some embodiments of the present disclosure. In some embodiments, the method can includes the steps of: receiving information from a motion sensor (step 3010), determining a first set of rotational data, including acceleration data, of wearable device 100 (step 3020), converting the first set of rotational data into a second set of rotational data (step 3030), determine certain phases based on the second set of data (steps 3040, 3050) and analyze phase characteristics (step 3060). In some embodiments, the process 3000 can be modified by, for example, having steps combined, divided, rearranged, changed, added, and/or removed.

At step 3010, wearable device 100 receives information from one or more motion sensors 340. In some embodiments, the information can include any combination of gravity, acceleration, rotation or attitude. Based on the information output from motion sensors 240, a fundamental period can be calculated. If it is determined that the user is not swimming, in some embodiments, the wearable device 100 will not determine the stroke phase.

The information output from one or more motion sensors 240 can be filtered using a low pass filter with a cutoff frequency based on a time constant that is proportional to a period slightly greater than the period that the user needs to complete a stroke.

The time period can be set by a user or the time period can be fixed. In some embodiments, the time period is proportional to a period greater than the period that an average user needs to complete a single stroke. In some embodiments, the wearable device 100 can dynamically set the time period based on average duration of user's strokes detected by wearable device 100. For example, if it takes a user three seconds to finish a stroke, then the time period can be set to six seconds.

At step 3020, wearable device 100 determines a first set of rotational data, including acceleration data, of wearable device 100 in up to three-dimensions based on the information received from one or more motion sensors 240. In some embodiments, the rotational data of wearable device 100 include how wearable device 100 rotates, such as angular position, angular velocity, and/or angular acceleration of wearable device 100, with respect to a frame of reference. In some embodiments, if the rotational data of wearable device 100 is angular acceleration, then angular velocity and/or angular position can be obtained by integrating the angular acceleration over time. Likewise, if the rotational data of wearable device 100 is angular velocity, then angular position can be obtained by integrating the angular velocity over time. In some embodiments, the first set of rotational data is received from gyroscope 250 and is expressed in a body-fixed frame of reference with respect to wearable device 100. In some embodiments, acceleration data is received from accelerometer 260 and is also expressed in a body-fixed frame of reference with respect to wearable device 100.

At step 3030, wearable device 100 converts the first set of rotational data, including acceleration data, into a second set of rotational data. As described above, the rotational data in the body-fixed frame of reference cannot readily indicate whether or not wearable device 100 undergoes movements with respect to external references. To address this issue, wearable device 100 converts the rotational data, including acceleration data, in the body-fixed frame of reference into rotational data in an inertial frame of reference using techniques appreciated by people skilled in the art such as the one discussed in "Kalman-filter-based orientation determination using inertial/magnetic sensors: observability analysis and performance evaluation," Angelo Maria Sabatini, published Sep. 27, 2011, Sensors 2011, 11, 9182-9206.

FIGS. 31A-31D illustrate rotational data, including acceleration data, of wearable device 100 in the inertial frame of reference over a period of time according to some embodiments of the present disclosure. Specifically, FIGS. 31A-31D illustrate a set of rotational data, including acceleration data, for wearable device 100 worn on a swimmer's wrist during a swimming session that has been converted from a body fixed from of reference to an inertial frame of reference. The x-axis represents the time period of the signal received from the one or more motions sensors 240 and is measured in (1/100ths of a second) and the y-axis represents acceleration normalized by gravity and is measured in m/s². User acceleration is represented by curved line 3110 and the yaw angle is represented by curved line 3120. The yaw angle corresponds to the crown orientation of wearable device 100 (i.e. the direction of the user's fingertips).

In some embodiments, the pitch angle, represented by curved line 3145 (shown in yellow), can also be used to determine the different phases. For example, the pitch angle will show a transition from near 0 (glide) to an angle greater than 0 (pull) and then back to zero (recovery). For example, it can be inferred that the hand is opposite by tracking states when pitch is close to zero along with acceleration:

State #1 (glide): Pitch is near zero and lowest acceleration
State #2 (pull): Pitch transitions from near zero to non-zero back to near zero=
State #3 (transition): Pitch is near zero again
State #4 (recovery): Pitch maybe non-zero or zero here (depending on the stroke type and the user), but acceleration should generally be higher than other 3 phases.

Figure 31A:
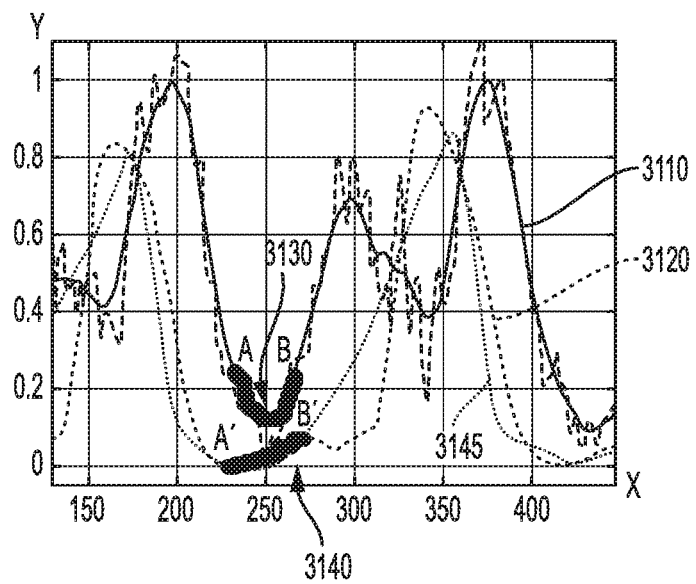
FIGS. 31A-31D illustrate graphs that identify different swim stroke phases according to some embodiments of the present disclosure.

Each of FIGS. 31A-31D highlights a different phase of a user's swim stroke based on the rotational data. At step 3040, according to some embodiments, the glide phase of the swim stroke can be determined by finding the minimum L2 norm of user's acceleration, over one stroke, as shown in FIG. 31A. The lowest point along the acceleration curve 3110, which corresponds to the least amount of acceleration, is indicated by 3130 and represents the midpoint of the glide phase. The beginning of the glide phase can be defined as 10% of the maximum acceleration before the midpoint, and the end of the glide phase can be defined as 10% of the maximum acceleration after the midpoint (e.g., the length of the acceleration curve 3110 between points A and B). Once the minimum acceleration is determined, the reference yaw angle 3140 (i.e., when the yaw angle is 0°) is determined relative to the minimum acceleration point. The reference yaw angle 3140 is the point along the yaw angle curve 3120 directly beneath the lowest acceleration point.

In another embodiment, the duration of the glide is calculated based on the portion of the acceleration curve within 10 degrees of the yaw reference angle.

Figure 31B:
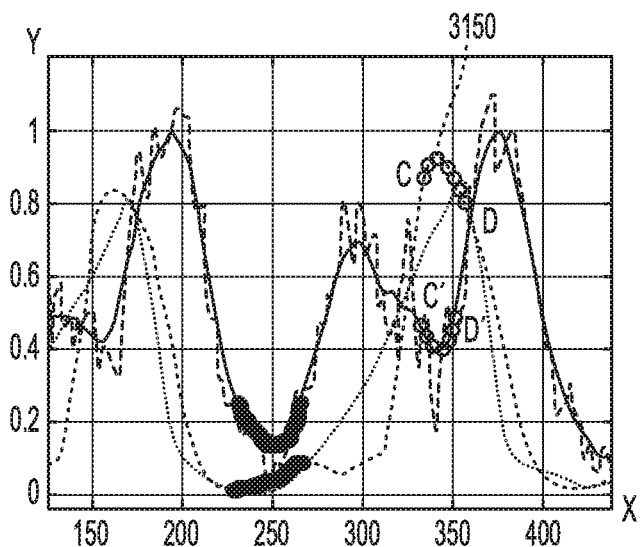

At step 3040, the transition phase is determined based on the maximum yaw angle 3150, as shown in FIG. 31B, in relation to the reference yaw angle 3140. The duration of the transition period (i.e., the portions of the curves between points C and D) is within 10 degrees of the maximum yaw angle. The maximum yaw angle 3150 represents the orientation of the swimmer's fingertips when they are most opposite to the direction of travel. In other words, the point along the curve that shows the maximum angle between the direction of travel and current orientation of the swimmer's finger tips.

Figure 31C:
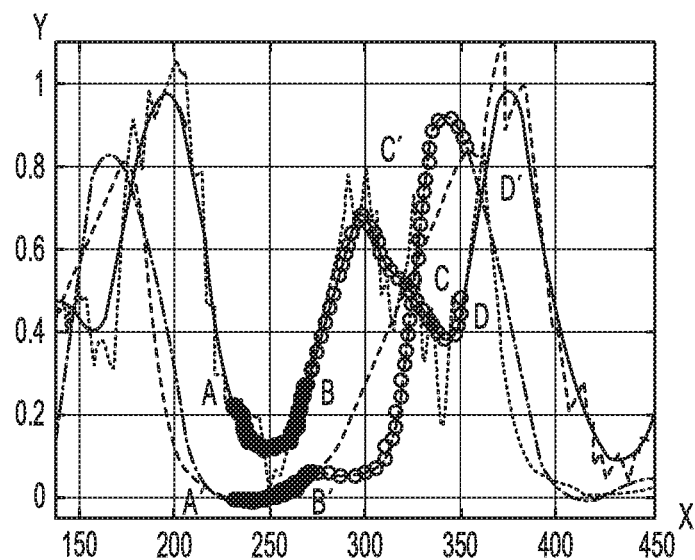
Figure 31D:
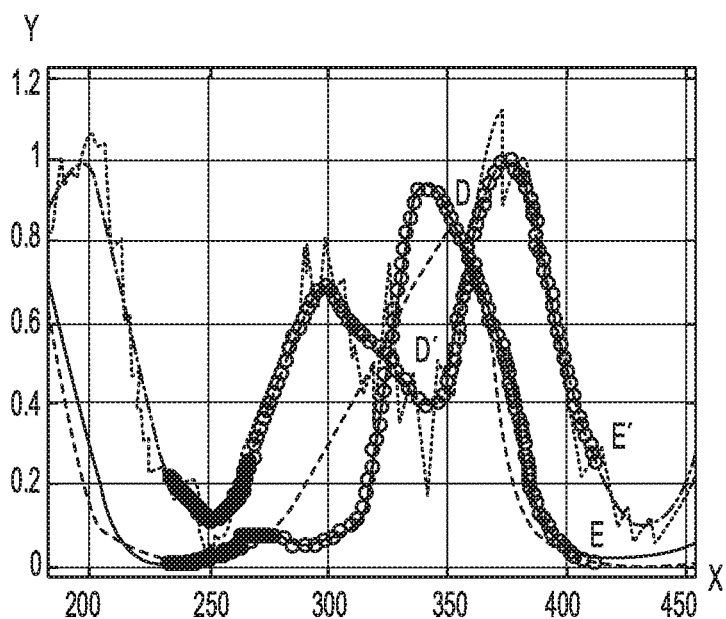

Once the glide and transition phases of the swim stroke are identified, then the recovery and pull phases can be determined based on the start and end of the glide and transition phases (step 3050). For example, the pull phase, as shown in FIG. 31C between points B and C and B' and C', is simply the portions of the acceleration curve 3110 and the yaw angle curve 3120 between the end of the glide phase and the start of the transition. And the recovery phase, as shown in FIG. 31D between points D and E and D' and E', is the portions of the acceleration curve 3110 and the yaw angle curve 3120 between the end of the transition phase and the start of the new glide phase (i.e., the old glide phase plus one period). The recovery period usually shows the greatest acceleration.

At step 3060, once the different phases for a swim stroke are identified, the characteristics of the individual phases can be identified and analyzed. In some embodiments, characteristics of a particular phase that differ among stroke types can be used to classify the stroke. For example, a longer arm sweep during the recovery phase is typically associated with the butterfly stroke, in comparison to the freestyle stroke. Therefore the measured arm sweep during the recovery phase can be used to distinguish between the butterfly stroke and the freestyle stroke. In another example, a longer transition phase is typically associated with the freestyle stroke, in comparison to the butterfly stroke, and thus, can be used to identify the freestyle stroke. In another example butterfly can be differentiated from freestyle based on rotational energy about the y-axis during the pull phases relative to all the rotational y-axis energy over all the phases. This can be calculated by the following formula:

Relative Pull Rotation $Y$=RMS (rotation-$y$ during pull)/RMS (rotation-$y$ over all phases)

RMS: root-mean-square

The ratio tends to be higher for butterfly compared with freestyle. Butterfly tends to have more (stronger) rotation around the band during the pull phase, but similar or less rotation around the band during the recovery (phase as the arms tend to be more parallel to the horizon throughout the recovery) than freestyle. These are just a few examples and it is understood that other distinguishing phase characteristics can be used to classify a swim stroke.

Figures 32A, 32B:
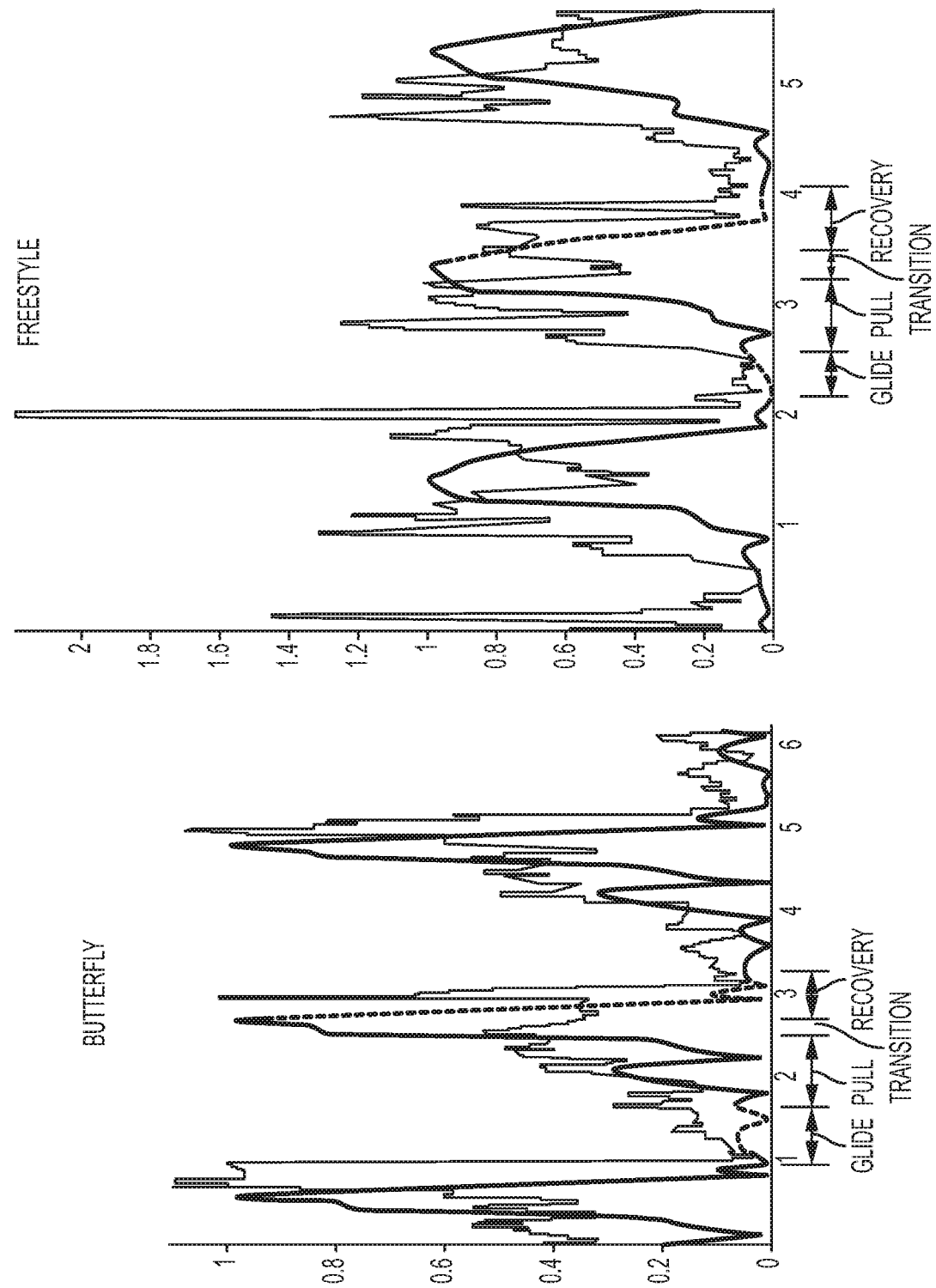
FIGS. 32A and 32B illustrate an example of classifying a user's types of motions according to some embodiments of the present disclosure.

FIG. 32A graphs the acceleration and yaw data for the four phases of a butterfly stroke and FIG. 32B graphs the four phases of a freestyle stroke. The x-axis represents the time period of the signal received from the one or more motions sensors 240 and is measured in seconds, and the y-axis represents acceleration normalized by gravity and is measured in m/s$^2$. User acceleration data is represented by the gray shaded portions of the graph and the yaw angle data is represented by the dark curved line.

In both FIGS. 32A and 32B, the glide, pull, transition, and recovery phases are labeled. Comparing the phases of the butterfly stroke shown in FIG. 32A with like phases of the freestyle stroke shown in FIG. 32B, the following differences between like phases are apparent:

| Phase | Butterfly stroke (as shown in FIG. 32A) | Freestyle stroke (as shown in FIG. 32B) |
|---|---|---|
| Transition phase | Less dwell (i.e., shorter duration - the yaw angle has a sharper peak and does not stay near the maximum for very long). | More dwell (i.e., longer duration - the yaw angle tends to stay close to the maximum yaw angle for longer). |
| Recovery phase | Faster arm sweep | Slower arm sweep |
| Glide phase | Swimmer's arm is less quiescent (i.e., shows more acceleration and change in orientation) | Swimmer's arm is more quiescent (i.e., shows less acceleration and change in orientation) |

The table shown above illustrates some example differences between like phases of the freestyle and butterfly strokes. Those skilled in the art will appreciate that other differences between like phases of the freestyle and butterfly strokes exist and can be used to distinguish the two strokes.

In another application of the subject invention, determining the particular phase can help suppress false positives during turn detection/lap counting. For example, only the yaw angle during the glide phase can be considered for the purpose of detecting a turn. This would ensure that the angles considered for turn detection are when the hand is mostly facing in the direction of travel and therefore help to reduce the effects of any yaw change due to intra-stroke dynamics. In other words, if the yaw angle is tracked over the entire stroke, then it will be between 0 and 180 degrees from the glide to transition phase, which could get confused as a turn unless stroke dynamics are filtered out. However, if yaw is tracked only during the glide phase, then a 180 degree change in yaw during the glide phase between two consecutive strokes is more likely a real turn.

In another application, phase determination can help determine true swim strokes. For example, the duration of a user's stroke phase can be compared to the duration of a model stroke phase to determine whether the user executed an actual stroke. Similarly, other characteristics including acceleration and wrist orientation for a particular phase can be used to compare with like characteristics of a model stroke phase to determine whether the user executed an actual stroke. In another example, a user's stroke can be examined to determine whether all four phases of a stroke were executed in the correct sequence to determine whether the user executed an actual stroke.

The model strokes can be customized for a particular swimmer based on gender, age, or swimming level and/or other suitable characteristic. In some embodiments, the model strokes are observed from training sessions of the swimmer.

Determining Orbit Consistency

Figure 33:
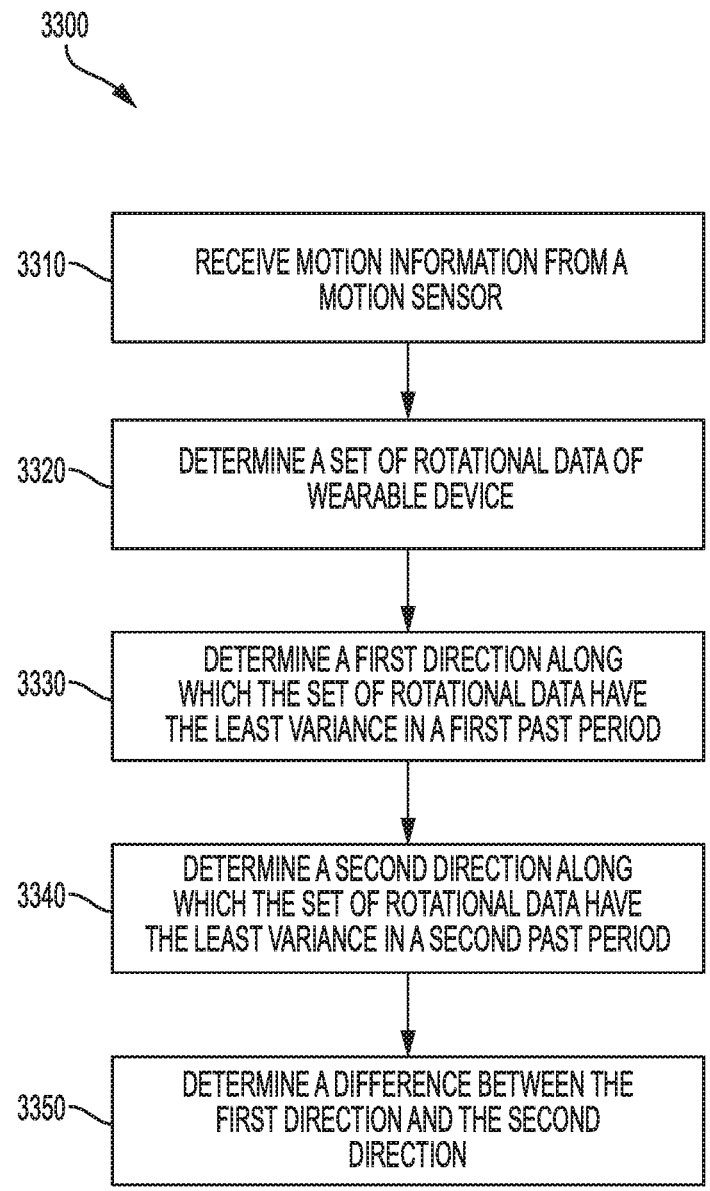
FIG. 33 illustrates a process of determining a user's stroke orbit consistency during a swimming session according to some embodiments of the present disclosure illustrates wrist angle of a wearable device according to some embodiments of the present disclosure.

The present disclosure describes several ways to determine consistency of a user's stroke orbits while the user is swimming. For example, FIG. 33 shows a flow chart illustrating a process 3300 of determining a user's stroke orbit consistency during a swimming session according to some embodiments of the present disclosure. In some embodiments, the process 3300 can be modified by, for example, having steps combined, divided, rearranged, changed, added, and/or removed. As described in more details below, in some embodiments, the process 3300 can include five steps. At step 3310, wearable device 100 receives motion information from one or more motion sensors 240. At step 3320, wearable device 100 determines a set of rotational data of wearable device 100. At step 3330, wearable device 100 determines a first direction along which the set of rotational data have the least variance in a first past period. At step 3340, wearable device 100 determines a second direction along which the set of rotational data have the least variance in a second past period. At step 3350, wearable device 100 determines a difference between the first direction and the second direction to determine consistency of the user's stroke orbits.

At step 3330, wearable device 100 determines a first direction along which the set of rotational data have the least variance in a first past period. In some embodiments, the first past period can be relatively short. As a non-limiting example, the first past period can be 10 seconds, and step 3330 can be performed every 10 seconds. In some embodiments, the direction along which the set of rotational data have the least variance can be determined using principal component analysis appreciated by people skilled in the art.

Figure 34:
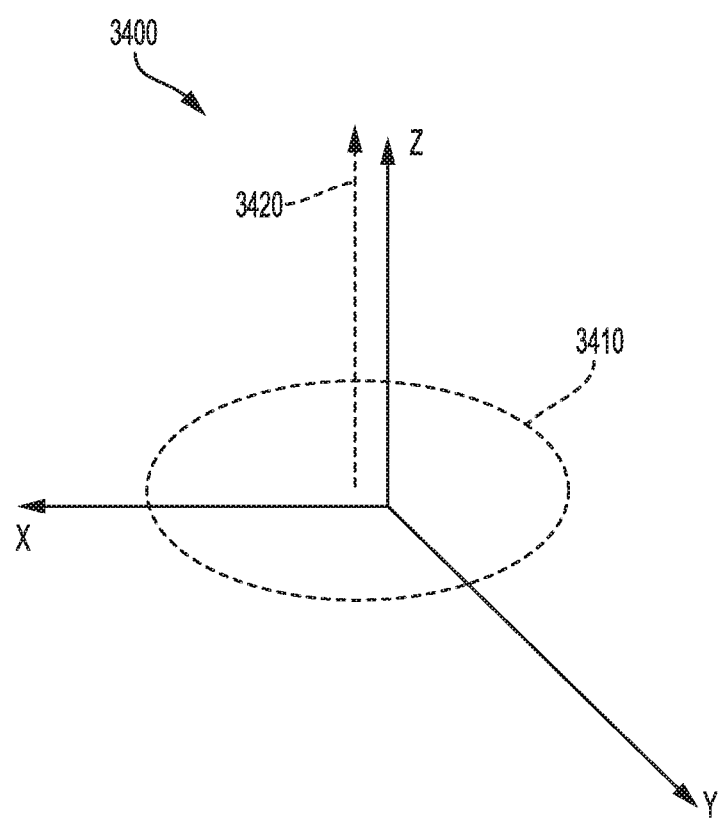
FIG. 34 illustrates an orbit of a user's stroke according to some embodiments of the present disclosure.

For example, with reference to FIG. 34, FIG. 34 shows an orbit 3410 of a user's stroke in a three dimensional space with three axes x, y, and z. In FIG. 34, orbit 3410 has an oval shape and is along the x-y plane. Positions along orbit 3410 have variance along the x-axis and the y-axis, but they do not have any variance along the z-axis because every position of orbit 3410 has a zero component along the z-axis. Using principal component analysis, the third principal component of the orbit 3410 will be the direction 3420, which is parallel with the z-axis and perpendicular to the x-y meaning. One physical meaning of the third principal component 3420 is that it indicates an axis of rotation of orbit 3410. In this example, if orbit 3410 is the orbit of the set of rotational data in the first past period, then direction 3420 is the first direction determined at step 3330. If the first past period is set at 10 seconds, then there will be a new first direction for the orbit of the set of rotational data in every past 10 seconds. In an ideal scenario when a user has a perfect repetition of strokes, the first directions determined every 10 seconds will be the same since the orbits of the set of rotational data will be overlapped over time. In a real swimming session, however, a user is not likely to maintain a perfect repetition of strokes, and the first directions determined in every first past period will be varied. One way to indicate a user's consistency of stroke movements is to measure deviation between a current first direction and an average first direction over a longer past period, such as, for example, 3 minutes or any suitable period.

Referring back to FIG. 33, at step 3340, wearable device 100 determines a second direction along which the set of rotational data have the least variance in a second past period. In some embodiments, the second direction can be determined by the same way as the first direction is determined at step 3330. As described above, in some embodiments, the second past period is longer than the first past period used at step 3330. For example, if the first past period is 10 seconds, then the second past period can be 3 minutes in some embodiments. Since 3 minutes are 180 seconds, in every 3 minutes, one second direction and 18 first directions can be determined, and the second direction is the average first directions determined in the past 3 minutes.

Figure 35:
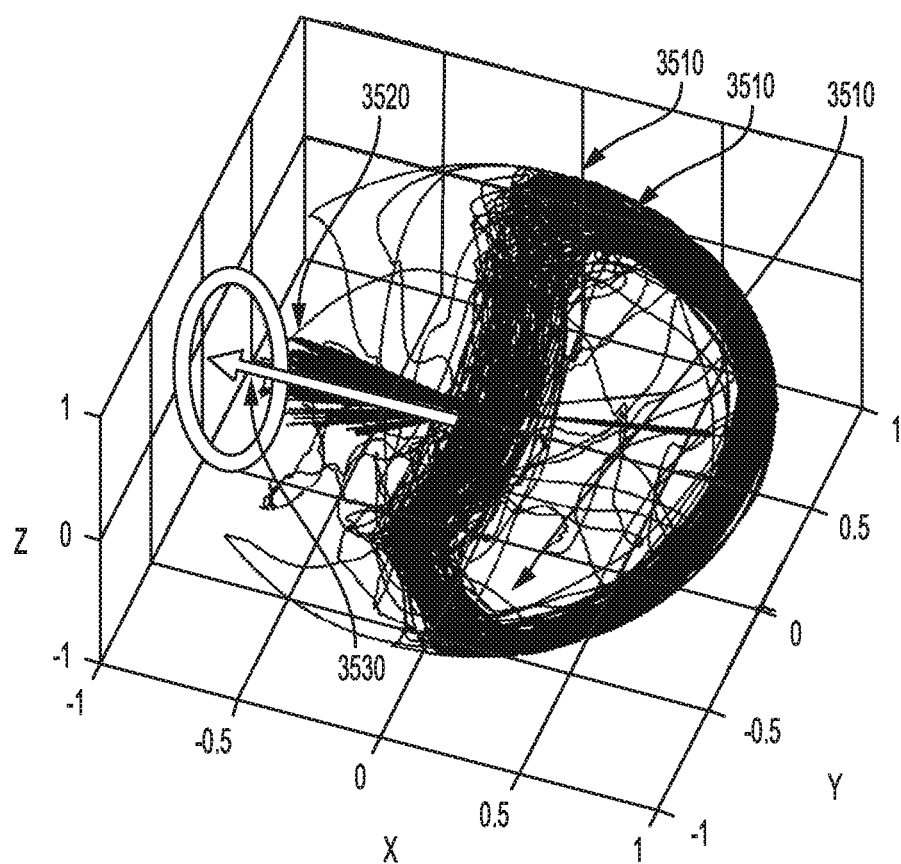
FIG. 35 illustrates orbits of a user's strokes according to some embodiments of the present disclosure.

FIG. 35 illustrates orbits of a user's strokes according to some embodiments of the present disclosure. In FIG. 35, 3510 indicates a user's stroke orbits for a particular swimming session. Unlike orbit 3410 in FIG. 34, orbits 3510 are not perfectly repetitive and represent a more realistic stroke movement of a user while swimming. In FIG. 35, lines 3520 represent directions of the third principal components of orbits 3510 over a relatively shorter period of time, and dashed line 3530 represents direction of the third principal component of orbits 3510 over a relatively longer period of time. For example, orbits 3510 can be the set of rotational data of a user while swimming over 3 minutes. Then in one embodiment, step 3330 described in FIG. 33 can be performed every 10 seconds to determine the third principal components of portions of orbit 3510 for every 10 seconds. The results can be the lines 3520, which are directions along which portions of orbits 3510 have the least variance for every 10 seconds. And step 3340 described in FIG. 33 can be performed to determine the third principal component of orbits 3510 over the entire 3 minutes. The result can be the dashed line 3530, which is the direction along which orbits 3510 have the least variance over the entire 3 minutes. If orbits 3510 are perfectly repetitive every 10 seconds, then the lines 3520 would align exactly with the dashed line 3530. From FIG. 35, the deviations between the lines 3520 and the dashed line 3530 provide a visual indication of how orbits 3510 wobble over time, which provides a measure of consistency of the user's stroke.

Referring back to FIG. 33, at step 3350, wearable device 100 determines a difference between the first direction and the second direction. In some embodiments, the second past period is longer than the first past period, and the second direction can be considered as an average of multiple first directions in the past. In those embodiments, the difference obtained at step 3350 indicates how the direction of axis of rotation of a user's short term stroke orbits deviate from the direction of axis of rotation of the user's long term/average stroke orbits. In some embodiments, a small magnitude of the difference indicates a high level of orbit consistency of the user during the first past period, and a large magnitude of the difference indicates a low level of orbit consistency of the user during the first past period. A high level of orbit consistency may indicate, among others, the user has higher swimming skill, higher efficiency, and/or less fatigue. A low level of orbit consistency may indicate the opposite.

Figure 36:
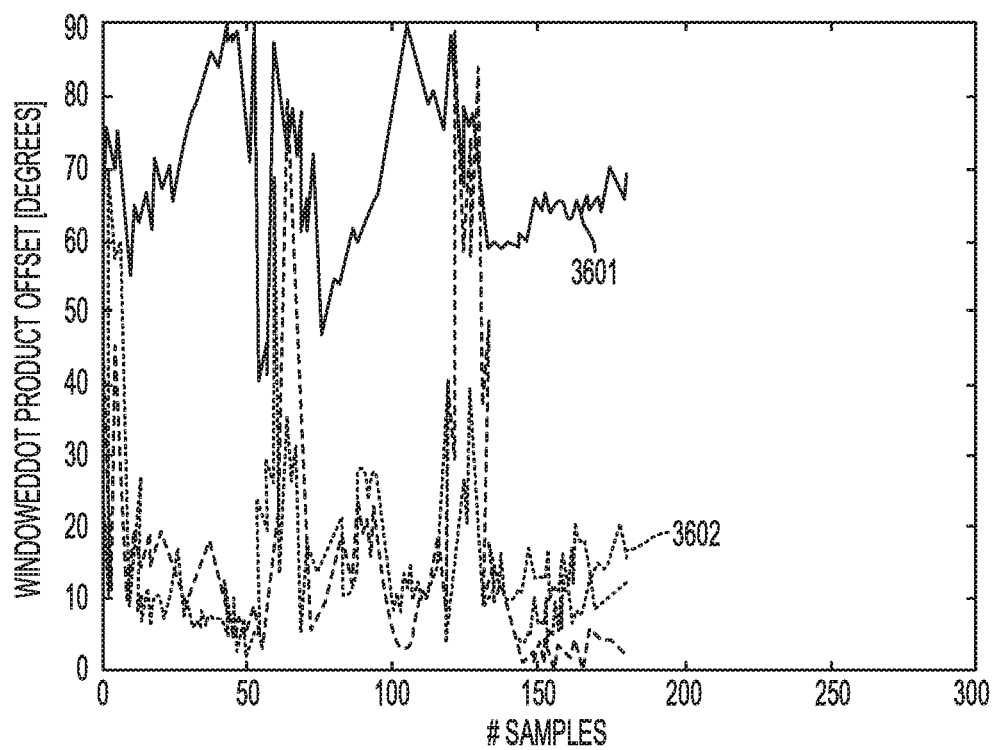
FIG. 36 illustrates running differences between the direction of axis of rotation of users' short term stroke orbits and the direction of axis of rotation of the users' long term/average stroke orbits at different sampling points according to some embodiments of the present disclosure.

FIG. 36 illustrates running differences between the direction of axis of rotation of users' short term stroke orbits and the direction of axis of rotation of the users' long term/average stroke orbits at different sampling points according to some embodiments of the present disclosure. FIG. 36 shows data processed by different filters, where 3601 represents extended Kalman filter, and 3602 represents complementary filter. In FIG. 36, the x-axis indicates the sampling points, which are sampled at every 0.01 seconds. The y-axis indicates the angle between average axis of rotation and an instantaneous axis of rotation for each orbit of strokes. Although the sampling period in FIG. 36 is 0.1 seconds, the sampling period can be any other suitable value, such as between 0.002 and 0.1 seconds, in other cases. As discussed above, in some embodiments, the instantaneous axis of rotation can be obtained by determining the third principal component of the user's stroke orbits of strokes over a relatively short period. In some embodiments, such short period can be enough time to get at least one to two orbits. For example, the short period can be five to ten seconds. In some embodiments, other suitable values can be used. The average axis of rotation can be obtained by determining the third principal component of the user's stroke orbits of strokes over a relatively long period. In FIG. 36, if the angle is 0 degrees, then there is no variation between the average axis of rotation and the instantaneous axis of rotation, which means the consistency level of the user's stroke orbits is high. The farther the angle is from 0 degrees, the less consistent the user's strokes. In some embodiments, a low consistency level of the user's stroke can indicate that the user is of low swimming skills, of low swimming efficiency, being tired, and/or having health related issues.

Figure 37:
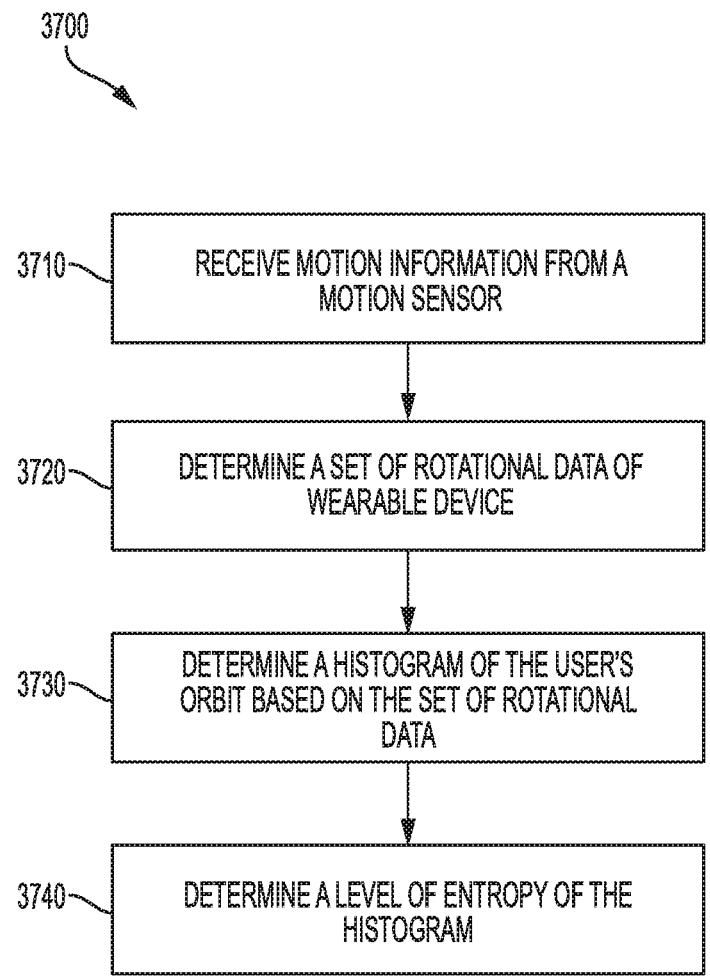
FIG. 37 illustrates a process of determining a user's stroke orbit consistency during a swimming session according to some embodiments of the present disclosure.

In some embodiments, in addition to or instead of using principal component analysis, a user's consistency of strokes can be determined using spatial entropy analysis. For example, FIG. 37 shows a flow chart illustrating a process 3700 of determining a user's stroke orbit consistency during a swimming session according to some embodiments of the present disclosure. In some embodiments, the process 3700 can be modified by, for example, having steps combined, divided, rearranged, changed, added, and/or removed. As described in more detail below, in some embodiments, the process 3700 can include four steps. At step 3710, wearable device 100 receives motion information from one or more motion sensors 240. At step 3720, wearable device 100 determines a set of rotational data of wearable device 100. At step 3730, wearable device 100 determines a histogram of the user's stroke orbits based on the set of rotational data. At step 3740, wearable device 100 determines a level of entropy of the histogram.

Figure 38:
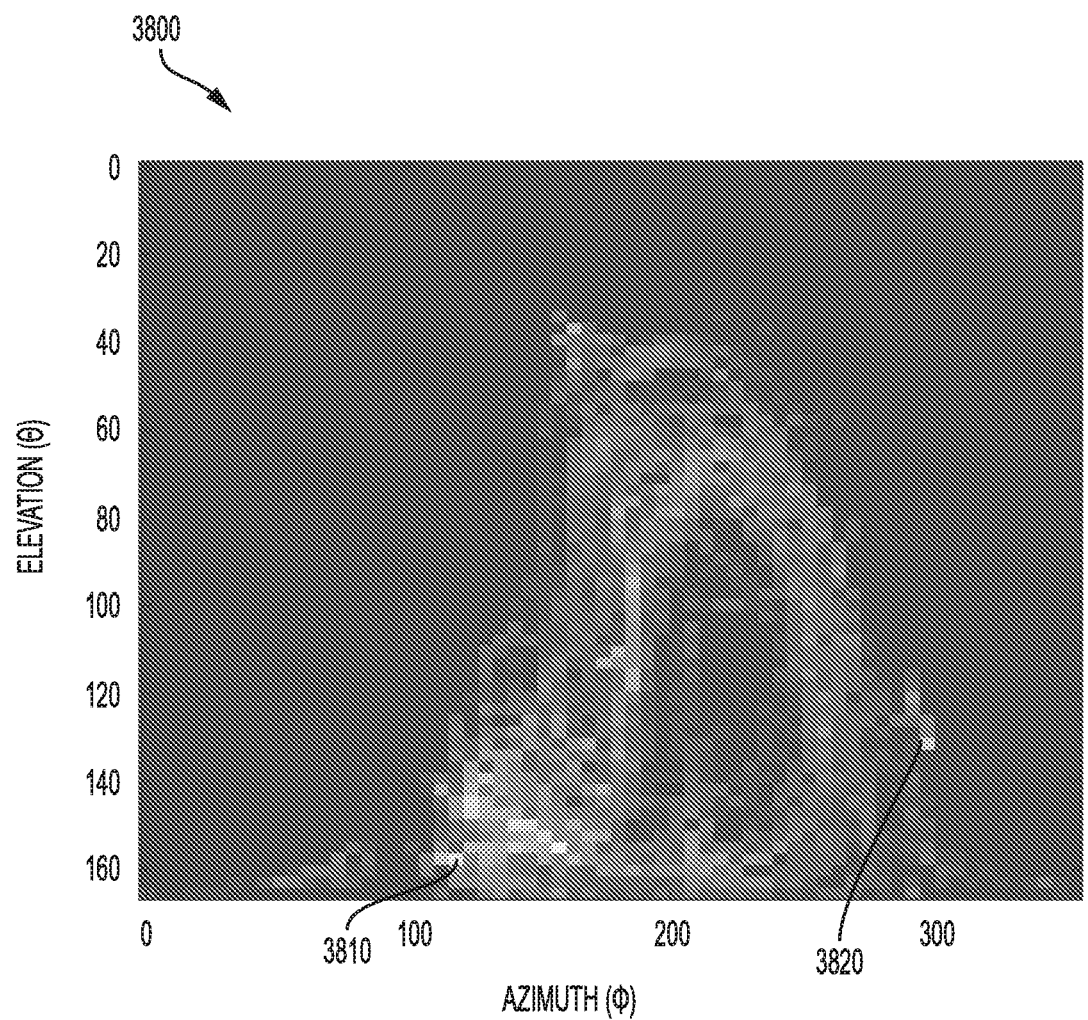
FIG. 38 illustrates a heat map of a user's stroke orbits according to some embodiments of the present disclosure.

At step 3730, wearable device 100 determines a histogram of the user's stroke orbits based on the set of rotational data. In one embodiment, the histogram can be a heat map of the user's stroke orbit. For example, FIG. 38 illustrates a heat map of a user's stroke orbits according to some embodiments of the present disclosure. In FIG. 38, the heat map is expressed in a two dimensional histogram 3800 representing a horizontal coordinate system that is appreciated by people skilled in the art. The horizontal axis of the histogram 3800 is the azimuth coordinates of the horizontal coordinate system, where the azimuth coordinates can be denoted as Φ ranging from 0 degrees to 360 degrees. The vertical axis of the histogram 3800 is the elevation coordinates of the horizontal coordinate system, where the elevation coordinates can be denoted as Θ ranging from 0 degrees to 180 degrees, where in one embodiment the 0 degrees correspond to the zenith of the horizontal coordinate system and the 180 degrees correspond to the nadir of the horizontal coordinate system. The histogram 3800 shows how the user's stroke orbits correspond to the multiple Φ-Θ bins: each Φ-Θ bin can have a stroke possibility that indicates how likely that bin corresponds to the user's stroke orbits. If the user's stroke orbits frequently correspond to a bin, then that bin can have a higher value of stroke possibility, which corresponds to a lighter color in FIG. 38, such as bins 3810 and 3820; if the user's stroke orbits less frequently correspond to a bin, then that bin can have a lower value of stroke possibility, which corresponds to a darker color in FIG. 38.

At step 3740, wearable device 100 determines a level of entropy of the histogram. In one embodiment, the level of entropy can be calculated as the absolute value of the summation of stroke possibilities of each Φ-Θ bin as expressed in Eq. 21.

$$E = |\Sigma_{\Phi=0}^{360} \Sigma_{\Theta=0}^{180} P\Phi, \Theta|$$ Eq. 21

In Eq. 1, P indicates an empirical probability measure of an orbit having a point in an Φ-Θ bin, and E indicates the entropy level. In some embodiments, the entropy indicates the degree to which the probability measure of the orbit is spread out over different Φ-Θ bin. In FIG. 38, a perfectly consistent stroke would have a minimum number of Φ-Θ bins occupied, and thus has a lower entropy level. On the other hand, a very inconsistent stroke would have many Φ-Θ bins occupied, and thus has a higher entropy level. For example, a uniformly random process across all Φ-Θ bins would be the most inconsistent stroke orbits and would yield maximum entropy. Therefore, the consistency level of the user's stroke orbits can be characterized by the entropy level: the lower the entropy level, the more consistent the user's stroke orbits. In some embodiments, the level of entropy of the histogram refers to the level of variance of the histogram. If the histogram is concentrated on a small number of Φ-Θ bins, then the level of variance is low. If the histogram is spread over a large number of Φ-Θ bins, then the level of variance is high. In some embodiments, FIG. 38 can be viewed as a 2-D histogram normalized by the total number of samples.

It is to be understood that the present disclosure is not limited in its application to the details of construction and to the arrangements of the components set forth in the description or illustrated in the drawings. The present disclosure is capable of other embodiments and of being practiced and carried out in various ways. In addition, it is to be understood that the phraseology and terminology employed herein are for the purpose of description and should not be regarded as limiting. For example, the techniques described in the present disclosure are not limited to identifying true swim strokes or classifying swim stroke type based on amount of arm extension. Other applications include using amount of arm extension for gait analysis for pedestrian activities or for repetition counting for weight training activities.

As such, those skilled in the art will appreciate that the conception, upon which this disclosure is based, may readily be utilized as a basis for the designing of other structures, systems, methods and media for carrying out the several purposes of the present disclosure. It is important, therefore, that the claims be regarded as including such equivalent constructions insofar as they do not depart from the spirit and scope of the present disclosure.

Although the present disclosure has been described and illustrated in the foregoing exemplary embodiments, it is understood that the present disclosure has been made only by way of example, and that numerous changes in the details of implementation of the present disclosure may be made without departing from the spirit and scope of the present disclosure, which is limited only by the claims which follow.

What is claimed is:

1. A method for improving an accuracy of a wearable device while classifying a user's swim stroke style, the method comprising:
   receiving, by a processor circuit of a wearable device, motion data from one or more motion sensors of the wearable device, wherein the one or more motion sensors comprises at least one of an accelerometer or a gyroscope;
   determining, by the processor circuit, rotational data of the wearable device, wherein the rotational data is expressed in a frame of reference,
   extracting, by the processor circuit, one or more features from the rotational data;
   determining, by the processor circuit, the user's swim stroke style based on the one or more features; and
   in response to determining the user's swim stroke style, determining, by the processor circuit, a level of orbit consistency for a plurality of swim strokes performed by the user based on the rotational data, wherein the level of orbit consistency measures a variation in direction of the plurality of swim strokes performed by the user; and
   outputting, by the processor circuit, the determined swim stroke style and the level of orbit consistency for the plurality of swim strokes.

2. The method of claim 1, wherein the frame of reference is a body-fixed frame of reference with respect to the wearable device.

3. The method of claim 1, wherein the frame of reference is an inertial frame of reference.

4. The method of claim 1, wherein the one or more features comprise at least one of:
   a mean crown orientation of the wearable device,
   a correlation of the user's arm rotation and the user's wrist rotation, or
   a contribution of rotation about a crown of the wearable device to a total angular velocity.

5. The method of claim 4, wherein the determining comprises performing a first-tier analysis on at least one of the features.

6. The method of claim 5, wherein the first-tier analysis indicates an upwards mean crown orientation during a fastest part of a stroke for a backstroke or a downwards mean crown orientation during a fastest part of a stroke for a breaststroke.

7. The method of claim 5, wherein the first-tier analysis indicates a positive correlation of arm and wrist rotations for a backstroke or a negative correlation of arm and wrist rotations for a breaststroke.

8. The method of claim 1, wherein the one or more features comprise at least one of:
   a relative arm rotation about a band of the wearable device during a pull phase,
   a moment arm of the user,
   a ratio of acceleration along a z axis to rotation about a y axis, wherein the z axis and the y axis are both either in an inertial frame of reference or a fixed body frame of reference with respect to the wearable device,
   a mean gravity crown weighted by acceleration,
   a correlation between an orientation of top of the band of the wearable device and rotation around the band of the wearable device,
   a root mean square (RMS) of a crown rotation,
   a minimum rotation around a crown of the wearable device,
   a maximum rotation around the band of the wearable device, or
   a maximum rotation about an x axis divided by a maximum rotation about a y axis, wherein the x axis and the y axis are both either in an inertial frame of reference or a fixed body frame of reference with respect to the wearable device.

9. The method of claim 8, wherein the determining comprises performing a second-tier analysis on at least one of the features.

10. The method of claim 9, wherein an outcome of the second-tier analysis indicates a butterfly stroke or a freestyle stroke.

11. A wearable device configured to classify a user's swim stroke style, the device comprising:
   one or more motion sensors comprising at least one of an accelerometer or a gyroscope, the one or more motion sensors being configured to output motion data; and
   a processor circuit in communication with the one or more motion sensors, the processor circuit being configured to:
      receive the motion data from the one or more motion sensors;
      determine rotational data of the wearable device, wherein the rotational data is expressed in a frame of reference;
      extract one or more features from the rotational data;
      determine the user's swim stroke style based on the one or more features;
      in response to determining the user's swim stroke style, determine a level of orbit consistency for a plurality of swim strokes performed by the user based on the rotational data, wherein the level of orbit consistency measures a variation in direction of the plurality of swim strokes performed by the user; and
      output the determined swim stroke style and the level of orbit consistency for the plurality of strokes.

12. The wearable device of claim 11, wherein the frame of reference is a body-fixed frame of reference with respect to the wearable device.

13. The wearable device of claim 11, wherein the frame of reference is an inertial frame of reference.

14. The wearable device of claim 11, wherein the one or more features comprise at least one of:
   a mean crown orientation of the wearable device,
   a correlation of the user's arm rotation and the user's wrist rotation, or
   a contribution of rotation about a crown of the wearable device to a total angular velocity.

15. The wearable device of claim 14, wherein the determining comprises performing a first-tier analysis on at least one of the features.

16. The wearable device of claim 15, wherein the first-tier analysis indicates an upwards mean crown orientation during a fastest part of a stroke for a backstroke or a downwards mean crown orientation during a fastest part of a stroke for a breaststroke.

17. The wearable device of claim 15, wherein the first-tier analysis indicates a positive correlation of arm and wrist rotations for a backstroke or a negative correlation of arm and wrist rotations for a breaststroke.

18. The wearable device of claim 11, wherein the one or more features comprise at least one of:
   a relative arm rotation about a band of the wearable device during a pull phase,
   a moment arm of the user,
   a ratio of acceleration of the wearable device along a z axis to rotation of the wearable device about a y axis, wherein the z axis and the y axis are both either in an inertial frame of reference or a fixed body frame of reference with respect to the wearable device,
   a mean gravity crown weighted by acceleration,
   a correlation between an orientation of top of the band of the wearable device and rotation around the band of the wearable device,
   a root mean square (RMS) of a crown rotation,
   a minimum rotation around a crown of the wearable device,
   a maximum rotation around the band of the wearable device, or
   a maximum rotation of the wearable device about an x axis divided by a maximum rotation of the wearable device about the y axis, wherein the z axis and the y axis are both either in an inertial frame of reference or a fixed body frame of reference with respect to the wearable device.

19. The wearable device of claim 18, wherein the determining comprises performing a second-tier analysis on at least one of the features.

20. The wearable device of claim 19, wherein an outcome of the second-tier analysis indicates a butterfly stroke or a freestyle stroke.

* * * * *

UNITED STATES PATENT AND TRADEMARK OFFICE
CERTIFICATE OF CORRECTION

PATENT NO. : 11,103,749 B2
APPLICATION NO. : 15/692726
DATED : August 31, 2021
INVENTOR(S) : Craig Mermel et al.

It is certified that error appears in the above-identified patent and that said Letters Patent is hereby corrected as shown below:

In the Specification

Column 1, Line 37, delete "file" and insert -- filed --; and

Column 1, Line 41, delete "calorimetry,"" and insert -- Calorimetry," --.

Signed and Sealed this
Twenty-sixth Day of April, 2022

Katherine Kelly Vidal
*Director of the United States Patent and Trademark Office*